US010962491B2

(12) United States Patent
Yun et al.

(10) Patent No.: US 10,962,491 B2
(45) Date of Patent: Mar. 30, 2021

(54) SYSTEM AND METHOD FOR X-RAY FLUORESCENCE WITH FILTERING

(71) Applicant: Sigray, Inc., Concord, CA (US)

(72) Inventors: Wenbing Yun, Walnut Creek, CA (US); Janos Kirz, Berkeley, CA (US); Benjamin Donald Stripe, Walnut Creek, CA (US); Sylvia Jia Yun Lewis, San Francisco, CA (US)

(73) Assignee: Sigray, Inc., Concord, CA (US)

( * ) Notice: Subject to any disclaimer, the term of this patent is extended or adjusted under 35 U.S.C. 154(b) by 3 days.

(21) Appl. No.: 16/555,143

(22) Filed: Aug. 29, 2019

(65) Prior Publication Data

US 2020/0072770 A1 Mar. 5, 2020

Related U.S. Application Data

(60) Provisional application No. 62/794,281, filed on Jan. 18, 2019, provisional application No. 62/726,776, filed on Sep. 4, 2018.

(51) Int. Cl.
G01N 23/223 (2006.01)
G21K 1/06 (2006.01)
G21K 1/02 (2006.01)

(52) U.S. Cl.
CPC ............ G01N 23/223 (2013.01); G21K 1/02 (2013.01); G21K 1/062 (2013.01); G21K 1/067 (2013.01);
(Continued)

(58) Field of Classification Search
CPC ............ G01N 23/20; G01N 23/20008; G01N 23/2076; G01N 23/22; G01N 23/223;
(Continued)

(56) References Cited

U.S. PATENT DOCUMENTS 1,203,495 A 10/1916 Coolidge
1,211,092 A 1/1917 Coolidge
(Continued)

FOREIGN PATENT DOCUMENTS

CN 101257851 9/2008
CN 101532969 9/2009
(Continued)

OTHER PUBLICATIONS

"Diamond," Section 10.4.2 of Zorman et al., "Material Aspects of Micro-Nanoelectromechanical Systems," Chapter 10 of Springer Handbook of Nanotechnology, 2nd ed., Barat Bushan, ed. (Springer Science + Business Media, Inc., New York, 2007), pp. 312-314.
(Continued)

Primary Examiner — Anastasia Midkiff
(74) Attorney, Agent, or Firm — Knobbe, Martens, Olson & Bear LLP

(57) ABSTRACT

An x-ray optical filter includes at least one x-ray optical mirror configured to receive a plurality of x-rays having a first x-ray spectrum with a first intensity as a function of energy in a predetermined solid angle range and to separate at least some of the received x-rays by multilayer reflection or total external reflection into reflected x-rays and non-reflected x-rays and to form an x-ray beam including at least some of the reflected x-rays and/or at least some of the non-reflected x-rays. The x-ray beam has a second x-ray spectrum with a second intensity as a function of energy in the solid angle range, the second intensity greater than or equal to 50% of the first intensity across a first continuous energy range at least 3 keV wide, the second intensity less than or equal to 10% of the first intensity across a second continuous energy range at least 100 eV wide.

32 Claims, 25 Drawing Sheets

(52) U.S. Cl.
CPC . *G01N 2223/076* (2013.01); *G21K 2201/061* (2013.01); *G21K 2201/062* (2013.01); *G21K 2201/067* (2013.01)

(58) Field of Classification Search
CPC ......... G01N 2201/06; G01N 2201/063; G01N 2201/0636; G01N 2201/068; G01N 2201/105; G01N 2223/05; G01N 2223/052; G01N 2223/07; G01N 2223/076; G01N 2223/30; G01N 2223/313; G21K 1/02; G21K 1/06; G21K 1/062; G21K 1/067; G21K 2201/00; G21K 2201/06; G21K 2201/061; G21K 2201/062; G21K 2201/064; G21K 2201/067; G21K 2201/068
See application file for complete search history.

(56) References Cited

U.S. PATENT DOCUMENTS

| | | |
|---|---|---|
| 1,215,116 A | 2/1917 | Coolidge |
| 1,328,495 A | 1/1920 | Coolidge |
| 1,355,126 A | 10/1920 | Coolidge |
| 1,790,073 A | 1/1931 | Pohl |
| 1,917,099 A | 7/1933 | Coolidge |
| 1,946,312 A | 2/1934 | Coolidge |
| 2,926,270 A | 2/1960 | Zunick |
| 3,795,832 A | 3/1974 | Holland |
| 4,165,472 A | 8/1979 | Wittry |
| 4,192,994 A | 3/1980 | Kastner |
| 4,227,112 A | 10/1980 | Waugh et al. |
| 4,266,138 A | 5/1981 | Nelson et al. |
| 4,426,718 A | 1/1984 | Hayashi |
| 4,523,327 A | 6/1985 | Eversole |
| 4,573,186 A | 2/1986 | Reinhold |
| 4,727,000 A | 2/1988 | Ovshinsky |
| 4,798,446 A | 1/1989 | Hettrick |
| 4,807,268 A | 2/1989 | Wittry |
| 4,940,319 A | 7/1990 | Ueda et al. |
| 4,945,552 A | 7/1990 | Ueda |
| 4,951,304 A | 8/1990 | Piestrup et al. |
| 4,972,449 A | 11/1990 | Upadhya et al. |
| 5,001,737 A | 3/1991 | Lewis et al. |
| 5,008,918 A | 4/1991 | Lee et al. |
| 5,119,408 A | 6/1992 | Little |
| 5,132,997 A | 7/1992 | Kojima |
| 5,148,462 A | 9/1992 | Spitsyn et al. |
| 5,173,928 A | 12/1992 | Momose et al. |
| 5,249,216 A | 9/1993 | Ohsugi et al. |
| 5,276,724 A | 1/1994 | Kumasaka et al. |
| 5,371,774 A | 12/1994 | Cerrina |
| 5,452,142 A | 9/1995 | Hall |
| 5,461,657 A | 10/1995 | Hayashida |
| 5,513,237 A | 4/1996 | Nobuta et al. |
| 5,602,899 A | 2/1997 | Larson |
| 5,604,782 A | 2/1997 | Cash, Jr. |
| 5,629,969 A | 5/1997 | Koshishiba |
| 5,657,365 A | 8/1997 | Yamamoto et al. |
| 5,682,415 A | 10/1997 | O'Hara |
| 5,715,291 A | 2/1998 | Momose |
| 5,729,583 A | 3/1998 | Tang et al. |
| 5,737,387 A | 4/1998 | Smither |
| 5,768,339 A | 6/1998 | O'Hara |
| 5,772,903 A | 6/1998 | Hirsch |
| 5,778,039 A | 7/1998 | Hossain |
| 5,799,056 A | 8/1998 | Gulman |
| 5,812,629 A | 9/1998 | Clauser |
| 5,825,848 A | 10/1998 | Virshup et al. |
| 5,832,052 A | 11/1998 | Hirose et al. |
| 5,857,008 A | 1/1999 | Reinhold |
| 5,878,110 A | 3/1999 | Yamamoto et al. |
| 5,881,126 A | 3/1999 | Momose |
| 5,912,940 A | 6/1999 | O'Hara |
| 5,930,325 A | 7/1999 | Momose |
| 6,108,397 A | 8/2000 | Cash, Jr. |
| 6,108,398 A | 8/2000 | Mazor et al. |
| 6,118,853 A | 9/2000 | Hansen et al. |
| 6,125,167 A | 9/2000 | Morgan |
| 6,195,410 B1 | 2/2001 | Cash, Jr. |
| 6,226,347 B1 | 5/2001 | Golenhofen |
| 6,278,764 B1 | 8/2001 | Barbee, Jr. et al. |
| 6,307,916 B1 | 10/2001 | Rogers et al. |
| 6,359,964 B1 | 3/2002 | Kogan |
| 6,377,660 B1 | 4/2002 | Ukita et al. |
| 6,381,303 B1 | 4/2002 | Vu et al. |
| 6,389,100 B1 | 5/2002 | Verman et al. |
| 6,430,254 B2 | 8/2002 | Wilkins |
| 6,430,260 B1 | 8/2002 | Snyder |
| 6,442,231 B1 | 8/2002 | O'Hara |
| 6,456,688 B1 | 9/2002 | Taguchi et al. |
| 6,463,123 B1 | 10/2002 | Korenev |
| 6,487,272 B1 | 11/2002 | Kutsuzawa |
| 6,504,901 B1 | 1/2003 | Loxley et al. |
| 6,504,902 B2 | 1/2003 | Iwasaki et al. |
| 6,507,388 B2 | 1/2003 | Burghoorn |
| 6,553,096 B1 | 4/2003 | Zhou et al. |
| 6,560,313 B1 | 5/2003 | Harding et al. |
| 6,560,315 B1 | 5/2003 | Price et al. |
| 6,707,883 B1 | 3/2004 | Tiearney et al. |
| 6,711,234 B1 | 3/2004 | Loxley et al. |
| 6,763,086 B2 | 7/2004 | Platonov |
| 6,811,612 B2 | 11/2004 | Gruen et al. |
| 6,815,363 B2 | 11/2004 | Yun et al. |
| 6,829,327 B1 | 12/2004 | Chen |
| 6,847,699 B2 | 1/2005 | Rigali et al. |
| 6,850,598 B1 | 2/2005 | Fryda et al. |
| 6,870,172 B1 | 3/2005 | Mankos et al. |
| 6,885,503 B2 | 4/2005 | Yun et al. |
| 6,891,627 B1 | 5/2005 | Levy et al. |
| 6,914,723 B2 | 7/2005 | Yun et al. |
| 6,917,472 B1 | 7/2005 | Yun et al. |
| 6,934,359 B2 | 8/2005 | Chen |
| 6,947,522 B2 | 9/2005 | Wilson et al. |
| 6,975,703 B2 | 12/2005 | Wilson et al. |
| 7,003,077 B2 | 2/2006 | Jen et al. |
| 7,006,596 B1 | 2/2006 | Janik |
| 7,015,467 B2 | 3/2006 | Maldonado et al. |
| 7,023,950 B1 | 4/2006 | Annis |
| 7,023,955 B2 | 4/2006 | Chen et al. |
| 7,057,187 B1 | 6/2006 | Yun et al. |
| 7,076,026 B2 | 6/2006 | Verman et al. |
| 7,079,625 B2 | 7/2006 | Lenz |
| 7,095,822 B1 | 8/2006 | Yun |
| 7,103,138 B2 | 9/2006 | Pelc et al. |
| 7,110,503 B1 | 9/2006 | Kumakhov |
| 7,119,953 B2 | 10/2006 | Yun et al. |
| 7,120,228 B2 | 10/2006 | Yokhin et al. |
| 7,130,375 B1 | 10/2006 | Yun et al. |
| 7,170,969 B1 | 1/2007 | Yun et al. |
| 7,180,979 B2 | 2/2007 | Momose |
| 7,180,981 B2 | 2/2007 | Wang |
| 7,183,547 B2 | 2/2007 | Yun et al. |
| 7,215,736 B1 | 5/2007 | Wang et al. |
| 7,215,741 B2 | 5/2007 | Ukita et al. |
| 7,218,700 B2 | 5/2007 | Huber et al. |
| 7,218,703 B2 | 5/2007 | Yada et al. |
| 7,221,731 B2 | 5/2007 | Yada et al. |
| 7,245,696 B2 | 7/2007 | Yun et al. |
| 7,264,397 B2 | 9/2007 | Ritter |
| 7,268,945 B2 | 9/2007 | Yun et al. |
| 7,286,640 B2 | 10/2007 | Yun et al. |
| 7,297,959 B2 | 11/2007 | Yun et al. |
| 7,298,826 B2 | 11/2007 | Inazuru |
| 7,330,533 B2 | 2/2008 | Sampayon |
| 7,346,148 B2 | 3/2008 | Ukita |
| 7,346,204 B2 | 3/2008 | Ito |
| 7,349,525 B2 | 3/2008 | Morton |
| 7,359,487 B1 | 4/2008 | Newcome |
| 7,365,909 B2 | 4/2008 | Yun et al. |
| 7,365,918 B1 | 4/2008 | Yun et al. |
| 7,382,864 B2 | 6/2008 | Hebert et al. |
| 7,388,942 B2 | 6/2008 | Wang et al. |
| 7,394,890 B1 | 7/2008 | Wang et al. |

(56) References Cited

U.S. PATENT DOCUMENTS

| | | |
|---|---|---|
| 7,400,704 B1 | 7/2008 | Yun et al. |
| 7,406,151 B1 | 7/2008 | Yun |
| 7,412,024 B1 | 8/2008 | Yun et al. |
| 7,412,030 B1 | 8/2008 | O'Hara |
| 7,412,131 B2 | 8/2008 | Lee et al. |
| 7,414,787 B2 | 8/2008 | Yun et al. |
| 7,433,444 B2 | 10/2008 | Baumann |
| 7,440,542 B2 | 10/2008 | Baumann |
| 7,443,953 B1 | 10/2008 | Yun et al. |
| 7,443,958 B2 | 10/2008 | Harding |
| 7,453,981 B2 | 11/2008 | Baumann |
| 7,463,712 B2 | 12/2008 | Zhu et al. |
| 7,486,770 B2 | 2/2009 | Baumann |
| 7,492,871 B2 | 2/2009 | Popescu |
| 7,499,521 B2 | 3/2009 | Wang et al. |
| 7,515,684 B2 | 4/2009 | Gibson et al. |
| 7,522,698 B2 | 4/2009 | Popescu |
| 7,522,707 B2 | 4/2009 | Steinlage et al. |
| 7,522,708 B2 | 4/2009 | Heismann |
| 7,529,343 B2 | 5/2009 | Safal et al. |
| 7,532,704 B2 | 5/2009 | Hempel |
| 7,551,719 B2 | 6/2009 | Yokhin et al. |
| 7,551,722 B2 | 6/2009 | Ohshima et al. |
| 7,561,662 B2 | 7/2009 | Wang et al. |
| 7,564,941 B2 | 7/2009 | Baumann |
| 7,583,789 B1 | 9/2009 | Macdonald et al. |
| 7,601,399 B2 | 10/2009 | Barnola et al. |
| 7,605,371 B2 | 10/2009 | Yasui et al. |
| 7,639,786 B2 | 12/2009 | Baumann |
| 7,646,843 B2 | 1/2010 | Popescu et al. |
| 7,672,433 B2 | 3/2010 | Zhong et al. |
| 7,680,243 B2 | 3/2010 | Yokhin et al. |
| 7,738,629 B2 | 6/2010 | Chen |
| 7,787,588 B1 | 8/2010 | Yun et al. |
| 7,796,725 B1 | 9/2010 | Yun et al. |
| 7,796,726 B1 | 9/2010 | Gendreau et al. |
| 7,800,072 B2 | 9/2010 | Yun et al. |
| 7,809,113 B2 | 10/2010 | Aoki et al. |
| 7,813,475 B1 | 10/2010 | Wu et al. |
| 7,817,777 B2 | 10/2010 | Baumann et al. |
| 7,848,483 B2 | 12/2010 | Platonov |
| 7,864,426 B2 | 1/2011 | Yun et al. |
| 7,864,922 B2 | 1/2011 | Kawabe |
| 7,873,146 B2 | 1/2011 | Okunuki et al. |
| 7,876,883 B2 | 1/2011 | O'Hara |
| 7,889,838 B2 | 2/2011 | David et al. |
| 7,889,844 B2 | 2/2011 | Okunuki et al. |
| 7,899,154 B2 | 3/2011 | Chen et al. |
| 7,902,528 B2 | 3/2011 | Nara et al. |
| 7,914,693 B2 | 3/2011 | Jeong et al. |
| 7,920,673 B2 | 4/2011 | Lanza et al. |
| 7,920,676 B2 | 4/2011 | Yun et al. |
| 7,924,973 B2 | 4/2011 | Kottler et al. |
| 7,929,667 B1 | 4/2011 | Zhuang et al. |
| 7,945,018 B2 | 5/2011 | Heismann |
| 7,949,092 B2 | 5/2011 | Brons |
| 7,949,095 B2 | 5/2011 | Ning |
| 7,974,379 B1 | 7/2011 | Case et al. |
| 7,983,381 B2 | 7/2011 | David et al. |
| 7,991,120 B2 | 8/2011 | Okunuki et al. |
| 8,005,185 B2 | 8/2011 | Popescu |
| 8,009,796 B2 | 8/2011 | Popescu |
| 8,009,797 B2 | 8/2011 | Ouchi |
| 8,041,004 B2 | 10/2011 | David |
| 8,036,341 B2 | 11/2011 | Lee |
| 8,058,621 B2 | 11/2011 | Kommareddy |
| 8,068,579 B1 | 11/2011 | Yun et al. |
| 8,073,099 B2 | 12/2011 | Niu et al. |
| 8,094,784 B2 | 1/2012 | Morton |
| 8,139,711 B2 | 3/2012 | Takahashi |
| 8,139,716 B2 | 3/2012 | Okunuki et al. |
| 8,184,771 B2 | 5/2012 | Murakoshi |
| 8,208,602 B2 | 6/2012 | Lee |
| 8,208,603 B2 | 6/2012 | Sato |
| 8,233,587 B2 | 7/2012 | Sato |
| 8,243,879 B2 | 8/2012 | Itoh et al. |
| 8,243,884 B2 | 8/2012 | Rödhammer et al. |
| 8,249,220 B2 | 8/2012 | Verman et al. |
| 8,280,000 B2 | 10/2012 | Takahashi |
| 8,306,183 B2 | 11/2012 | Koehler |
| 8,306,184 B2 | 11/2012 | Chang et al. |
| 8,331,534 B2 | 12/2012 | Silver |
| 8,351,569 B2 | 1/2013 | Baker |
| 8,351,570 B2 | 1/2013 | Nakamura |
| 8,353,628 B1 | 1/2013 | Yun et al. |
| 8,357,894 B2 | 1/2013 | Toth et al. |
| 8,360,640 B2 | 1/2013 | Reinhold |
| 8,374,309 B2 | 2/2013 | Donath |
| 8,406,378 B2 | 3/2013 | Wang et al. |
| 8,416,920 B2 | 4/2013 | Okumura et al. |
| 8,422,633 B2 | 4/2013 | Lantz et al. |
| 8,423,127 B2 | 4/2013 | Mahmood et al. |
| 8,451,975 B2 | 5/2013 | Tada |
| 8,422,637 B2 | 6/2013 | Okunuki et al. |
| 8,488,743 B2 | 7/2013 | Verman |
| 8,509,386 B2 | 8/2013 | Lee et al. |
| 8,520,803 B2 | 8/2013 | Behling |
| 8,526,575 B1 | 9/2013 | Yun et al. |
| 8,532,257 B2 | 9/2013 | Mukaide et al. |
| 8,553,843 B2 | 10/2013 | Drory |
| 8,559,594 B2 | 10/2013 | Ouchi |
| 8,559,597 B2 | 10/2013 | Chen et al. |
| 8,565,371 B2 | 10/2013 | Bredno |
| 8,576,983 B2 | 11/2013 | Baeumer |
| 8,588,372 B2 | 11/2013 | Zou et al. |
| 8,591,108 B2 | 11/2013 | Tada |
| 8,602,648 B1 | 12/2013 | Jacobsen et al. |
| 8,632,247 B2 | 1/2014 | Ishii |
| 8,644,451 B2 | 2/2014 | Aoki et al. |
| 8,666,024 B2 | 3/2014 | Okunuki et al. |
| 8,666,025 B2 | 3/2014 | Klausz |
| 8,699,667 B2 | 4/2014 | Steinlage et al. |
| 8,735,844 B1 | 5/2014 | Khaykovich et al. |
| 8,737,565 B1 | 5/2014 | Lyon et al. |
| 8,744,048 B2 | 6/2014 | Lee et al. |
| 8,755,487 B2 | 6/2014 | Kaneko |
| 8,767,915 B2 | 7/2014 | Stutman |
| 8,767,916 B2 | 7/2014 | Hashimoto |
| 8,781,069 B2 | 7/2014 | Murakoshi |
| 8,824,629 B2 | 9/2014 | Ishii |
| 8,831,174 B2 | 9/2014 | Kohara |
| 8,831,175 B2 | 9/2014 | Silver et al. |
| 8,831,179 B2 | 9/2014 | Adler et al. |
| 8,837,680 B2 | 9/2014 | Tsujii |
| 8,855,265 B2 | 10/2014 | Engel |
| 8,859,977 B2 | 10/2014 | Kondoh |
| 8,861,682 B2 | 10/2014 | Okunuki et al. |
| 8,903,042 B2 | 12/2014 | Ishii |
| 8,908,824 B2 | 12/2014 | Kondoh |
| 8,972,191 B2 | 3/2015 | Stampanoni et al. |
| 8,989,351 B2 | 3/2015 | Vogtmeier et al. |
| 8,989,474 B2 | 3/2015 | Kido et al. |
| 8,995,622 B2 | 3/2015 | Adler et al. |
| 9,001,967 B2 | 4/2015 | Baturin |
| 9,001,968 B2 | 4/2015 | Kugland et al. |
| 9,007,562 B2 | 4/2015 | Marconi et al. |
| 9,008,278 B2 | 4/2015 | Lee et al. |
| 9,016,943 B2 | 4/2015 | Jacobsen et al. |
| 9,020,101 B2 | 4/2015 | Omote et al. |
| 9,025,725 B2 | 5/2015 | Kiyohara et al. |
| 9,029,795 B2 | 5/2015 | Sando |
| 9,031,201 B2 | 5/2015 | Sato |
| 9,063,055 B2 | 6/2015 | Ouchi |
| 9,086,536 B2 | 7/2015 | Pang et al. |
| 9,129,715 B2 | 9/2015 | Adler et al. |
| 9,222,899 B2 | 12/2015 | Yamaguchi |
| 9,234,856 B2 | 1/2016 | Mukaide |
| 9,251,995 B2 | 2/2016 | Ogura |
| 9,257,254 B2 | 2/2016 | Ogura et al. |
| 9,263,225 B2 | 2/2016 | Morton |
| 9,280,056 B2 | 3/2016 | Clube et al. |
| 9,281,158 B2 | 3/2016 | Ogura |
| 9,291,578 B2 | 3/2016 | Adler |
| 9,329,141 B2 | 5/2016 | Stutman |

(56) References Cited

U.S. PATENT DOCUMENTS

| | | |
|---|---|---|
| 9,336,917 B2 | 5/2016 | Ozawa et al. |
| 9,357,975 B2 | 6/2016 | Baturin |
| 9,362,081 B2 | 6/2016 | Bleuet |
| 9,370,084 B2 | 6/2016 | Sprong et al. |
| 9,390,881 B2 | 7/2016 | Yun et al. |
| 9,412,552 B2 | 8/2016 | Aoki et al. |
| 9,430,832 B2 | 8/2016 | Koehler et al. |
| 9,439,613 B2 | 9/2016 | Stutman |
| 9,445,775 B2 | 9/2016 | Das |
| 9,448,190 B2 | 9/2016 | Yun et al. |
| 9,449,780 B2 | 9/2016 | Chen |
| 9,449,781 B2 | 9/2016 | Yun et al. |
| 9,453,803 B2 | 9/2016 | Radicke |
| 9,486,175 B2 | 11/2016 | Fredenberg et al. |
| 9,494,534 B2 | 11/2016 | Baturin |
| 9,502,204 B2 | 11/2016 | Ikarashi |
| 9,520,260 B2 | 12/2016 | Hesselink et al. |
| 9,524,846 B2 | 12/2016 | Sato et al. |
| 9,532,760 B2 | 1/2017 | Anton et al. |
| 9,543,109 B2 | 1/2017 | Yun et al. |
| 9,564,284 B2 | 2/2017 | Gerzoskovitz |
| 9,570,264 B2 | 2/2017 | Ogura et al. |
| 9,570,265 B1 | 2/2017 | Yun et al. |
| 9,588,066 B2 | 3/2017 | Pois et al. |
| 9,594,036 B2 | 3/2017 | Yun et al. |
| 9,595,415 B2 | 3/2017 | Ogura |
| 9,632,040 B2 | 4/2017 | Stutman |
| 9,658,174 B2 | 5/2017 | Omote |
| 9,700,267 B2 | 7/2017 | Baturin et al. |
| 9,719,947 B2 | 8/2017 | Yun et al. |
| 9,748,012 B2 | 8/2017 | Yokoyama |
| 9,757,081 B2 | 9/2017 | Proksa |
| 9,761,021 B2 | 9/2017 | Koehler |
| 9,823,203 B2 | 11/2017 | Yun et al. |
| 9,826,949 B2 | 11/2017 | Ning |
| 9,837,178 B2 | 12/2017 | Nagai |
| 9,842,414 B2 | 12/2017 | Koehler |
| 9,861,330 B2 | 1/2018 | Rossl |
| 9,874,531 B2 | 1/2018 | Yun et al. |
| 9,881,710 B2 | 1/2018 | Roessl |
| 9,916,655 B2 | 3/2018 | Sampanoni |
| 9,934,930 B2 | 4/2018 | Parker et al. |
| 9,939,392 B2 | 4/2018 | Wen |
| 9,970,119 B2 | 5/2018 | Yokoyama |
| 10,014,148 B2 | 7/2018 | Tang et al. |
| 10,020,158 B2 | 7/2018 | Yamada |
| 10,028,716 B2 | 7/2018 | Rossl |
| 10,045,753 B2 | 8/2018 | Teshima |
| 10,068,740 B2 | 9/2018 | Gupta |
| 10,074,451 B2 | 9/2018 | Kottler et al. |
| 10,076,297 B2 | 9/2018 | Bauer |
| 10,085,701 B2 | 10/2018 | Hoshino |
| 10,105,112 B2 | 10/2018 | Utsumi |
| 10,115,557 B2 | 10/2018 | Ishii |
| 10,141,081 B2 | 11/2018 | Preusche |
| 10,151,713 B2 | 12/2018 | Wu et al. |
| 10,153,061 B2 | 12/2018 | Yokoyama |
| 10,153,062 B2 | 12/2018 | Gall et al. |
| 10,182,194 B2 | 1/2019 | Karim et al. |
| 10,217,596 B2 | 2/2019 | Liang et al. |
| 10,231,687 B2 | 3/2019 | Kahn et al. |
| 10,247,683 B2 | 4/2019 | Yun et al. |
| 10,256,001 B2 | 4/2019 | Yokoyama |
| 10,264,659 B1 | 4/2019 | Miller et al. |
| 10,267,752 B2 | 4/2019 | Zhang et al. |
| 10,267,753 B2 | 4/2019 | Zhang et al. |
| 10,269,528 B2 | 4/2019 | Yun et al. |
| 10,295,485 B2 | 5/2019 | Yun et al. |
| 10,295,486 B2 | 5/2019 | Yun et al. |
| 10,297,359 B2 | 5/2019 | Yun et al. |
| 10,304,580 B2 | 5/2019 | Yun et al. |
| 10,349,908 B2 | 7/2019 | Yun et al. |
| 10,352,695 B2 | 7/2019 | Dziura et al. |
| 10,352,880 B2 | 7/2019 | Yun et al. |
| 10,393,683 B2 | 8/2019 | Hegeman et al. |
| 10,401,309 B2 | 9/2019 | Yun et al. |
| 10,416,099 B2 | 9/2019 | Yun et al. |
| 10,429,325 B2 | 10/2019 | Ito et al. |
| 2001/0006413 A1 | 7/2001 | Burghoorn |
| 2002/0080916 A1 | 6/2002 | Jiang |
| 2002/0085676 A1 | 7/2002 | Snyder |
| 2003/0142790 A1 | 1/2003 | Zhou et al. |
| 2003/0054133 A1 | 3/2003 | Wadley et al. |
| 2003/0112923 A1 | 6/2003 | Lange |
| 2003/0223536 A1 | 12/2003 | Yun et al. |
| 2004/0047446 A1 | 3/2004 | Platonov |
| 2004/0120463 A1 | 6/2004 | Wilson et al. |
| 2004/0140432 A1 | 7/2004 | Maldonado et al. |
| 2005/0025281 A1 | 2/2005 | Verman et al. |
| 2005/0074094 A1 | 4/2005 | Jen et al. |
| 2005/0123097 A1 | 6/2005 | Wang |
| 2005/0163284 A1 | 7/2005 | Inazuru |
| 2005/0282300 A1 | 12/2005 | Yun et al. |
| 2006/0045234 A1 | 3/2006 | Pelc |
| 2006/0062350 A1 | 3/2006 | Yokhin |
| 2006/0233309 A1 | 10/2006 | Kutzner et al. |
| 2006/0239405 A1 | 10/2006 | Verman |
| 2007/0030959 A1 | 2/2007 | Ritter |
| 2007/0071174 A1 | 3/2007 | Hebert et al. |
| 2007/0108387 A1 | 5/2007 | Yun et al. |
| 2007/0110217 A1 | 5/2007 | Ukita |
| 2007/0183563 A1 | 8/2007 | Baumann |
| 2007/0183579 A1 | 8/2007 | Baumann et al. |
| 2007/0189449 A1 | 8/2007 | Baumann |
| 2007/0248215 A1 | 10/2007 | Ohshima et al. |
| 2008/0084966 A1 | 4/2008 | Aoki et al. |
| 2008/0089484 A1 | 4/2008 | Reinhold |
| 2008/0094694 A1 | 4/2008 | Yun et al. |
| 2008/0099935 A1 | 5/2008 | Egle |
| 2008/0116398 A1 | 5/2008 | Hara |
| 2008/0117511 A1 | 5/2008 | Chen |
| 2008/0159707 A1 | 7/2008 | Lee et al. |
| 2008/0165355 A1 | 7/2008 | Yasui et al. |
| 2008/0170662 A1 | 7/2008 | Reinhold |
| 2008/0170668 A1 | 7/2008 | Kruit et al. |
| 2008/0181363 A1 | 7/2008 | Fenter et al. |
| 2008/0240344 A1 | 10/2008 | Reinhold |
| 2008/0273662 A1 | 11/2008 | Yun |
| 2009/0052619 A1 | 2/2009 | Endoh |
| 2009/0092227 A1 | 4/2009 | David |
| 2009/0154640 A1 | 6/2009 | Baumann et al. |
| 2009/0316860 A1 | 12/2009 | Okunuki et al. |
| 2010/0012845 A1 | 1/2010 | Baeumer et al. |
| 2010/0027739 A1 | 2/2010 | Lantz et al. |
| 2010/0040202 A1 | 2/2010 | Lee |
| 2010/0046702 A1 | 2/2010 | Chen et al. |
| 2010/0061508 A1 | 3/2010 | Takahashi |
| 2010/0091947 A1 | 4/2010 | Niu |
| 2010/0141151 A1 | 6/2010 | Reinhold |
| 2010/0246765 A1 | 9/2010 | Murakoshi |
| 2010/0260315 A1 | 10/2010 | Sato et al. |
| 2010/0272239 A1 | 10/2010 | Lantz et al. |
| 2010/0284513 A1 | 11/2010 | Kawabe |
| 2011/0026680 A1 | 2/2011 | Sato |
| 2011/0038455 A1 | 2/2011 | Silver et al. |
| 2011/0058655 A1 | 3/2011 | Okumura et al. |
| 2011/0064191 A1 | 3/2011 | Toth et al. |
| 2011/0085644 A1 | 4/2011 | Verman |
| 2011/0135066 A1 | 6/2011 | Behling |
| 2011/0142204 A1 | 6/2011 | Zou et al. |
| 2011/0235781 A1 | 9/2011 | Aoki et al. |
| 2011/0243302 A1 | 10/2011 | Murakoshi |
| 2011/0268252 A1 | 11/2011 | Ozawa et al. |
| 2012/0041679 A1 | 2/2012 | Stampanoni |
| 2012/0057669 A1 | 3/2012 | Vogtmeier et al. |
| 2012/0163547 A1 | 6/2012 | Lee et al. |
| 2012/0163554 A1 | 6/2012 | Tada |
| 2012/0224670 A1 | 9/2012 | Kiyohara et al. |
| 2012/0228475 A1 | 9/2012 | Pang et al. |
| 2012/0269323 A1 | 10/2012 | Adler et al. |
| 2012/0269324 A1 | 10/2012 | Adler |
| 2012/0269325 A1 | 10/2012 | Adler et al. |
| 2012/0269326 A1 | 10/2012 | Adler et al. |
| 2012/0294420 A1 | 11/2012 | Nagai |

(56) References Cited

U.S. PATENT DOCUMENTS

| | | |
|---|---|---|
| 2013/0011040 A1 | 1/2013 | Kido et al. |
| 2013/0032727 A1 | 2/2013 | Kondoe |
| 2013/0039460 A1 | 2/2013 | Levy |
| 2013/0108012 A1 | 5/2013 | Sato |
| 2013/0108022 A1 | 5/2013 | Kugland et al. |
| 2013/0195246 A1 | 8/2013 | Tamura et al. |
| 2013/0223594 A1 | 8/2013 | Sprong et al. |
| 2013/0235976 A1 | 9/2013 | Jeong et al. |
| 2013/0259207 A1 | 10/2013 | Omote et al. |
| 2013/0279651 A1 | 10/2013 | Yokoyama |
| 2013/0308112 A1 | 11/2013 | Clube et al. |
| 2013/0308754 A1 | 11/2013 | Yamazaki et al. |
| 2014/0023973 A1 | 1/2014 | Marconi et al. |
| 2014/0037052 A1 | 2/2014 | Adler |
| 2014/0064445 A1 | 3/2014 | Adler |
| 2014/0072104 A1 | 3/2014 | Jacobsen et al. |
| 2014/0079188 A1 | 3/2014 | Hesselink et al. |
| 2014/0105363 A1 | 4/2014 | Chen et al. |
| 2014/0146945 A1 | 5/2014 | Fredenberg et al. |
| 2014/0153692 A1 | 6/2014 | Larkin et al. |
| 2014/0177800 A1 | 6/2014 | Sato et al. |
| 2014/0185778 A1 | 7/2014 | Lee et al. |
| 2014/0205057 A1 | 7/2014 | Koehler et al. |
| 2014/0211919 A1 | 7/2014 | Ogura et al. |
| 2014/0226785 A1 | 8/2014 | Stutman et al. |
| 2014/0241493 A1 | 8/2014 | Yokoyama |
| 2014/0270060 A1 | 9/2014 | Date et al. |
| 2014/0369469 A1 | 12/2014 | Ogura et al. |
| 2015/0030126 A1 | 1/2015 | Radicke |
| 2015/0030127 A1 | 1/2015 | Aoki et al. |
| 2015/0043713 A1 | 2/2015 | Chen |
| 2015/0049860 A1 | 2/2015 | Das |
| 2015/0055743 A1 | 2/2015 | Vedantham et al. |
| 2015/0055745 A1 | 2/2015 | Holzner et al. |
| 2015/0071402 A1 | 3/2015 | Handa |
| 2015/0092924 A1 | 4/2015 | Yun et al. |
| 2015/0110252 A1 | 4/2015 | Yun et al. |
| 2015/0117599 A1 | 4/2015 | Yun et al. |
| 2015/0194287 A1 | 7/2015 | Yun et al. |
| 2015/0243397 A1 | 8/2015 | Yun et al. |
| 2015/0247811 A1 | 9/2015 | Yun et al. |
| 2015/0260663 A1 | 9/2015 | Yun et al. |
| 2015/0323478 A1 | 11/2015 | Stutman |
| 2015/0357069 A1 | 12/2015 | Yun et al. |
| 2016/0064175 A1 | 3/2016 | Yun et al. |
| 2016/0066870 A1 | 3/2016 | Yun et al. |
| 2016/0106387 A1 | 4/2016 | Kahn |
| 2016/0178540 A1 | 6/2016 | Yun et al. |
| 2016/0178541 A1 | 6/2016 | Hwang et al. |
| 2016/0268094 A1 | 9/2016 | Yun et al. |
| 2016/0320320 A1 | 11/2016 | Yun et al. |
| 2016/0351370 A1 | 12/2016 | Yun et al. |
| 2017/0018392 A1 | 1/2017 | Cheng |
| 2017/0047191 A1 | 2/2017 | Yun et al. |
| 2017/0052128 A1 | 2/2017 | Yun et al. |
| 2017/0074809 A1 | 3/2017 | Ito |
| 2017/0162288 A1 | 6/2017 | Yun et al. |
| 2017/0162359 A1 | 6/2017 | Tang et al. |
| 2017/0227476 A1 | 8/2017 | Zhang et al. |
| 2017/0234811 A1 | 8/2017 | Zhang et al. |
| 2017/0261442 A1 | 9/2017 | Yun et al. |
| 2017/0336334 A1 | 11/2017 | Yun et al. |
| 2018/0144901 A1 | 5/2018 | Yun et al. |
| 2018/0202951 A1 | 7/2018 | Yun et al. |
| 2018/0261352 A1 | 9/2018 | Matsuyama et al. |
| 2018/0306734 A1 | 10/2018 | Morimoto et al. |
| 2018/0323032 A1 | 11/2018 | Strelec et al. |
| 2018/0344276 A1 | 12/2018 | DeFreitas et al. |
| 2018/0348151 A1 | 12/2018 | Kasper et al. |
| 2018/0356355 A1 | 12/2018 | Momose et al. |
| 2019/0017942 A1 | 1/2019 | Filevich |
| 2019/0017946 A1 | 1/2019 | Wack et al. |
| 2019/0018824 A1 | 1/2019 | Zarkadas |
| 2019/0019647 A1 | 1/2019 | Lee et al. |
| 2019/0027265 A1 | 1/2019 | Dey et al. |
| 2019/0043689 A1 | 2/2019 | Camus |
| 2019/0057832 A1 | 2/2019 | Durst et al. |
| 2019/0064084 A1 | 2/2019 | Ullom et al. |
| 2019/0086342 A1 | 3/2019 | Pois et al. |
| 2019/0088439 A1 | 3/2019 | Honda |
| 2019/0113466 A1 | 4/2019 | Karim et al. |
| 2019/0115184 A1 | 4/2019 | Zalubovsky |
| 2019/0131103 A1 | 5/2019 | Tuohimaa |
| 2019/0132936 A1 | 5/2019 | Steck et al. |
| 2019/0154892 A1 | 5/2019 | Moldovan |
| 2019/0172681 A1 | 6/2019 | Owen et al. |
| 2019/0189385 A1 | 6/2019 | Liang et al. |
| 2019/0204246 A1 | 7/2019 | Hegeman et al. |
| 2019/0204757 A1 | 7/2019 | Brussard et al. |
| 2019/0206652 A1 | 7/2019 | Akinwande et al. |
| 2019/0212281 A1 | 7/2019 | Shchgegrov |
| 2019/0214216 A1 | 7/2019 | Jeong et al. |
| 2019/0216416 A1 | 7/2019 | Koehler et al. |
| 2019/0219713 A1 | 7/2019 | Booker et al. |
| 2019/0261935 A1 | 8/2019 | Kitamura |
| 2019/0272929 A1 | 9/2019 | Omote et al. |
| 2019/0304735 A1 | 10/2019 | Safai et al. |
| 2019/0311874 A1 | 10/2019 | Tuohimma et al. |
| 2019/0317027 A1 | 10/2019 | Tsuboi et al. |
| 2019/0341219 A1 | 11/2019 | Zhang et al. |
| 2019/0341220 A1 | 11/2019 | Parker et al. |
| 2019/0353802 A1 | 11/2019 | Steinhauser et al. |
| 2019/0374182 A1 | 12/2019 | Karim et al. |
| 2019/0380193 A1 | 12/2019 | Matsuhana et al. |
| 2019/0387602 A1 | 12/2019 | Woywode et al. |
| 2019/0391087 A1 | 12/2019 | Matejka et al. |
| 2020/0003708 A1 | 1/2020 | Kobayashi et al. |
| 2020/0003712 A1 | 1/2020 | Kataoka et al. |
| 2020/0041429 A1 | 2/2020 | Cho et al. |
| 2020/0058462 A1 | 2/2020 | Suzuki |
| 2020/0088656 A1 | 3/2020 | Pois et al. |
| 2020/0090826 A1 | 3/2020 | Adler |
| 2020/0103358 A1 | 4/2020 | Wiell et al. |
| 2020/0105492 A1 | 4/2020 | Behling et al. |

FOREIGN PATENT DOCUMENTS

| | | |
|---|---|---|
| CN | 102124537 A | 7/2011 |
| CN | 102325498 | 1/2012 |
| CN | 102551761 A | 7/2012 |
| EP | 0432568 | 6/1991 |
| EP | 0751533 | 1/1997 |
| EP | 1028451 | 8/2000 |
| EP | 1169713 | 1/2006 |
| EP | 3093867 A1 | 11/2016 |
| FR | 2548447 | 1/1985 |
| JP | H06-188092 | 7/1994 |
| JP | H07-056000 | 3/1995 |
| JP | H07-194592 | 8/1995 |
| JP | H08-184572 | 7/1996 |
| JP | H11-304728 | 11/1999 |
| JP | 2000-306533 | 11/2000 |
| JP | 2003-149392 | 5/2003 |
| JP | 2003-288853 | 10/2003 |
| JP | 2004-089445 | 3/2004 |
| JP | 2007-218683 | 8/2007 |
| JP | 2007-265981 | 10/2007 |
| JP | 2007-311185 | 11/2007 |
| JP | 2008-200359 | 4/2008 |
| JP | 2008-145111 | 6/2008 |
| JP | 2008-197495 | 8/2008 |
| JP | 2009-195349 | 3/2009 |
| JP | 2009-212058 | 9/2009 |
| JP | 2010-236986 | 10/2010 |
| JP | 2011-029072 | 2/2011 |
| JP | 2011-218147 | 11/2011 |
| JP | 2012-032387 | 2/2012 |
| JP | 2012-187341 | 10/2012 |
| JP | 2012-254294 | 12/2012 |
| JP | 2013-508683 | 3/2013 |
| JP | 2013-157269 | 8/2013 |
| JP | 2013-160637 | 8/2013 |
| JP | 2013-181811 | 9/2013 |
| JP | 2013-239317 | 11/2013 |

(56) References Cited

FOREIGN PATENT DOCUMENTS

| | | |
|---|---|---|
| JP | 2015-002074 | 1/2015 |
| JP | 2015-047306 | 3/2015 |
| JP | 2015-072263 | 4/2015 |
| JP | 2015-077289 | 4/2015 |
| KR | 10-2012-0091591 A | 8/2012 |
| WO | WO 1995/006952 | 3/1995 |
| WO | WO 1998/011592 | 3/1998 |
| WO | WO 2002/039792 | 5/2002 |
| WO | WO 2003/081631 | 10/2003 |
| WO | WO 2005/109969 | 11/2005 |
| WO | WO 2006/096052 | 9/2006 |
| WO | WO 2007/125833 | 11/2007 |
| WO | WO 2009/098027 | 8/2009 |
| WO | WO 2009/1104560 | 8/2009 |
| WO | WO 2010/109909 | 9/2010 |
| WO | WO 2011/032572 | 3/2011 |
| WO | WO 2012/032950 | 3/2012 |
| WO | WO 2013/004574 | 1/2013 |
| WO | WO 2013/111050 | 8/2013 |
| WO | WO 2013/118593 | 8/2013 |
| WO | WO 2013/160153 | 10/2013 |
| WO | WO 2013/168468 | 11/2013 |
| WO | WO 2014/054497 | 4/2014 |
| WO | WO 2015/016019 | 2/2015 |
| WO | WO 2015/034791 | 3/2015 |
| WO | WO 2015/066333 | 5/2015 |
| WO | WO 2015/084466 | 6/2015 |
| WO | WO 2015/168473 | 11/2015 |
| WO | WO 2015/176023 | 11/2015 |
| WO | WO 2015/187219 | 12/2015 |
| WO | WO 2016/187623 | 11/2016 |
| WO | WO 2017/031740 | 3/2017 |
| WO | WO 2017/204850 | 11/2017 |
| WO | WO 2017/213996 | 12/2017 |
| WO | WO 2018/122213 A1 | 7/2018 |
| WO | WO 2018/175570 | 9/2018 |

OTHER PUBLICATIONS

"Element Six CVD Diamond Handbook" (Element Six, Luxembourg, 2015).
"High performance benchtop EDXRF spectrometer with Windows® software," published by: Rigaku Corp., Tokyo, Japan; 2017.
"Monochromatic Doubly Curved Crystal Optics," published by: X-Ray Optical Systems, Inc. (XOS), East Greenbush, NY; 2017.
"Optics and Detectors," Section 4 of X-Ray Data Booklet, 3rd Ed., A.C. Thompson ed. (Lawrence Berkeley Nat'l Lab, Berkeley, CA, 2009).
"Properties of Solids," Ch. 12 of CRC Handbook of Chemistry and Physics, 90th ed., Devid R. Lide & W.M. "Mickey" Haynes, eds. (Crc Press, Boca Raton, FL, 2009), pp. 12-41-12-46; 12-203-12-212.
"Science and Technology of Future Light Sources", Arthur L. Robinson (LBNL) and Brad Plummer (SLAG), eds. Report Nos. ANL-08/39 / BNL-81895-2008 / LBNL-1090E-2009 / SLAC-R-917 (Lawrence Berkeley Nat'l Lab, Berkeley, CA, Dec. 2008).
"Series 5000 Packaged X-ray Tubes," Product Technical Data Sheet DS006 Rev. G, X-Ray Technologies Inc. (Oxford Instruments), Scotts Valley, CA (no date).
"Toward Control of Matter: Energy Science Needs for a New Class of X-Ray Light Sources" (Lawrence Berkeley Nat'l Lab, Berkeley, CA, Sep. 2008).
"X-ray Optics for BES Light Source Facilities," Report of the Basic Energy Sciences Workshop on X-ray Optics for BES Light Source Facilities, D. Mills & H. Padmore, Co-Chairs, (U.S. Dept. of Energy, Office of Science, Potomac, MD, Mar. 2013).
Abullian et al., "Quantitative determination of the lateral density and intermolecular correlation between proteins anchored on the membrane surfaces using grazing incidence small-angle X-ray scattering and grazing incidence X-ray fluorescence," Nov. 28, 2012, The Journal of Chemical Physics, vol. 137, pp. 204907-1 to 204907-8.
Adachi et al., "Development of the 17-inch Direct-Conversion Dynamic Flat-panel X-ray Detector (FPD)," Digital R/F (Shimadzu Corp., 2 pages (no date, published—2004 with product release).
Aharonovich et al., "Diamond Nanophotonics," Adv. Op. Mat'ls vol. 2, Issue 10 (2014).
Als-Nielsen et al., "Phase contrast imaging" Sect. 9.3 of Ch. 9 of "Elements of Modern X-ray Physics, Second Edition", (John Wiley & Sons Ltd, Chichester, West Sussex, UK, 2011), pp. 318-329.
Als-Nielsen et al., "Photoelectric Absorption," Ch. 7 of "Elements of Modern X-ray Physics, Second Edition," (John Wiley & Sons Ltd, Chichester, West Sussex, UK, 2011).
Als-Nielsen et al., "Refraction and reflection from interfaces," Ch. 3 of "Elements of Modern X-ray Physics, Second Edition," (John Wiley & Sons Ltd., Chichester, West Sussex, UK, 2011), pp. 69-112.
Als-Nielsen et al., "X-rays and their interaction with matter", and "Sources", Ch. 1 & 2 of "Elements of Modern X-ray Physics, Second Edition" (John Wiley & Sons Ltd, Chichester, West Sussex, UK, 2011).
Altapova et al., "Phase contrast laminography based on Talbot interferometry," Opt. Express, vol. 20, No. 6, (2012) pp. 6496-6508.
Ando et al., "Smooth and high-rate reactive ion etching of diamond," Diamond and Related Materials, vol. 11, (2002) pp. 824-827.
Arfelli et al., "Mammography with Synchrotron Radiation: Phase-Detection Techniques," Radiology vol. 215, (2000), pp. 286-293.
Arndt et al., Focusing Mirrors for Use with Microfocus X-ray Tubes, 1998, Journal of Applied Crystallography, vol. 31, pp. 733-741.
Bachucki et al., "Laboratory-based double X-ray spectrometer for simultaneous X-ray emission and X-ray absorption studies," J. Anal. Atomic Spectr. DOI:10.1039/C9JA00159J (2019).
Balaic et al., "X-ray optics of tapered capillaries," Appl. Opt. vol. 34 (Nov. 1995) pp. 7263-7272.
Baltes et al., "Coherent and incoherent grating reconstruction," J. Opt. Soc. Am. A vol. 3(8), (1986), pp. 1268-1275.
Barbee Jr., "Multilayers for x-ray optics," Opt. Eng. vol. 25 (Aug. 1986) pp. 898-915.
Baron et al., "A compact optical design for Bragg reflections near backscattering," J. Synchrotron Rad., vol. 8 (2001), pp. 1127-1130.
Bech, "In-vivo dark-field and phase-contrast x-ray imaging," Scientific Reports 3, (2013), Article No. 03209.
Bech, "X-ray imaging with a grating interferometer," University of Copenhagen PhD. Thesis, (May 1, 2009).
Bergamin et al., "Measuring small lattice distortions in Si-crystals by phase-contrast x-ray topography," J. Phys. D: Appl. Phys. vol. 33 (2000-12-31) pp. 2678-2682.
Bernstorff, "Grazing Incidence Small Angle X-ray Scattering (GISAXS)," Presentation at Advanced School on Synchrotron and Free Electron Laser Sources and their Multidisciplinary Applications, Apr. 2008, Trieste, Italy.
Bilderback et al., "Single Capillaries," Ch. 29 of "Handbook of Optics vol. III, 2nd Ed." (McGraw Hill, New York, 2001).
Birkholz, "Chapter 4: Grazing Incidence Configurations," Thin Film Analysis by X-ray Scattering (Wiley-VCH Verlag GmbH & Co. KGaA, Weinheim, Germany, 2006).
Bjeoumikhov et al., "A modular system for XRF and XRD applications consisting of a microfocus X-ray source and different capillary optics," X-ray Spectrometry, vol. 33 (2004), pp. 312-316.
Bjeoumikhov et al., "Capillary Optics for X-Rays," Ch. 18 of "Modern Developments in X-Ray and Neutron Optics," A. Erko et al., eds. (Springer, Berlin, Germany, 2008), pp. 287-306.
Canberra Model S-5005 WinAxil X-Ray Analysis Software, published by: Canberra Eurisys Benelux N.V./S.A.,Zellik, Belgium; Jun. 2004.
Cerrina, "The Schwarzschild Objective," Ch. 27 of "Handbook of Optics vol. III, 2nd Ed." (McGraw Hill, New York, 2001).
Chen et al., "Advance in detection of low sulfur content by wavelength dispersive XRF," Proceedings of the Annual ISA Analysis Division Symposium (2002).
Chen et al., "Doubly curved crystal (DCC) X-ray optics and applications," Powder Diffraction, vol. 17(2) (2002), pp. 99-103.

(56) References Cited

OTHER PUBLICATIONS

Chen et al., "Guiding and focusing neutron beams using capillary optics," Nature vol. 357 (Jun. 4, 1992), pp. 391-393.
Chervenak et al., "Experimental thick-target bremsstrahlung spectra from electrons in the range 10 to 30 keV", Phys. Rev. A vol. 12 (1975), pp. 26-33.
Chon, "Measurement of Roundness for an X-Ray Mono-Capillary Optic by Using Computed Tomography," J. Korean Phys. Soc. vol. 74, No. 9, pp. 901-906 (May 2019).
Coan et al., "In vivo x-ray phase contrast analyzer-based imaging for longitudinal osteoarthritis studies in guinea pigs," Phys. Med. Biol. vol. 55(24) (2010), pp. 7649-7662.
Cockcroft et al., "Chapter 2: Experimental Setups," Powder Diffraction: Theory and Practice, R.E. Dinnebier and S.J.L. Billinge, eds (Royal Society of Chemistry Publishing, London, UK, 2008).
Cohen et al., "Tunable laboratory extended x-ray absorption fine structure system," Rev. Sci. Instr. vol. 51, No. 3, Mar. 1980, pp. 273-277.
Cong et al., "Fourier transform-based iterative method for differential phase-contrast computed tomography", Opt. Lett. vol. 37 (2012), pp. 1784-1786.
Cornaby et al., "Advances in X-ray Microfocusing with Monocapillary Optics at Chess," Chess News Magazine (2009), pp. 63-66.
Cornaby et al., "Design of Single-Bounce Monocapillary X-ray Optics," Advances in X-ray Analysis: Proceedings of the 55th Annual Conference on Applications of X-ray Analysis, vol. 50, (International Centre for Diffraction Data (ICDD), 2007), pp. 194-200.
Cornaby, "The Handbook of X-ray Single Bounce Monocapillary Optics, Including Optical Design and Synchrotron Applications" (PhD Dissertation, Cornell University, Ithaca, NY, May 2008).
David et al., "Fabrication of diffraction gratings for hard x-ray phase contrast imaging," Microelectron. Eng. vol. 84, (2007), pp. 1172-1177.
David et al., "Hard X-ray phase imaging and tomography using a grating interferometer," Spectrochimica Acta Part B vol. 62 (2007) pp. 626-630.
Davis et al., "Bridging the Micro-to-Macro Gap: A New Application for Micro X-Ray Fluorescence," Microsc Microanal., vol. 17(3) (Jun. 2011), pp. 410-417.
Diaz et al., "Monte Carlo Simulation of Scatter Field for Calculation of Contrast of Discs in Synthetic CDMAM Images," In: Digital Mammography, Proceedings 10th International Workshop IWDM 2010 (Springer Verlag, Berlin Heidelberg), (2010), pp. 628- 635 (9 pages). Jun. 18, 2010.
Ding et al., "Reactive Ion Etching of CVD Diamond Films for MEMS Applications," Micromachining and Microfabrication, Proc. SPIE vol. 4230 (2000), pp. 224-230.
Dobrovinskaya et al., "Thermal Properties," Sect. 2.1.5 of "Sapphire: Material, Manufacturing,, Applications" (Springer Science + Business Media, New York, 2009).
Dong et al., "Improving Molecular Sensitivity in X-Ray Fluorescence Molecular Imaging (XFMI) of Iodine Distribution in Mouse-Sized Phantoms via Excitation Spectrum Optimization," IEEE Access, vol. 6, pp. 56966-56976 (2018).
Erko et al., "X-ray Optics," Ch. 3 of "Handbook of Practical X-Ray Fluorescence Analysis," B. Beckhoff et al., eds. (Springer, Berlin, Germany, 2006), pp. 85-198.
Falcone et al., "New directions in X-ray microscopy," Contemporary Physics, vol. 52, No. 4, (Jul.-Aug. 2010), pp. 293-318.
Fernández-Ruiz, "TXRF Spectrometry as a Powerful Tool for the Study of Metallic Traces in Biological Systems," Development in Analytical Chemistry, vol. 1 (2014), pp. 1-14.
Freund, "Mirrors for Synchrotron Beamlines," Ch. 26 of "Handbook of Optics vol. III, 2nd Ed." (McGraw Hill, New York, 2001).
Ge et al., "Investigation of the partially coherent effects in a 2D Talbot interferometer," Anal. Bioanal. Chem. vol. 401, (2011), pp. 865-870. Apr. 29, 2011 pub Jun. 14, 2011.

Gibson et al., "Polycapillary Optics: An Enabling Technology for New Applications," Advances in X-ray Analysis, vol. 45 (2002), pp. 286-297.
Gonzales et al., "Angular Distribution of Bremsstrahlung Produced by 10-Key and 20 Key Electrons Incident on a Thick Au Target", in Application of Accelerators in Research and Industry, AIP Conf. Proc. 1221 (2013), pp. 114-117.
Gonzales et al., "Angular distribution of thick-target bremsstrahlung produced by electrons with initial energies ranging from 10 to 20 keV incident on Ag", Phys. Rev. A vol. 84 (2011): 052726.
Günther et al., "Full-field structured-illumination super-responution X-ray transmission microscopy," Nature Comm. 10:2494 (2019) and supplementary information.
Guttmann et al., "Ellipsoidal capillary as condenser for the BESSY full-field x-ray microscope," J. Phys. Conf. Ser. vol. 186 (2009): 012064.
Harasse et al., "Iterative reconstruction in x-ray computed laminography from differential phase measurements", Opt. Express. vol. 19 (2011), pp. 16560-16573.
Harasse et al., "X-ray Phase Laminography with a Grating Interferometer using Iterative Reconstruction", in International Workshop on X-ray and Neutron Phase Imaging with Gratings, AIP Conf. Proc. vol. 1466, (2012), pp. 163-168.
Harasse et al., "X-ray Phase Laminography with Talbot Interferometer", in Developments in X-Ray Tomography VII, Proc. SPIE vol. 7804 (2010), 780411.
Hasse et al., "New developments in laboratory-based x-ray sources and optics," Adv. in Laboratory-based X-Ray Sources, Optics, and Applications VI, ed. A.M. Khounsary, Proc. SPIE vol. 10387, 103870B-1 (2017).
Hemraj-Benny et al., "Near-Edge X-ray Absorption Fine Structure Spectroscopy as a Tool for Investigating Nanomaterials," Small, vol. 2(1), (2006), pp. 26-35.
Henke et al., "X-ray interactions: photoabsorption, scattering, transmission, and reflection at E=50-30000 eV, Z=1-92," Atomic Data and Nuclear Data Tables, vol. 54 (No. 2) (Jul. 1993), pp. 181-342.
Hennekam et al., "Trace metal analysis of sediment cores using a novel X-ray fluorescence core scanning method," Quaternary Int'l, https://doi.org/10.1016/j.quaint.2018.10.018 (2018).
Honma et al., Full-automatic XAFS Measurement System of the Engineering Science Research II beamline BL14B2 at Spring-8, 2011, AIP Conference Proceedings 1234, pp. 13-16.
Howard et al., "High-Definition X-ray Fluorescence Elemental Mapping of Paintings," Anal. Chem., 2012, vol. 84(7), pp. 3278-3286.
Howells, "Gratings and Monochromators in the VUV and Soft X-RAY Spectral Region," Ch. 21 of Handbook of Optics vol. III, 2nd Ed. (McGraw Hill, New York, 2001).
Howells, "Mirrors for Synchrotron-Radiation Beamlines," Publication LBL-34750 (Lawrence Berkeley Laboratory, Berkeley, CA, Sep. 1993).
Hrdy et al, "Diffractive-Refractive Optics: X-ray Crystal Monochromators with Profiled Diffracting Surfaces," Ch. 20 of "Modern Developments in X-Ray and Neutron Optics," A. Erko et al., eds. (Springer, Berlin Heidelberg New York, 2008).
Hwang et al, "New etching process for device fabrication using diamond," Diamond & Related Materials, vol. 13 (2004) pp. 2207-2210.
Ide-Ektessabi et al., "The role of trace metallic elements in neurodegenerative disorders: quantitative analysis using XRF and XANES spectroscopy," Anal. Sci., vol. 21(7) (Jul. 2005), pp. 885-892.
Ihsan et al., "A microfocus X-ray tube based on a microstructured X-ray target", Nuclear Instruments and Methods in Physics Research B vol. 267 (2009) pp. 3566-3573.
Ishisaka et al., "A New Method of Analyzing Edge Effect in Phase Contrast Imaging with Incoherent X-rays," Optical Review, vol. 7, No. 6, (2000), pp. 566-572.
Ito et al., "A Stable In-Laboratory EXAFS Measurement System," Jap. J. Appl. Phys., vol. 22, No. 2, Feb. 1, 1983, pp. 357-360.
Itoh et al., "Two-dimensional grating-based X-ray phase-contrast imaging using Fourier transform phase retrieval," Op. Express, vol. 19, No. 4 (2011) pp. 3339-3346.

(56) References Cited

OTHER PUBLICATIONS

Janssens et al, "Recent trends in quantitative aspects of microscopic X-ray fluorescence analysis," TrAC Trends in Analytical Chemistry 29.6 (Jun. 2010): 464-478.
Jahrman et al., "Vacuum formed temporary spherically and toroidally bent crystal analyzers for x-ray absorption and x-ray emission spectroscopy," Rev. Sci. Inst. vol. 90, 013106 (2019).
Jiang et al., "X-Ray Phase-Contrast Imaging with Three 2D Gratings," Int. J. Biomed. Imaging, (2008), 827152, 8 pages.
Jin et al., "Development of an X-ray tube with two selective targets modulated by a magnetic field," Rev. Sci. Inst. vol. 90, 083105 (2019).
Joy, "Astronomical X-ray Optics," Ch. 28 of "Handbook of Optics vol. III, 2nd Ed.," (McGraw Hill, New York, 2001).
Kalasová et al., "Characterization of a laboratory-based X-ray computed nonotomography system for propagation-based method of phase contrast imaging," IEEE Trans. on Instr. and Meas., DOI 10.1109/TIM.2019.2910338 (2019).
Keyrilainen et al., "Phase contrast X-ray imaging of breast," Acta Radiologica, vol. 51 (8), (2010), pp. 866-884. Jan. 18, 2010 pub Jun. 15, 2010.
Kidalov et al., "Thermal Conductivity of Diamond Composites," Materials, vol. 2 (2009) pp. 2467-2495.
Kido et al., "Bone Cartilage Imaging with X-ray Interferometry using a Practical X-ray Tube", in Medical Imaging 2010: Physics of Medical Imaging, Proc. SPIE vol. 7622 (2010), 762240.
Kim, "Talbot images of wavelength-scale amplitude gratings," Opt. Express vol. 20(5), (2012), pp. 4904-4920.
Kim et al., "Observation of the Talbot Effect at Beamline 6C Bio Medical Imaging of he Pohang Light Source—II," J. Korean Phys. Soc., vol. 74, No. 10, pp. 935-940 (May 2019).
Kirkpatrick et al., "Formation of Optical Images by X-Rays", J. Opt. Soc. Am. vol. 38(9) (1948), pp. 766-774.
Kirz, "Phase zone plates for x rays and the extreme uv," J. Op. Soc. Am. vol. 64 (Mar. 1974), pp. 301-309.
Kirz et al., "The History and Future of X-ray Microscopy", J. Physics: Conden. Series vol. 186 (2009): 012001.
Kiyohara et al., "Development of the Talbot-Lau Interferometry System Available for Clinical Use", in International Workshop on X-ray and Neutron Phase Imaging with Gratings, AIP Cong. Proc. vol. 1466, (2012), pp. 97-102.
Klockenkämper et al., "7.1 Instrumental Developments" and "7.3 Future Prospects by Combinations," from Chapter 7 of Total Reflection X-ray Fluorescence Analysis and Related Methods 2nd Ed. (J. Wiley and Sons, Hoboken, NJ, 2015).
Klockenkämper et al., "Chapter 3: Instrumentation for TXRF and GI-XRF," Total Reflection X-ray Fluorescence Analysis and Related Methods 2nd Ed. (J. Wiley and Sons, Hoboken, NJ, 2015).
Kottler et al., "A two-directional approach for grating based differential phase contrast imaging using hard x-rays," Opt. Express vol. 15(3), (2007), pp. 1175-1181.
Kottler et al., "Dual energy phase contrast x-ray imaging with Talbot-Lau interferometer," J. Appl. Phys. vol. 108(11), (2010), 114906. Jul. 7, 2010 pub Dec. 7, 2010.
Kumakhov et al., "Multiple reflection from surface X-ray optics," Physics Reports, vol. 191(5), (1990), pp. 289-350.
Kumakhov, "X-ray Capillary Optics. History of Development and Present Status" in Kumakhov Optics and Application, Proc. SPIE 4155 (2000), pp. 2-12.
Kuwabara et al., "Hard-X-ray Phase-Difference Microscopy with a Low-Brilliance Laboratory X-ray Source", Appl. Phys. Express vol. 4 (2011) 062502.
Kuznetsov, "X-Ray Optics Calculator," Institute of Microelectronics Technology and High Purity Materials, Russian Academy of Sciences (IMT RAS), Chernogolovka, Russia (6 pages submitted); 2016.
Lagomarsino et al., "Reflective Optical Arrays," Ch. 19 of "Modern Developments in X-Ray and Neutron Optics," A. Erko et al. eds. (Springer, Berlin, Germany, 2008), pp. 307-317.
Lai, "X-Ray Microfocusing Optics," Slide Presentation from Argonne National Laboratory, 71 slides, Cheiron Summer School 2007.
Langhoff et al., "X-ray Sources," Ch. 2 of "Handbook of Practical X-Ray Fluorescence Analysis," B. Beckhoff et al., eds. (Springer, Berlin Heidelberg New York, 2006), pp. 33-82.
Lechner et al., "Silicon drift detectors for high count rate X-ray spectroscopy at room temperature," Nuclear Instruments and Methods, vol. 458A (2001), pp. 281-287.
Leenaers et al., "Application of Glancing Incidence X-ray Analysis," 1997, X-ray Spectrometry, vol. 26, pp. 115-121.
Lengeler et al., "Refractive X-ray Optics," Ch. 20 of "Handbook of Optics vol. III, 2nd Ed." (McGraw Hill, New York, 2001.
Li et al., "Source-optic-crystal optimisation for compact monochromatic imaging," Proc. SPIE 5537 (2004), pp. 105-114.
Li et al., "X-ray phase-contrast imaging using cascade Talbot-Lau interferometers," Proc. SPIE 10964 (2018), pp. 1096469-1-1096469-6.
Li et al., "Study on High Thermal Conductivity of X-ray Anode with Composite Diamond Substrate," J. Phys.: Conf. Ser., vol. 1300, 012115 (2019).
Lohmann et al., "An interferometer based on the Talbot effect," Optics Communications vol. 2 (1971), pp. 413-415.
Lübcke et al., "Soft X-ray nanoscale imaging using a sub-pixel resolution charge coupled device (CCD) camera," Ref. Sci. Instrum. vol. 90, 043111 (2019).
Lühl et al., "Scanning transmission X-ray microscopy with efficient X-ray fluorescence detection (STXM-XRF) for biomedical applications in the soft and tender energy range," J. Synch. Rad. vol. 26, https://doi.org/10.1107/S1600577518016879, (2019).
MacDonald et al., "An Introduction to X-ray and Neutron Optics," Ch. 19 of "Handbook of Optics vol. III, 2nd Ed." (McGraw Hill, New York, 2001).
MacDonald et al., "Polycapillary and Multichannel Plate X-Ray Optics," Ch. 30 of "Handbook of Optics vol. III, 2nd Ed.," (McGraw Hill, New York, 2001).
MacDonald et al., "Polycapillary X-ray Optics for Microdiffraction," J. Appl. Cryst., vol. 32 (1999) pp. 160-167.
MacDonald, "Focusing Polycapillary Optics and Their Applications," X-Ray Optics and Instrumentation, vol. 2010, (Oct. 2010): 867049.
Maj et al., "Etching methods for improving surface imperfections of diamonds used for x-ray monochromators," Adv. X-ray Anal., vol. 48 (2005), pp. 176-182.
Malgrange, "X-ray Optics for Synchrotron Radiation," ACTA Physica Polonica A, vol. 82(1) (1992) pp. 13-32.
Malzer et al., "A laboratory spectrometer for high throughput X-ray emission spectroscopy in catalysis research," Rev. Sci. Inst. 89, 113111 (2018).
Masuda et al., "Fabrication of Through-Hole Diamond Membranes by Plasma Etching Using Anodic Porous Alumina Mask," Electrochemical and Solid-State Letters, vol. 4(11) (2001) pp. G101-G103.
Matsushita, "Mirrors and Multilayers," Slide Presentation from Photon Factor, Tsukuba, Japan, 65 slides, (Cheiron School 2009, Sprint-8, Japan, Nov. 2009).
Matsushita, "X-ray monochromators," Slide Presentation from Photon Factory, Tsukuba, Japan, 70 slides, (Cheiron School 2009, Spring-8, Japan, Nov. 2009).
Matsuyama et al., "Wavefront measurement for a hard-X-ray nanobeam using single-grating interferometry", Opt Express vol. 20 (2012), pp. 24977-24986.
Miao et al., "Motionless phase stepping in X-ray phase contrast imaging with a compact source," Proceedings of the National Academy of Sciences, vol. 110(48), (2013), pp. 19268-19272.
Michette, "Zone and Phase Plates, Bragg-Fresnel Optics," Ch. 23 of "Handbook of Optics vol. III, 2nd Ed.," (McGraw Hill, New York, 2001).
Mizutani et al., X-ray microscopy for neural circuit reconstruction in 9th International Conference on X-Ray Microscopy, J. Phys: Conf. Ser. 186 (2009) 012092.
Modregger et al., "Grating-Based X-ray Phase Contrast Imaging," Ch. 3 of Emerging Imaging Technologies in Medicine, M. Anastasio & P. La Riviera, ed., CRC Press, Boca Raton, FL, (2012), pp. 43-56.

(56) References Cited

OTHER PUBLICATIONS

Momose et al., "Biomedical Imaging by Talbot-Type X-Ray Phase Tomography" in Developments in X-Ray Tomography V, Proc. SPIE vol. 6318 (2006) 63180T.
Momose et al., "Grating-Based X-ray Phase Imaging Using Multiline X-ray Source", Jpn. J. Appl. Phys. vol. 48 (2009), 076512.
Momose et al., "Phase Tomography by X-ray Talbot Interferometry for Biological Imaging" Jpn. J. Appl. Phys. vol. 45 2006 pp. 5254-5262.
Momose et al., "Phase Tomography Using X-ray Talbot Interferometer", in Synchrotron Radiation Instrumentation: Ninth International Conference, AIP Conf. Proc. vol. 879 (2007), pp. 1365-1368.
Momose et al., "Phase-Contrast X-Ray Imaging Using an X-Ray Interferometer for Biological Imaging", Analytical Sciences vol. 17 Supplement (2001), pp. i527-i530.
Momose et al., "Sensitivity of X-ray Phase Imaging Based on Talbot Interferometry", Jpn. J. Appl. Phys. vol. 47 (2008), pp. 8077-8080.
Momose et al., "X-ray Phase Measurements with Talbot Interferometry and Its Applications", in International Conference on Advanced Phase Measurement Methods in Optics and Imaging, AIP Conf. Proc. vol. 1236 (2010), pp. 195-199.
Momose et al., "X-ray Phase Imaging—From Static Observation to Dynamic Observation—", in International Workshop on X-ray and Neutron Phase Imaging with Gratings AIP Conf. Proc. vol. 1466, (2012), pp. 67-77.
Momose et al., "X-ray Phase Imaging Using Lau Effect", Appl. Phys. Express vol. 4 (2011) 066603.
Momose et al., "X-Ray Phase Imaging with Talbot Interferometry", in "Biomedical Mathematics: Promising Directions in Imaging, Therapy Planning, and Inverse Problems", Y. Censor, M. Jiang & G.Wang, eds. (Medical Physics Publishing, Madison, WI, USA, 2010), pp. 281-320.
Momose et al., "X-ray phase tomography with a Talbot interferometer in combination with an X-ray imaging microscope", in 9th International Conference on X-Ray Microscopy, J. Phys: Conf. Ser. 186 (2009) 012044.
Momose et al., "X-ray Talbot Interferometry with Capillary Plates", Jpn. J. Appl. Phys. vol. 45 (2006), pp. 314-316.
Momose et al., "Four-dimensional X-ray phase tomography with Talbot interferometry and white synchrotron radiation: dynamic observation of a living worm", Opt. Express vol. 19 (2011), pp. 8423-8432.
Momose et al., "High-speed X-ray phase imaging and X-ray phase tomography with Talbot interferometer and white synchrotron radiation", Opt. Express vol. 17 (2009), pp. 12540-12545.
Momose et al., "Phase Imaging with an X-ray Talbot Interferometer", Advances in X-ray Analysis vol. 49(3) (2006), pp. 21-30.
Momose et al.,"Demonstration of X-Ray Talbot Interferometry", Jpn. J. Appl. Phys. vol. 42 (2003), pp. L866-L868.
Momose et al.,"Phase Tomography Using an X-ray Talbot Interferometer", in Developments in X-Ray Tomography IV, Proc. SPIE vol. 5535 (2004), pp. 352-360.
Momose, "Recent Advances in X-ray Phase Imaging", Jpn. J. Appl. Phys. vol. 44 (2005), pp. 6355-6367.
Montgomery, "Self Imaging Objects of Infinite Aperture," J. Opt. Soc. Am. vol. 57(6), (1967), pp. 772-778.
Morimoto et al., "Development of multiline embedded X-ray targets for X-ray phase contrast imaging," XTOP 2012 Book of Abstracts, (Ioffe Physical-Technical Institute of the Russian Academy of Sciences, St. Petersburg, Russia, 2012), pp. 74-75.
Morimoto et al., "X-ray phase contrast imaging by compact Talbot-Lau interferometer with a signal transmission grating," 2014, Optics Letters, vol. 39, No. 15, pp. 4297-4300.
Morimoto et al., "Design and demonstration of phase gratings for 2D single grating interferometer," Optics Express vol. 23, No. 23, 29399 (2015).
Munro et al., Design of a novel phase contrast imaging system for mammography, 2010, Physics in Medicine and Biology, vol. 55, No. 14, pp. 4169-4185.

Nango et al., "Talbot-defocus multiscan tomography using the synchrotron X-ray microscope to study the lacuno-canalicular network in mouse bone", Biomed. Opt. Express vol. 4 (2013), pp. 917-923.
Neuhausler et al., "Non-destructive high-resolution X-ray imaging of ULSI micro-electronics using keV X-ray microscopy in Zernike phase contrast," Microelectronic Engineering, Elsevier Publishers. BV., Amsterdam, NO, vol. 83, No. 4-9 (Apr. 1, 2006) pp. 1043-1046.
Newville, "Fundamentals of XAFS," (Univ. of Chicago, Chicago, IL, Jul. 23, 2004).
Noda et al., "Fabrication of Diffraction Grating with High Aspect Ratio Using X-ray Lithography Technique for X-ray Phase Imaging," Jpn. J. Appl. Phys. vol. 46, (2007), pp. 849-851.
Noda et al., "Fabrication of High Aspect Ratio X-ray Grating Using X-ray Lithography" J. Solid Mech_ Mater. Eng. vol. 3 (2009), pp. 416-423.
Nojeh, "Carbon Nanotube Electron Sources: From Electron Beams to Energy Conversion and Optophononics", ISRN Nanomaterials vol. 2014 (2014): 879827.
Nuhn, "From storage rings to free electron lasers for hard x-rays", J.A37 Phys.: Condens. Matter vol. 16 (2004), pp. S3413-S34121.
Nykanen et al., "X-ray scattering in full-field digital mammography," Med. Phys. vol. 30(7), (2003), pp. 1864-1873.
Oji et al., Automatic XAFS measurement system developed at BL14B2 in SPring-8, Available online Nov. 15, 2011, Journal of Synchrotron Radiation, vol. 19, pp. 54-59.
Olbinado et al., "Demonstration of Stroboscopic X-ray Talbot Interferometry Using Polychromatic Synchrotron and Laboratory X-ray Sources", Appl. Phys. Express vol. 6 (2013), 096601.
Ortega et al., "Bio-metals imaging and speciation in cells using proton and synchrotron radiation X-ray microspectroscopy," J. Royal Society Interface vol. 6 suppl. 5 (Oct. 6, 2009), pp. 6S649-6S658.
Otendal et al., A 9 keV electron-impact liquid-gallium-jet x-ray source, Rev. Sci. Instrum. vol. 79 (2008): 016102.
Oxford Instruments Inc., Series 5000 Model XTF5011 X-ray Tube information, Jun. 1998, 3 pages.
Parrill et al., "GISAXS—Glancing Incidence Small Angle X-ray Scattering," Journal de Physique IV, vol. 3 (Dec. 1993), pp. 411-417.
Paxscan Flat Panel X-ray Imaging, Varian Sales Brochure, (Varian Medical Systems, Palo Alto, CA, Nov. 11, 2004).
Pfeiffer et al., "Hard-X-ray dark-field imaging using a grating interferometer," Nature Materials vol. 7, (2008), pp. 134-137.
Pfeiffer et al., "Hard x-ray phase tomography with low brilliance x-ray sources," Phys. Rev. Lett. vol. 98, (2007), 108105.
Pfeiffer et al., "Phase retrieval and differential phase-contrast imaging with low-brilliance X-ray sources," Nature Physics vol. 2, (2006), pp. 258-261.
Pfeiffer, "Milestones and basic principles of grating-based x-ray and neutron phase-contrast imaging," in International Workshop on X-ray and Neutron Phase Imaging with Gratings AIP Conf. Proc. vol. 1466, (2012), pp. 2-11.
Pianetta et al., "Application of synchrotron radiation to Txrf analysis of metal contamination on silicon wafer surfaces," Thin Solid Films, vol. 373(1-2), 2000, pp. 222-226.
Potts, "Electron Probe Microanalysis", Ch. 10 of "A Handbook of Silicate Rock Analysis" (Springer Science + Business Media, New York, 1987), pp. 326-382 (equation quoted from p. 336).
Prewitt et al., "FIB Repair of 5X Reticles and Effects on IC Quality," Integrated Circuit Metrology, Inspection, and Process Control VII, Proc. SPIE vol. 1926 (1993), pp. 517-526.
Prewitt et al., "Focused ion beam repair: staining of photomasks and reticles," J. Phys. D Appl. Phys. vol. 26 (1993), pp. 1135-1137.
Prewitt et al., "Gallium Staining in FIB Repair of Photomasks," Microelectronic Engineering, vol. 21 (1993), pp. 191-196.
Pushie et al., "Elemental and Chemically Specific X-ray Fluorescence Imaging of Biological Systems," Chem. Rev. 114:17, 8499-8541 (2014).
Pushie et al., "Prion protein expression level alters regional copper, iron and zinc content in the mouse brain," Metallomics vol. 3, 206-214 (2011).

(56) References Cited

OTHER PUBLICATIONS

Qin et al., "Trace metal imaging with high spatial resolution: Applications in biomedicine," Metallomics, vol. 3 (Jan. 2011), pp. 28-37.
Rayleigh, "On copying diffraction gratings and some phenomena connected therewith," Philos. Mag. vol. 11 (1881), pp. 196-205.
Renaud et al., "Probing surface and interface morphology with Grazing Incidence Small Angle X-ray Scattering," Surface Science Reports, vol. 64:8 (2009), pp. 255-380.
Riege, "Electron Emission from Ferroelectrics—A Review", CERN Report CERN AT/93-18 (CERN, Geneva, Switzerland, Jul. 1993).
Rix et al., "Super-Resolution X-ray phase-contrast and dark-field imaging with a single 2D grating and electromagnetic source stepping," Phys. Med. Biol. in press https://doi.org/10.1088/1361-6560/ab2ff5 (2019).
Röntgen, "Ueber eine neue Art von Strahlen (Wurzburg Verlag, Wurzburg, Germany, 1896) also, in English, On a New Kind of Rays," Nature vol. 53 (Jan. 23, 1896). pp. 274-276.
Rovezzi, "Study of the local order around magnetic impurities in semiconductors for spintronics." PhD Dissertation, Condensed Matter, Universite Joseph-Fourier—Grenoble I, 2009, English <tel-00442852>.
Rutishauser, "X-ray grating interferometry for imaging and metrology," 2003, Eth Zurich, Diss. ETH No. 20939.
Sato et al., Two-dimensional gratings-based phase-contrast imaging using a conventional x-ray tube, 2011, Optics Letters, vol. 36, No. 18, pp. 3551-3553.
Scherer et al., "Bi-Directional X-Ray Phase-Contrast Mammography," PLoS ONE, vol. 9, Issue 5 (May 2014) e93502.
Scholz, "X-ray Tubes and Monochromators," Technical Workshop EPIC, Universität Würzburg (2007); 41 slides, 2007.
Scholze et al., "X-ray Detectors and XRF Detection Channels," Ch. 4 of "Handbook of Practical X-Ray Fluorescence Analysis," B. Beckhoff et al., eds. (Springer, Berlin Heidelberg, Germany, 2006), pp. 85-198.
Scordo et al., "Pyrolitic Graphite Mosaic Drystal Thickness and Mosaicity Optimization for an Extended Source Von Hamos X-ray Spectrometer," Condens. Matter Vo. 4, pp. 38-52 (2019).
Scott, "Hybrid Semiconductor Detectors for High Spatial Resolution Phase-contrast X-ray Imaging," Thesis, University of Waterloo, Department of Electrical and Computer Engineering, 2019.
Sebert, "Flat-panel detectors:how much better are they?" Pediatr. Radiol. vol. 36 (Suppl 2), (2006), pp. 173-181.
Seifert et al., "Talbot-Lau x-ray phase-contrast setup for fast scanning of large samples," Sci. Rep. 9:4199, pp. 1-11 (2019).
Shen, "Polarizing Crystal Optics," Ch. 25 of "Handbook of Optics vol. III, 2nd Ed.," (McGraw Hill, New York, 2001).
Shields et al., "Overview of Polycapillary X-ray Optics," Powder Diffraction, vol. 17(2) (Jun. 2002), pp. 70-80.
Shimura et al., "Hard x-ray phase contrast imaging using a tabletop Talbot-Lau interferometer with multiline embedded x-ray targets", Opt. Lett. vol. 38(2) (2013), pp. 157-159.
Siddons, "Crystal Monochromators and Bent Crystals," Ch. 22 of "Handbook of Optics vol. III, 2nd Ed.," (McGraw Hill, New York, 2001).
Smith, "Fundamentals of Digital Mammography:Physics, Technology and Practical Considerations," Publication R-BI-016 (Hologic, Inc., Bedford, MA, Mar. 2005).
Snigirev et al., "Hard X-Ray Microoptics," Ch. 17 of "Modern Developments in X-Ray and Neutron Optics," A. Erko et al., eds (Springer, Berlin, Germany, 2008), pp. 255-285.
Sparks Jr., "X-ray Fluorescence Microprobe for Chemical Analysis," in Synchrotron Radiation Research, H. Winick & S. Doniach, eds. (Plenum Press, New York, NY 1980), pp. 459-512.
Spiller, "Multilayers," Ch. 24 of "Handbook of Optics vol. III, 2nd Ed.," (McGraw Hill, New York, 2001).
Stampanoni et al., "The First Analysis and Clinical Evaluation of Native Breast Tissue Using Differential Phase-Contrast Mammography," Investigative Radiology, vol. 46, pp. 801-806. pub Dec. 2011.
Strüder et al., "Silicon Drift Detectors for X-ray Imaging," Presentation at Detector Workshop on Synchrotron Radiation Instrumentation, 54 slides, (Argonne Nat'l Lab, Argonne, IL Dec. 8, 2005), available at: <http://www.aps.anl.gov/News/Gonferences/2005/Synchrotron_Radiation_Instrumentation/Presentations/Strueder.pdf>.
Strüder et al., "X-Ray Detectors," Ch. 4 of "X-ray Spectrometry: Recent Technological Advances," K. Tsuji et al. eds. (John Wiley & Sons, Ltd. Chichester, West Sussex, UK, 2004), pp. 63-131.
Stupple et al., "Modeling of Heat Transfer in an Aluminum X-Ray Anode Employing a Chemical Vapor Deposited Diamond Heat Spreader," J. Heat Transfer, Vo. 140, 124501-1-5 (Dec. 2018).
Sun et al., "Combined optic system based on polycapillary X-ray optics and single-bounce monocapillary optics for focusing X-rays from a conventional laboratory X-ray source," Nucl. Inst. and Methods in Phys. Res. A 802 (2015) pp. 5-9.
Sun et al., "Numerical design of in-line X-ray phase-contrast imaging based on ellipsoidal single-bounce monocapillary," Nucl. Inst. And Methods in Phys. Res. A746 (2014) pp. 33-38.
Sunday et al., "X-ray Metrology for the Semiconductor Industry Tutorial," J. Res. Nat'l Inst. Stan. vol. 124: 124003 (2019); https://doi.org/10.6028/jres.124.003.
Suzuki et al., "Hard X-ray Imaging Microscopy using X-ray Guide Tube as Beam Condenser for Field Illumination," J. Phys.: Conf. Ser. vol. 463 (2013): 012028.
Suzuki, "Development of the DIGITEX Safire Cardiac System Equipped with Direct conversion Flat Panel Detector," Digital Angio Technical Report (Shimadzu Corp., Kyoto, Japan, no date, published 2004 with product release).
Takahama, "RADspeed safire Digital General Radiography System Equipped with New Direct-Conversion FPD," Medical Now, No. 62 (2007).
Takeda et al., "Differential Phase X-ray Imaging Microscopy with X-ray Talbot Interferometer" Appl. Phys. Express vol. 1 (2008) 117002.
Takeda et al., "X-Ray Phase Imaging with Single Phase Grating", Jpn. J. Appl. Phys. vol. 46 (2007), pp. L89-L91.
Takeda et al., "In vivo physiological saline-infused hepatic vessel imaging using a two-crystal-interferometer-based phase-contrast X-ray technique", J. Synchrotron Radiation vol. 19 (2012), pp. 252-256.
Talbot, "Facts relating to optical science No. IV," Philos. Mag. vol. 9 (1836), pp. 401-407.
Tanaka et al., "Cadaveric and in vivo human joint imaging based on differential phase contrast by X-ray Talbot-Lau interferometry", Z. Med. Phys. vol. 23 (2013), pp. 222-227.
Tang et al., "Micro-computed tomography (Micro-CT): a novel approach for intraoperative breast cancer specimen imaging," Breast Cancer Res. Treat. vol. 139, pp. 311-316 (2013).
Taniguchi et al., "Diamond nanoimprint lithography," Nanotechnology, vol. 13 (2002) pp. 592-596.
Terzano et al., Recent advances in analysis of trace elements in environmental samples by X-ray based techniques (IUPAC Technical Report), Pure Appl. Chem. 2019.
Tkachuk et al., "High-resolution x-ray tomography using laboratory sources", in Developments in X-Ray Tomography V, Proc. SPIE 6318 (2006): 631810.
Tkachuk et al., "Multi-length scale x-ray tomography using laboratory and synchrotron sources", Microsc. Microanal. vol. 13 (Suppl. 2) (2007), pp. 1570-1571.
Töpperwien et al., "Multiscale x-ray phase-contrast tomography in a mouse model of transient focal cerebral ischemia," Biomed. Op. Express, vol. 10, No. 1, Jan. 2019, pp. 92-103.
Touzelbaev et al., "Applications of micron-scale passive diamond layers for the integrated circuits and microelectromechanical systems industries," Diamond and Rel. Mat'ls, vol. 7 (1998) pp. 1-14.
Tsuji et al., "X-Ray Spectrometry: Recent Technological Advances," John Wiley & Sons Ltd. Chichester, West Susses, UK 2004), Chapters 1-7.
Udagawa, "An Introduction to In-House EXAFS Facilities," The Rigaku Journal, vol. 6, (1) (1989), pp. 20-27.
Udagawa, "An Introduction to X-ray Absorption Fine Structure," The Rigaku Journal, vol. 11(2)(1994), pp. 30-39.

(56) References Cited

OTHER PUBLICATIONS

Uehara et al., "Effectiveness of X-ray grating interferometry for non-destructive inspection of packaged devices", J. Appl. Phys. vol. 114 (2013), 134901.
Viermetz et al., "High resolution laboratory grating-based X-ray phase-contrast CT," Scientific Reports 8:15884 (2018).
Vogt, "X-ray Fluorescence Microscopy: A Tool for Biology, Life Science and Nanomedicine," Presentation on May 16, 2012 at James Madison Univ., Harrisonburg, VA (31 slides), 2012.
Wan et al.,"Fabrication of Multiple Slit Using Stacked-Sliced Method for Hard X-ray Talbot-Lau Interferometer", Jpn. J. Appl. Phys. vol. 47 (2008), pp. 7412-7414.
Wang et al., "Advantages of intermediate X-ray energies in Zernike phase contrast X-ray microscopy," Biotech. Adv., vol. 31 (2013) pp. 387-392.
Wang et al., "Non-invasive classification of microcalcifications with phase-contrast X-ray mammography," Nature Comm. vol. 5:3797, pp. 1-9 (2014).
Wang, On the single-photon-counting (SPC) modes of imaging using an XFEL source, presented at IWORLD2015.
Wang et al., "Precise patterning of diamond films for MEMS application" Journal of Materials Processing Technology vol. 127 (2002), pp. 230-233.
Wang et al., "Measuring the average slope error of a single-bounce ellopsoidal glass monocapillary X-ray condenser based on an X-ray source with an adjustable source size," Nucl. Inst. And Meth. A934, 36-40 (2019).
Wang et al., "High beam-current density of a 10-keV nano-focus X-ray source," Nucl. Inst. and Meth. A940, 475-478 (2019).
Wansleben et al., "Photon flux determination of a liquid-metal jet x-ray source by means of photon scattering," arXiv:1903.06024v1, Mar. 14, 2019.
Weitkamp et al., "Design aspects of X-ray grating interferometry," In International Workshop on X-ray and Neutron Phase Imaging with Gratings AIP Conf. Proc. vol. 1466, (2012), pp. 84-89.
Weitkamp et al., "Hard X-ray phase imaging and tomography with a grating interferometer," Proc. SPIE vol. 5535, (2004), pp. 137-142.
Weitkamp et al., "X-ray wavefront diagnostics with Talbot interferometers," International Workshop on X-Ray Diagnostics and Scientific Application of the European XFEL, Ryn, Poland, (2010), 36 slides.
Wen et al., "Fourier X-ray Scattering Radiography Yields Bone Structural Information," Radiology, vol. 251 (2009) pp. 910-918.
Wen et al., "Single-shot x-ray differential phase-contrast and diffraction imaging using two-dimensional transmission gratings," Op. Lett. vol. 35, No. 12, (2010) pp. 1932-1934.
Wittry et al., "Properties of fixed-position Bragg diffractors for parallel detection of x-ray spectra," Rev. Sci. Instr. vol. 64, pp. 2195-2200 (1993).
Wobrauschek et al., "Energy Dispersive, X-Ray Fluorescence Analysis," Encyclopedia of Analytical Chemistry, R.A. Meyers, Ed. (Wiley 2010).
Wobrauschek et al., "Micro XRF of light elements using a polycapillary lens and an ultra-thin window Silicon Drift Detector inside a vacuum chamber," 2005, International Centre for Diffraction Data 2005, Advances in X-ray Analysis, vol. 48, pp. 229-235.
Wolter, "Spiegelsysteme streifenden Einfalls als abbildende Optiken fur Rontgenstrahlen" [Grazing Incidence Reflector Systems as Imaging Optics for X-rays] Annalen der Physik vol. 445, Issue 1-2 (1952), pp. 94-114.
X-ray-Optics.de Website, http://www.x-ray-optics.de/, accessed Feb. 13, 2016.
Yakimchuk et al., "Ellipsoidal Concentrators for Laboratory X-ray Sources: Analytical approaches for optimization," Mar. 22, 2013, Crystallography Reports, vol. 58, No. 2, pp. 355-364.
Yamamoto, "Fundamental physics of vacuum electron sources", Reports on Progress in Physics vol. 69, (2006), pp. 181-232.
Yanagihara et al., "X-Ray Optics," Ch. 3 of "X-ray Spectrometry: Recent Technological Advances," K. Tsuji et al. eds. (John Wiley & Sons, Ltd. Chichester, West Sussex, UK, 2004), pp. 63-131.
Yang et al., "Analysis of Intrinsic Stress in Diamond Films by X-ray Diffraction," Advances in X-ray Analysis, vol. 43 (2000), pp. 151-156.
Yashiro et al., "Distribution of unresolvable anisotropic microstructures revealed in visibility-contrast images using x-ray Talbot interferometry", Phys. Rev. B vol. 84 (2011), 094106.
Yashiro et al., "Hard x-ray phase-imaging microscopy using the self-imaging phenomenon of a transmission grating", Phys. Rev. A vol. 82 (2010), 043822.
Yashiro et al., "Theoretical Aspect of X-ray Phase Microscopy with Transmission Gratings" in International Workshop on X-ray and Neutron Phase Imaging with Gratings, AIP Conf. Proc. vol. 1466, (2012), pp. 144-149.
Yashiro et al., "X-ray Phase Imaging and Tomography Using a Fresnel Zone Plate and a Transmission Grating", in "The 10th International Conference on X-ray Microscopy Radiation Instrumentation", AIP Conf. Proc. vol. 1365 (2011) pp. 317-320.
Yashiro et al., "Efficiency of capturing a phase image using cone-beam x-ray Talbot interferometry", J. Opt. Soc. Am. A vol. 25 (2008), pp. 2025-2039.
Yashiro et al., "On the origin of visibility contrast in x-ray Talbot interferometry", Opt. Express (2010), pp. 16890-16901.
Yashiro et al., "Optimal Design of Transmission Grating for X-ray Talbot Interferometer", Advances in X-ray Analysis vol. 49(3) (2006), pp. 375-379.
Yashiro et al., "X-ray Phase Imaging Microscopy using a Fresnel Zone Plate and a Transmission Grating", in the 10th International Conference on Synchrotron Radiation Instrumentation, AIP Conf. Proc. vol. 1234 (2010), pp. 473-476.
Yashiro et. al., "Hard-X-Ray Phase-Difference Microscopy Using a Fresnel Zone Plate and a Transmission Grating", Phys. Rev. Lett. vol. 103 (2009), 180801.
Yu et al., "Morphology and Microstructure of Tungsten Films by Magnetron Sputtering," Mat. Sci. Forum, vol. 913, pp. 416-423 (2018).
Zanette et al., "Two-Dimensional X-Ray Grating interferometer," Phys. Rev. Lett. vol. 105 (2010) pp. 248102-1 248102-4.
Zeeshan et al., "In-house setup for laboratory-based x-ray absorption fine structure spectroscopy measurements," Rev. Sci. Inst. 90, 073105 (2019).
Zeng et al., "Ellipsoidal and parabolic glass capillaries as condensers for x-ray microscopes," Appl. Opt. vol. 47 (May 2008), pp. 2376-2381.
Zeng et al., "Glass Monocapillary X-ray Optics and Their Applications in X-Ray Microscopy," X-ray Optics and Microanalysis: Proceedings of the 20th International Congress, AIP Conf. Proc. vol. 1221, (2010), pp. 41-47.
Zhang et al., "Application of confocal X-ray fluorescence based on capillary X-ray optics in nondestructively measuring the inner diameter of monocapillary optics," Optics Comm. (2018) https://doi.org/10.1016/j.optcom.2018.11.064.
Zhang et al., "Fabrication of Diamond Microstructures by Using Dry and Wet Etching Methods", Plasma Science and Technology vol. 15(6) (Jun. 2013), pp. 552-554.
Zhang et al., "Measurement of the inner diameter of monocapillary with confocal X-ray scattering technology based on capillary X-ray optics," Appl. Opt. (Jan. 8, 2019), doc ID 351489, pp. 1-10.
Akan et al., "Metal-Assisted Chemical Etching and Electroless Deposition for Fabrication of Hard X-ray Pd/Si Zone Plates," Micromachines, vol. 11, 301; doi:10.3390/mi11030301 (2020).
Hashimoto et al., "Improved reconstruction method for phase stepping data with stepping errors and dose fluctuations," Optics Express, vol. 28, No. 11, pp. 16363-16384 (2020).
Momose et al., "Recent Progress in X-ray and Neutron Phase Imaging with Gratings," Quantum Beam Science, vol. 4, No. 9; doi:10.3390/qubs4010009 (2020).
Takeo et al., "Soft x-ray nanobeam formed by an ellipsoidal mirror," Appl. Phys. Lett., vol. 116, 121102 (2020).

(56) References Cited

OTHER PUBLICATIONS

Wang et al., "Double-spherically bent crystal high-resolution X-ray spectroscopy of spatially extended sources," Chinese Optics Lett., vol. 18(6), 061101 (2020).
Yamada et al., "Compact full-field hard x-ray microscope based on advanced Kirkpatrick-Baez mirrors," Optica, vol. 7, No. 4 pp. 367-370 (2020).
Yoshioka et al., "Imaging evaluation of the cartilage in rheumatoid arthritis patients with an x-ray phase imaging apparatus based on Talbot-Lau interferometry," Scientific Reports, 10:6561, https://doi.org/10.1038/s41598-020-63155-9 (2020).
International Search Report and Written Opinion in corresponding PCT Application No. PCT/US2019/048808, dated Dec. 18, 2019, in 11 pages.
Behling, "Medical X-ray sources Now and for the Future," Nucl. Inst. and Methods in Physics Research A 873, pp. 43-50 (2017).
Chang et al., "Ultra-high aspect ratio high-resolution nanofabrication of hard X-ray diffractive optics," Nature Comm. 5:4243, doi: 10.1038/ncomms5243 (2014).
Dittler et al., "A mail-in and user facility for X-ray absorption near-edge structure: the CEI-Xanes laboratory X-ray spectrometer at University of Washington," J. Synch. Rad. vol. 26, eight pages, (2019).
Huang et al., "Theoretical analysis and optimization of highly efficient multilayer-coated blazed gratings with high fix-focus constant for the tender X-ray region," Op. Express Vo. 28, No. 2, pp. 821-845 (2020).
Kim et al., "A Simulation Study on the Transfer Characteristics of the Talbot Pattern Through Scintillation Screens in the Grating Interferometer," J. Rad. Sci. and Tech. 42(1), pp. 67-75 (2019).
Kulow et al., "On the Way to Full-Field X-ray Fluorescence Spectroscopy Imaging with Coded Apertures," J. Anal. At. Spectrom. Doi: 10.1039/C9JA00232D (2019).
Li et al., "Production and Heat Properties of an X-ray Reflective Anode Based on a Diamond Heat Buffer Layer," Materials vol. 13, p. 241 (2020).
Weitkamp et al., Tomography with grating interferometers at low-brilliance sources, 2006, SPIE, vol. 6318, pp. 0S-1 to 0S-10.
Weitkamp et al., "X-ray phase imaging with a grating interferometer," Opt. Express vol. 13(16), (2005), pp. 6296-6304.
Weitkamp et al., "X-ray wavefront analysis and optics characterization with a grating interferometer," Appl. Phys. Lett. vol. 86, (2005), 054101.
Zhou et al., "Quasi-parallel X-ray microbeam obtained using a parabolic monocapillary X-ray lens with an embedded square-shaped lead occluder," arXiv:2001.04667 (2020).

FIG. 1:

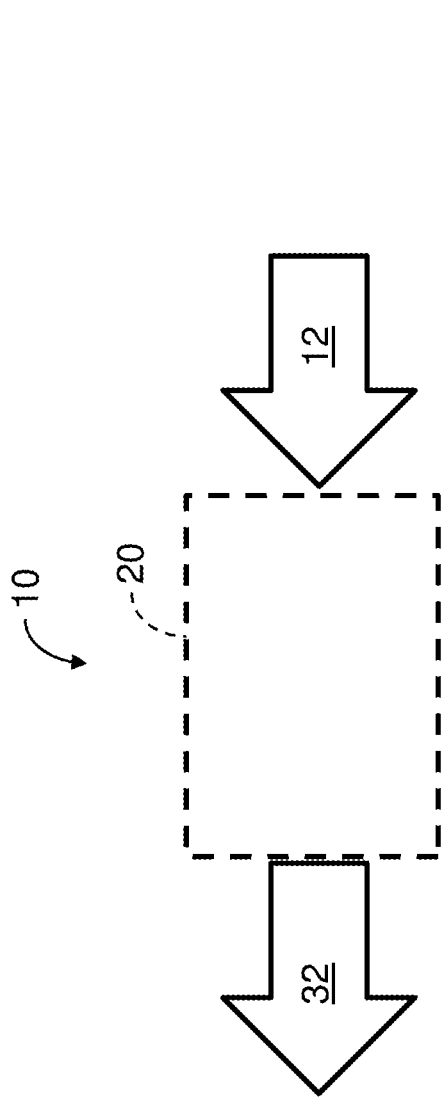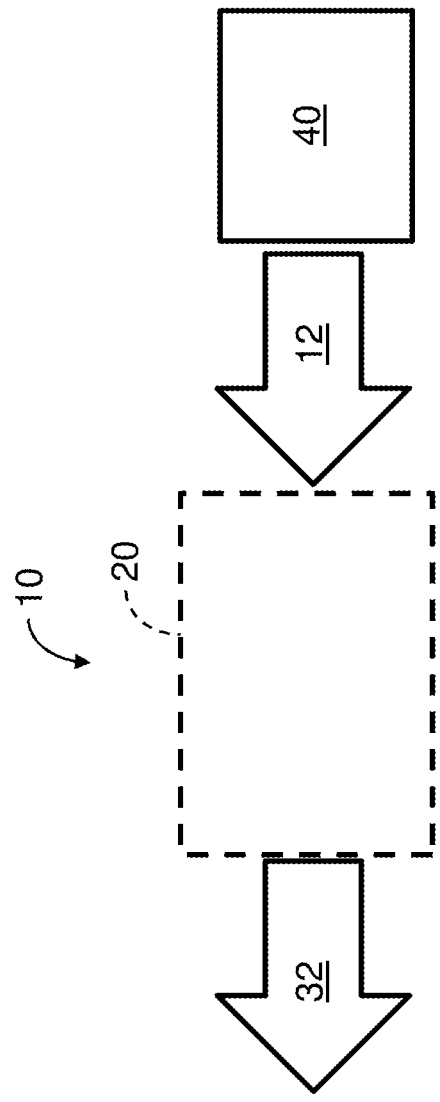
FIG. 2A:
FIG. 2B:

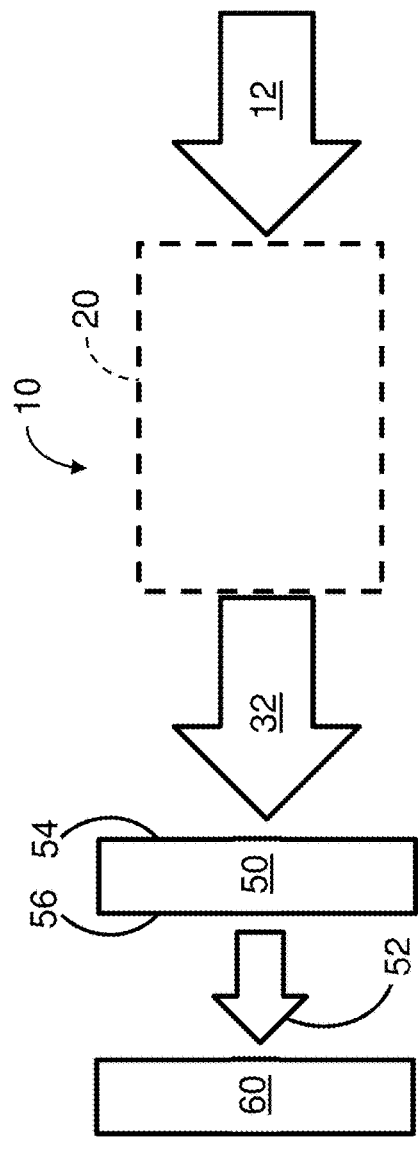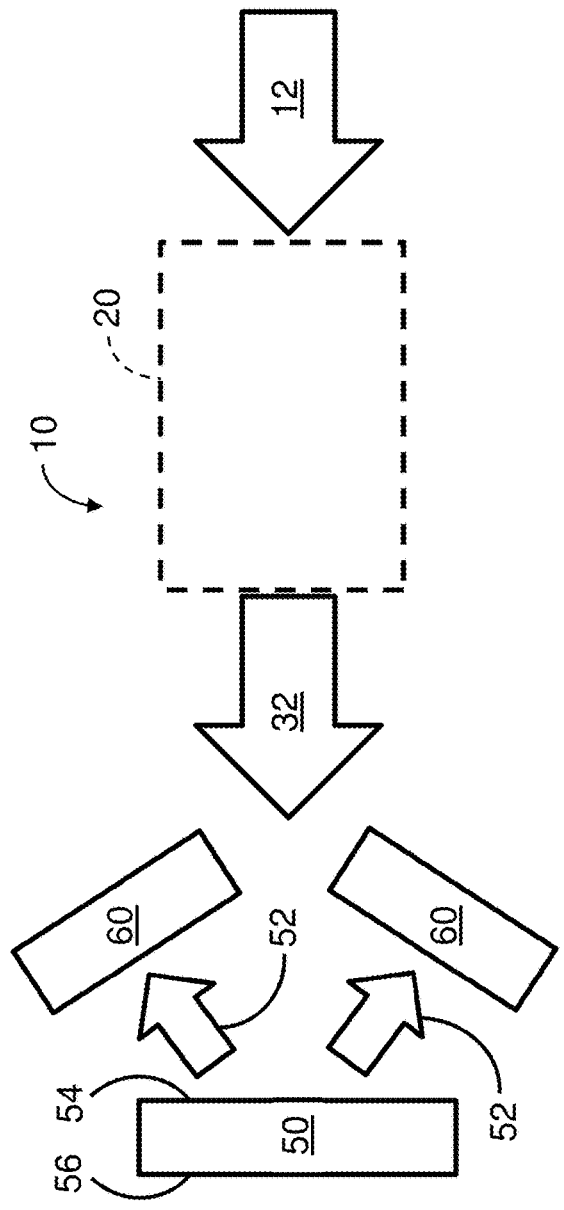

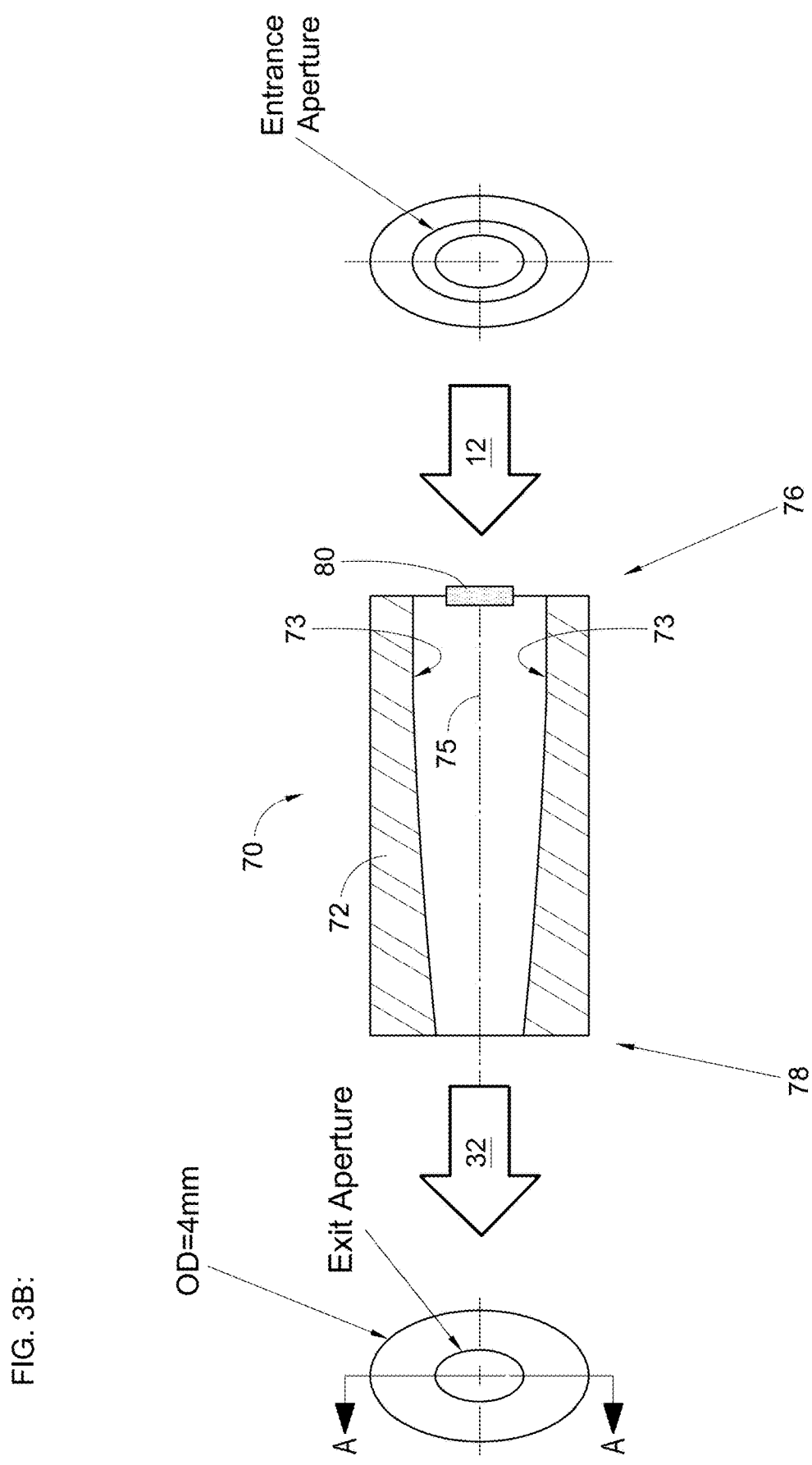

FIG. 6:

| K-line fluorescence cross section (barns/1000) vs. x-ray excitation energy | | | | | |
|---|---|---|---|---|---|
| Element: K-edge ionization (and Kα-line energy) (keV) | | Source Target Excitation Energy | | | Relative Gain in Fluorescence Cross Sections using Au-Line over Mo K lines |
| | Cu (Kα) 8 keV | Au (Lα) 9.7 keV | Au (Lβ) 11.4 keV | Mo (Kα) 17.5 keV | |
| Fe | 7.11 (6.40) | 7.3 | 4.4 | 2.5 | 0.9 | ~3 |
| Cu | 8.98 (8.05) | 0 | 8.5 | 7.0 | 2.0 | ~4 |
| Zn | 9.66 (8.64) | 0 | 9.6 | 8.9 | 2.4 | ~4 |

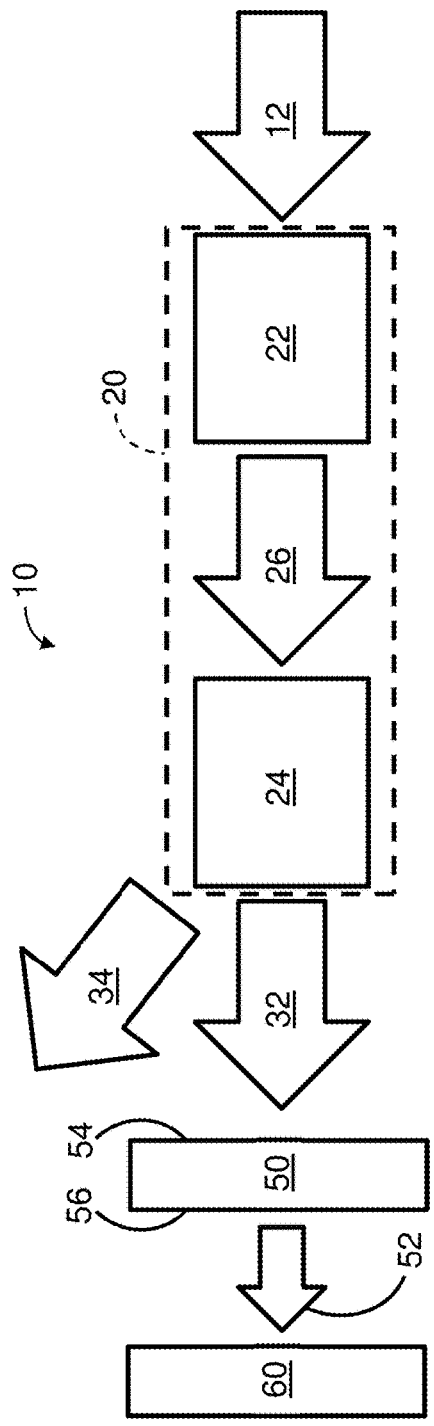
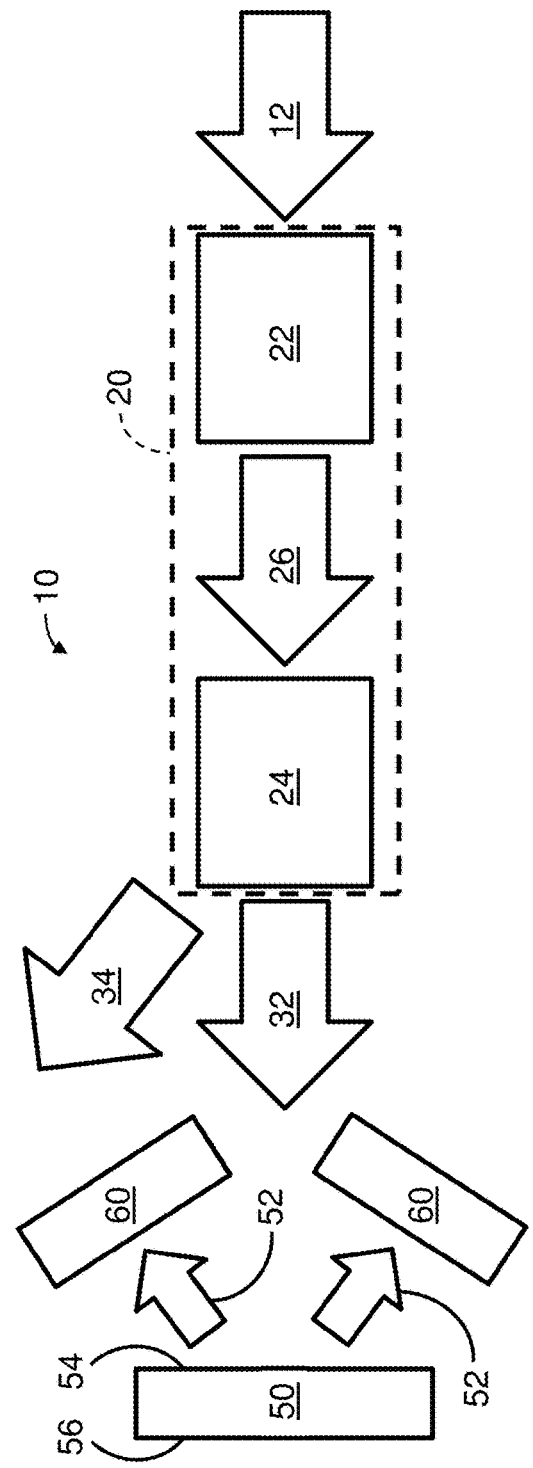
FIG. 8C:
FIG. 8D:

SYSTEM AND METHOD FOR X-RAY FLUORESCENCE WITH FILTERING

CLAIM OF PRIORITY

This application claims the benefit of priority to U.S. Provisional Appl. No. 62/726,776 filed on Sep. 4, 2018 and U.S. Provisional Appl. No. 62/794,281 filed on Jan. 18, 2019, each of which is incorporated in its entirety by reference herein.

BACKGROUND

Field

This application relates generally to laboratory-based x-ray fluorescence analysis systems and methods.

Description of the Related Art

In x-ray fluorescence (XRF) analysis using laboratory x-ray sources, a major limitation in the detection and quantification of trace elements is the background contribution due to elastic and inelastic (Compton) scattering of the incident x-rays reaching and being detected by the x-ray detector. This background contribution extends across an energy range that overlaps with the energies of the x-ray fluorescence lines of interest, and is an important source of noise that reduces the signal-to-noise ratio of the x-ray detector.

In some conventional XRF systems, this background contribution is reduced by transmitting the incident x-ray beam through one or more thin foil filters to attenuate the x-rays incident on the sample in the energy range of the x-ray fluorescence lines of interest. However, such transmission filters tend to be effective only over a relatively narrow energy range immediately above the absorption edge of the filter material. In addition, such transmission filters also attenuate the higher energy bremsstrahlung x-rays from reaching the sample and exciting the x-ray fluorescence lines, thereby diminishing the desired x-ray fluorescence signal. In other conventional XRF systems, the background contribution is filtered from the incident x-ray energy spectrum by reflecting the incident x-ray beam from a multilayer-coated surface (e.g., mirror; monochromator) which selectively reflects x-rays within a corresponding energy range and transmits x-rays outside the corresponding energy range. The reflected x-rays are directed to illuminate the sample, while transmitted x-rays propagate away from the sample and the x-ray detector.

SUMMARY

In one aspect disclosed herein, an x-ray optical filter comprises at least one x-ray optical mirror. The at least one x-ray optical mirror is configured to receive a plurality of x-rays having a first x-ray spectrum with a first intensity as a function of energy in a predetermined solid angle range and to separate at least some of the received x-rays by multilayer reflection or total external reflection into reflected x-rays and non-reflected x-rays and to form an x-ray beam comprising at least some of the reflected x-rays and/or at least some of the non-reflected x-rays. The x-ray beam has a second x-ray spectrum with a second intensity as a function of energy in the solid angle range, the second intensity greater than or equal to 50% of the first intensity across a first continuous energy range at least 3 keV wide, the second intensity less than or equal to 10% of the first intensity across a second continuous energy range at least 100 eV wide.

In another aspect disclosed herein, a method of performing x-ray fluorescence analysis is provided. The method comprises receiving x-rays having a first energy spectrum and a first spatial distribution. The method further comprises reflecting at least some of the received x-rays, the reflected x-rays having a second energy spectrum and a second spatial distribution. The method further comprises separating the reflected x-rays by multilayer reflection and/or total external reflection into a first portion that impinges a sample and a second portion having a predetermined range of x-ray energies, the first portion having a third energy spectrum that has a reduced intensity, as compared to the second energy spectrum, in the predetermined range of x-ray energies.

In another aspect disclosed herein, an x-ray system comprises at least one first x-ray optical mirror configured to receive at least a portion of a first x-ray beam having a first energy spectrum and to reflect at least some of the x-rays of the portion of the first x-ray beam to form a second x-ray beam. The x-ray system further comprises at least one second x-ray optical mirror comprising at least one mosaic crystal layer, at least one depth-grated multilayer reflector, and/or at least one grazing incidence mirror. The at least one second x-ray optical mirror is configured to receive at least some of the x-rays from the at least one first x-ray optical mirror, to transmit a second x-ray beam comprising a transmitted portion of the x-rays received from the at least one first x-ray optical mirror, and to reflect a reflected portion of the x-rays received from the at least one first x-ray optical mirror. The second x-ray beam has a second energy spectrum with a reduced intensity, as compared to the first energy spectrum, in a predetermined range of x-ray energies.

In another aspect disclosed herein, an x-ray system comprises at least one x-ray source configured to generate x-rays. The x-ray system further comprises at least one x-ray optical element configured to receive and focus at least some of the x-rays from the at least one x-ray source. The at least one x-ray optical element comprises at least one substrate comprising a surface and at least one depth-graded multilayer coating on the surface. The at least one depth-graded multilayer coating is configured to substantially reflect x-rays having energies in a first energy range and to not substantially reflect x-rays having energies in a second energy range that does not overlap the first energy range.

BRIEF DESCRIPTION OF THE DRAWINGS

FIG. 1 shows examples of biologically important elements detectable using hard x-rays in accordance with certain embodiments described herein (from M. J. Pushie et al., "Elemental and chemically specific x-ray fluorescence imaging of biological systems," Chemical Reviews 114:17 (2014): 8499-8541).

FIGS. 2A-2D schematically illustrate various example x-ray optical systems in accordance with certain embodiments described herein.

FIG. 3B schematically illustrates an example at least one substrate of the x-ray focusing optical element of FIG. 3A in accordance with certain embodiments described herein.

FIG. 6 shows a table of the K-line x-ray fluorescence cross sections of Fe, Cu, and Zn at four x-ray excitation energies in accordance with certain embodiments described herein.

FIGS. 8A-8D schematically illustrates various other examples of the x-ray optical system in accordance with certain embodiments described herein.

DETAILED DESCRIPTION

Figure 3A:
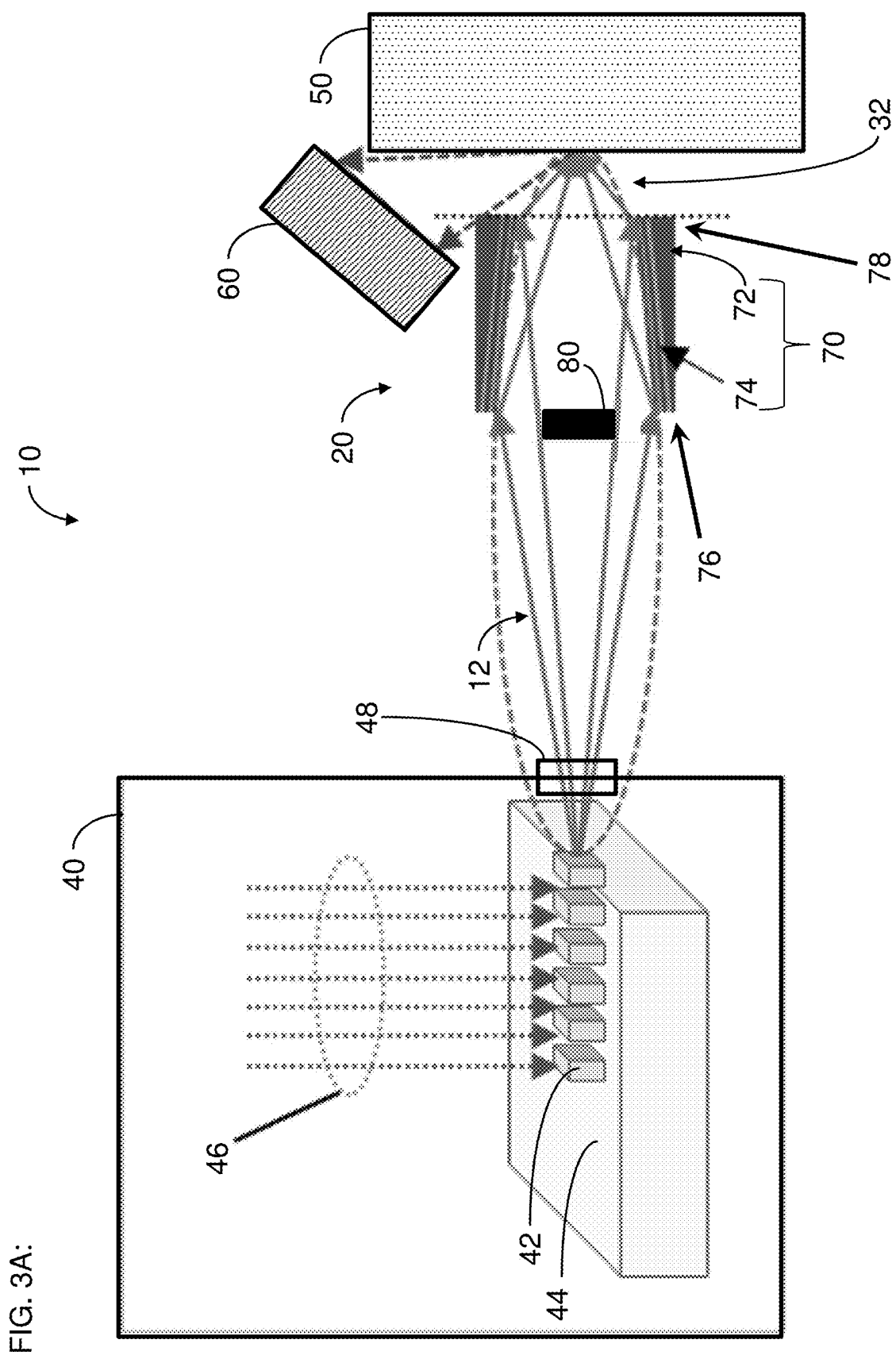
FIG. 3A schematically illustrates an example x-ray optical system in accordance with certain embodiments described herein.

One example area in which x-ray fluorescence (XRF) can provide information is the interactions of metals in biological systems (e.g., role of metals in biological processes; metal-based drugs). These trace elements are typically found in concentration of parts per million (ppm) and spatially specific at organ, tissue, cell, and sub-cellular levels. Abnormal trace element distribution in tissues has been directly linked to many diseases, including Alzheimer's, Parkinson's, amyotrophic lateral sclerosis (ALS), Huntington disease. Recent studies are also linking pathologies such as arthritis and schizophrenia to abnormal trace element concentrations of blood serum in human populations, which are driving questions on elemental distributions in the diseased tissues. In addition, promising new metal-based therapeutics (e.g., anti-cancer and anti-HIV) are driving the need for metal mapping capabilities to better understand the in vivo uptake of the drugs and to determine targeting strategies.

XRF has previously been used for chemical analysis and elemental imaging for metal mapping in biological specimens. High performance synchrotron-based "microXRF" is capable of elemental analysis of biological tissue at cellular and sub-cellular resolution (e.g., microns to 30 nm) with trace-level (e.g., below parts per million (ppm)) sensitivity and quantification. Synchrotron XRF microprobes typically use a monochromator to define a single incident x-ray energy and large synchrotron-specific optics (e.g., Kirkpatrick-Baez mirrors or KB mirrors) to focus the x-rays onto a 0.5-5 µm spot. Example synchrotron-based microXRF studies performed at about 1.6 µm resolution have analyzed intracellular localization of Pt-based anticancer chemotherapeutic compounds in cancerous and non-cancerous cells and the relation of Pt to Zn, providing the insight that Zn-related detoxification was responsible for the development of resistance to chemotherapy. In another example study, synchrotron-based microXRF performed at around 4 µm resolution was used to determine the ration of Co to Cu surrounding failed hip implants, which showed that the failed implants preferentially distributed Co versus non-failed implants, and that analyses of this ratio may inform implant selection. In still another example study, the spatial density of Fe-rich regions in the fingernails of people diagnosed with lung cancer was mapped at about 2 µm resolution.

However, such microXRF systems require access to synchrotron facilities, which are expensive (e.g., each synchrotron facility costs upward to $1B) and are limited in number to only a few centers worldwide. Because of the small number of such facilities with x-ray fluorescence beamlines (e.g., each beamline can cost over $10M), access is immensely competitive. Even if granted, beamtime is often limited to a week or a few days, which is problematic in that it limits the number of samples that can be analyzed, and/or the ability to change the measurement protocol (e.g., improvements to sample preparation and/or sample selection). There are of course additional challenges including logistics of traveling to the synchrotron and the associated costs.

Conventional laboratory-based XRF systems, which had been developed to provide broad access to microspot XRF analysis, are typically based on an electron-bombardment laboratory x-ray source that produces a polychromatic x-ray spectrum, which is then focused to a spot size of about 30-100 μm using polycapillary x-ray optics. In comparison to synchrotron systems, such conventional systems are limited to poorer resolution and have lower sensitivity, which is problematic for elemental analysis of trace concentrations in biological applications.

Certain embodiments described herein provide a system (e.g., an x-ray fluorescence system) comprising a microstructured x-ray source comprising at least one target material (e.g., Au) embedded in a thermally conductive substrate (e.g., diamond), the x-ray source configured to emit x-rays with energies corresponding to one or more characteristic x-ray lines of the at least one target material. The system further comprises an x-ray optic positioned to receive at least a portion of the x-rays from the x-ray source. The x-ray optic comprises an axially symmetric x-ray focusing optic having a depth graded multilayer coating on an inner surface (e.g., with an ellipsoidal profile in a plane along a longitudinal axis of the x-ray optic) configured to substantially reflect (e.g., to have a reflectivity greater than 30%; to have a reflectivity greater than 50%) x-rays having energies in a first predetermined range, to not substantially reflect (e.g., to have a reflectivity less than 10%; to have a reflectivity less than 5%) x-rays in a second predetermined range (e.g., in a range which includes the fluorescence lines of the elements being analyzed), and to focus the reflected x-rays onto a sample (e.g., biological sample; semiconductor sample; geological sample) to be analyzed.

Certain embodiments described herein provide an x-ray optic comprising at least an axially symmetric portion of a tube (e.g., capillary), the portion having an inner surface with a shape (e.g., an ellipsoidal profile in a plane along a longitudinal axis of the x-ray optic) configured for focusing the x-rays from an x-ray source (e.g., with source imaging; with source demagnification; with source magnification). The inner surface of the axially symmetric portion comprises at least one depth graded multilayer coating configured to substantially reflect x-rays having energies in a first range of energies and to not substantially reflect x-rays having energies in a second range of energies that does not overlap the first range of energies.

Certain embodiments described herein provide an x-ray fluorescence system. The system comprises at least one x-ray optic configured to receive at least a portion of a first x-ray beam having a first energy spectrum and to reflect at least some of the x-rays of the portion of the first x-ray beam to form a second x-ray beam. The second x-ray beam has a second energy spectrum. The system further comprises at least one optical element (e.g., mirror) configured to receive at least some of the x-rays of the second x-ray beam, to transmit a third x-ray beam comprising a transmitted portion of the x-rays received from the second x-ray beam, and to reflect a reflected portion of the x-rays received from the second x-ray beam. The third x-ray beam has a third energy spectrum with a reduced intensity, as compared to the second energy spectrum, in a predetermined range of x-ray energies.

Certain embodiments described herein provide a method of performing x-ray fluorescence analysis. The method comprises receiving x-rays having a first energy spectrum and a first spatial distribution and reflecting at least some of the received x-rays. The reflected x-rays have a second energy spectrum and a second spatial distribution. The method further comprises transmitting a first portion of the reflected x-rays to impinge a sample and reflecting a second portion of the reflected x-rays. The first portion has a third energy spectrum that has a reduced intensity, as compared to the second energy spectrum, in a predetermined range of x-ray energies.

Certain embodiments described herein advantageously tailor the energy spectrum of the x-rays incident on the sample to reduce (e.g., remove; cut out) the intensity (e.g., flux) of x-rays in the x-ray fluorescence energy range of interest while preserving (e.g., not substantially affecting) the intensity (e.g., flux) of x-rays at energies higher than the x-ray fluorescence energy range of interest. By reducing the intensity of the incident x-rays in the x-ray fluorescence energy range, certain embodiments reduce the scattered x-ray contribution to the background in the x-ray fluorescence energy range. By preserving the intensity of the incident x-rays at energies above the x-ray fluorescence energy range, certain embodiments maintain (e.g., do not substantially reduce) the x-ray intensity that excites the x-ray fluorescence within the sample. Certain embodiments described herein utilize reflection, rather than absorption, to reduce the intensity of x-rays in the x-ray fluorescence energy range of interest.

Certain embodiments described herein advantageously operate as a "notch filter" in which x-rays within at least one predetermined energy range having a lower bound x-ray energy and an upper bound x-ray energy are substantially prevented from impinging the sample while x-rays outside the at least one predetermined energy range (e.g., at energies above the upper bound x-ray energy; at energies above the upper bound x-ray energy and x-rays below the lower bound x-ray energy) are allowed to propagate to impinge the sample.

Certain embodiments described herein advantageously increase the throughput for x-ray fluorescence analysis by reducing the data acquisition time for performing measurements with sufficient signal-to-noise ratio. For example, the data acquisition time T can be expressed as: $T \propto B/F^2$, where B is the background contribution and F is the x-ray fluorescence signal. Certain embodiments described herein reduce the background contribution B by about 90% while the x-ray fluorescence signal F is only decreased by about 10%, resulting in a reduction of the data acquisition time T by about 88%.

Certain embodiments described herein are configured to facilitate (e.g., improve) x-ray fluorescence systems configured for trace element mapping (e.g., in biological samples; in semiconductor samples; in geological samples). In certain such embodiments, the bremsstrahlung x-ray beam is refocused using a second paraboloidal optic and the sample is scanned to generate elemental maps of a wide range of elements. Certain embodiments described herein provide more rapid analysis and/or increased sensitivity to the trace elements being analyzed (e.g., by improving the signal-to-noise ratio), while maintaining the desired high spatial resolution (e.g., for semiconductor applications, biomedical research, and other applications). Certain other embodiments described herein provide more rapid analysis and/or increased sensitivity to the trace elements being analyzed (e.g., by improving the signal-to-noise ratio) in applications that do not utilize high spatial resolution (e.g., mineral exploration).

Certain other embodiments are configured to determine the contribution from a first x-ray fluorescence line of a first element (e.g., Hf) from the contribution from a second x-ray fluorescence line of a second element (e.g., Cu) where the first x-ray fluorescence line and the second x-ray fluorescence line have similar (e.g., substantially the same) energies. For example, in a semiconductor processing application, a notch filter can be configured to remove x-rays in an energy range of 9 keV-9.6 keV from an incident x-ray beam, and a sample containing both Cu (e.g., having a K absorption edge at about 9 keV and a Kα fluorescence line at about 8 keV) and Hf (e.g., having an L absorption edge at about 9.6 keV and an Lα fluorescence line at about 8 keV) can be analyzed by (i) measuring a first x-ray fluorescence from the sample with the notch filter preventing x-rays within the energy range from impinging the sample, (ii) measuring a second x-ray fluorescence from the sample without the notch filter preventing x-rays within the energy range from impinging the sample, and (iii) comparing the first x-ray fluorescence and the second x-ray fluorescence. Certain other embodiments described herein are configured to advantageously remove the contributions from diffraction peaks in the measured x-rays. Certain other embodiments described herein are configured to reduce (e.g., prevent; minimize) the flux of x-rays within a selected range of energies from impinging the sample while allowing x-rays outside the selected range of energies to impinge the sample, thereby advantageously reducing the overall x-ray flux impinging the sample (e.g., a sample that is sensitive or susceptible to damage by radiation dosages above a predetermined threshold).

With regard to biological systems, XRF analysis is often complex (e.g., the XRF of different elements are maximized at different energies) and it can be desirable to detect multiple elements simultaneously at the highest sensitivities possible. Certain embodiments described herein produce both strong characteristic x-ray energies related to the x-ray target material and a broad polychromatic x-ray spectrum up to the accelerating voltage of the electron beam of the x-ray source, thus enabling increased excitations.

Certain embodiments described herein provide systems and methods for x-ray fluorescence for chemical analysis and elemental imaging with sub-cellular resolution. As described herein, certain such embodiments can provide advantages even over those provided by a recently developed laboratory microXRF system which incorporates a microstructured x-ray source and a double paraboloidal x-ray optic to achieve resolution less than 10 µm (e.g., 8 µm) and sub-ppm and sub-femtogram (absolute) detection sensitivities. This laboratory-based microXRF system has been applied to a broad range of biological applications by various researchers, including but not limited to: nanoparticle drugs in tumors; trace element dysregulations in diseased calcified tissue such as penile stones, kidney stones, and teeth; genetic modification of crops to improve nutritional uptake (e.g., iron); correlations of elemental anomalous distribution of Zr, I, Cu, and Sr in hair samples with the onset and progression of diabetes, autism, and cancer; Parkinson mouse models and toward the creation of a quantitative hybrid routine using microXRF and inductively coupled plasma mass spectrometry (ICP-MS) techniques. Certain embodiments described herein are configured to advantageously provide imaging of biologically important elements at 1.6 µm resolution with a speed that is three times faster than this system provides at 8 µm resolution. Certain embodiments described herein advantageously expand the use of laboratory microXRF systems for imaging biologically important elements for biomedical applications and speed up the pace of biomedical research that is bottlenecked by low synchrotron access.

Certain embodiments described herein are configured to provide information relevant to metal-binding proteins (e.g., metalloproteins) in the tissue samples. Metalloproteins account for one third of all proteins in the human body, are known to carry out at least one step in almost every biological pathway. The dysregulation of these physiologically important metals is hypothesized to be linked to numerous diseases, including: Menke's and Wilson's diseases, neurodegenerative diseases such as Alzheimer's, Parkinson's, amyotrophic lateral sclerosis (ALS), Huntington disease, autism, and autoimmune diseases such as rheumatoid arthritis, Crohn's, Grave's disease, and infertility. Certain embodiments described herein are configured to provide information relevant to additional elements, previously not found in biological systems, but which are being introduced into such systems, either intentionally (e.g., such as pharmaceutical drugs, which have been moving toward inorganic-based concepts and metal nanoparticles) or unintentionally (e.g., accumulated by environmental exposure, often the result of modern industrial use and pollution), and which can have potential toxic effects. Certain embodiments described herein are configured to provide information relevant to the development of targeted and rational design approaches to metallodrugs (e.g., information relevant to their uptake into tumors, cells, and organelles; information relevant to the removal or detoxification of such drugs; information relevant to the effectiveness of such drugs and/or the development of drug resistance to such drugs).

Certain embodiments described herein provide high spatial resolution imaging information (e.g., relevant to understand the underlying biological functions of physiologically important elements and associated molecules, and biological pathways of therapeutic drugs or toxic elements) with multilength scale resolutions, such as cellular resolution for imaging tissues and organs and sub-cellular resolution for imaging cells, despite the low trace level concentrations of many biologically important elements in biological specimens, due to the small number of metal atoms in the small probed volume. Certain embodiments described herein enable simultaneously imaging multiple elements at sub-cellular resolution and at high sensitivity to provide information relevant to the relationship between elements and corresponding biomolecules (e.g., metalloproteins) and/or textural information (such as K). For example, imaging trace elements along with the distribution of phosphorus, sulfur, and potassium by certain embodiments described herein provides information relevant to spatial correlation with DNA (P), protein (S) and cellular shape (K).

Certain embodiments described herein provide "pre-synchrotron" screening which can inform sample preparation and ensure effective utilization of synchrotron resources, as well as to select samples prior to ultrahigh resolution (e.g., 30 nm-100 nm) XRF studies. Certain embodiments described herein provide analysis of a large number of samples (e.g., used by many biomedical applications) to account for statistical population variance. Certain embodiments described herein provide analysis of samples that cannot be transported other facilities (e.g., synchrotrons) due to the proprietary nature of the samples, the dangerous nature of the samples, or other reasons. Certain embodiments described herein provide high penetration and experimental flexibility in accommodating various specimen sizes and shapes under various conditions (e.g., wet, cryo-preserved, fixed, and/or stained under a range of flexible operating conditions; ambient; cryogenic). Certain embodiments described herein provide non-destructive x-ray fluorescence analysis which can be combined with correlative (e.g., follow-on or follow-up) analysis and/or imaging performed with other techniques, including but not limited to, infrared and Raman spectroscopy/microscopy, molecular mass spectroscopy (e.g., matrix assisted laser desorption/ ionization or MALDI), secondary mass spectroscopy x-ray absorption spectroscopy for investigating the chemical state of the elements of interest). Certain embodiments described herein advantageously provide other benefits, including but not limited to: simultaneous detection of many elements within absolute detection limits, and measurements of specimens at or close to their natural state under ambient conditions. Certain embodiments described herein provide much higher spatial resolution than do mass spectroscopy imaging techniques (e.g., laser ablation inductively coupled plasma mass spectrometry or LA-ICP-MS), and orders of magnitude higher sensitivity and lower radiation dose than do electron-based techniques.

Figure 1:
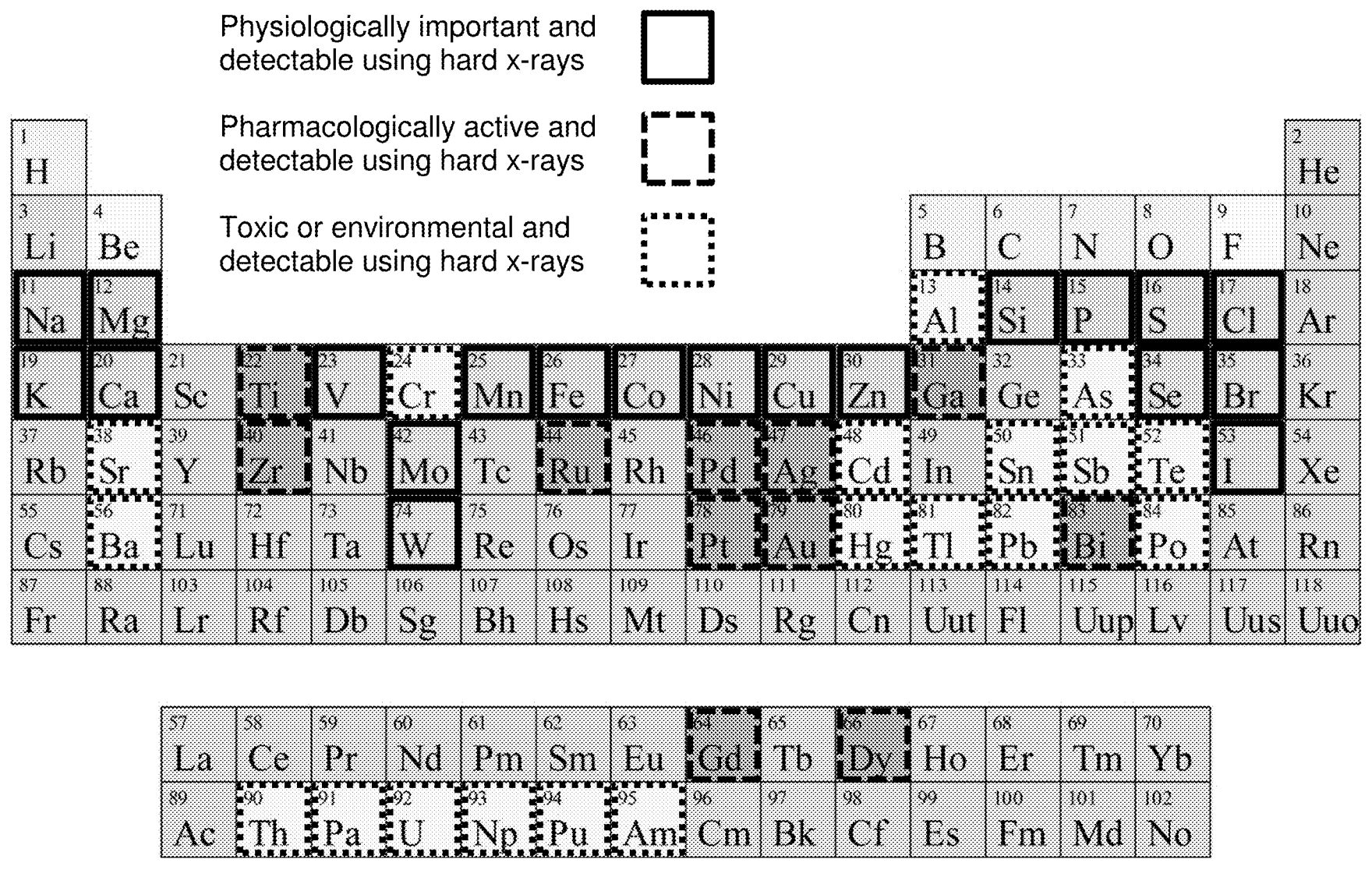

Certain embodiments described herein are configured to provide elemental imaging (e.g., information regarding the spatial distributions) of one or more biologically important elements (e.g., in metal-binding proteins) in tissue samples at minor and trace level concentrations (e.g., parts per million; 0.1% or less). FIG. 1 shows examples of biologically important elements that are detectable using hard x-rays in accordance with certain embodiments described herein (see, M. J. Pushie et al., "Elemental and chemically specific x-ray fluorescence imaging of biological systems," Chemical Reviews 114:17 (2014): 8499-8541). As shown in FIG. 1, biologically important elements can include:

physiologically important elements that are known to be essential to life (e.g., Na, Mg, Si, P, S, Cl, K, Ca, V, Mn, Fe, Co, Ni, Cu, Zn, Se, Br, Mo, I). For example, such elements can be components of proteins (e.g., metalloproteins containing Fe, Cu, and/or Zn);

pharmacologically active elements that serve as novel therapeutics and diagnostic agents (e.g., Ti, Ga, Zr, Ru, Pd, Ag, Pt, Au, Bi, Gd, Dy). For example, such elements can be components of cancer drugs (e.g., comprising Pt, Au, and/or Ru); and toxic or carcinogenic elements that have widespread distribution due to modern industrial and technological activities (e.g., Al, Cr, As, Sr, Cd, Sn, Sb, Te, Ba, Hg, Tl, Pb, Po, Th, Pa, U, Np, Pu, Am).

FIGS. 2A-2D schematically illustrate various example x-ray optical systems 10 in accordance with certain embodiments described herein. The x-ray optical system 10 (e.g., an x-ray optical filter) of FIG. 2A comprises at least one x-ray optical element 20 (e.g., mirror). In certain embodiments, the at least one x-ray optical element 20 comprises at least one substrate and at least one layer on the at least one substrate. The at least one x-ray optical element 20 is configured to receive a plurality of x-rays (e.g., a first x-ray beam 12) having a first x-ray spectrum with a first intensity as a function of energy in a predetermined solid angle range and to separate the at least some of the received x-rays by multilayer reflection (e.g., reflection that satisfies the Bragg reflection condition from multilayers and/or mosaic crystal layers) or total external reflection into reflected x-rays and non-reflected x-rays. The at least one x-ray optical element 20 is further configured to form a second x-ray beam 32 comprising at least some of the reflected x-rays and/or at least some of the non-reflected x-rays. The second x-ray beam 32 has a second x-ray spectrum with a second intensity as a function of energy in the solid angle range. The second intensity is greater than or equal to 50% of the first intensity across a first continuous energy range at least 3 keV wide, and the second intensity less than or equal to 10% of the first intensity across a second continuous energy range at least 100 eV wide. In certain embodiments, the second intensity is greater than or equal to 50% of the first intensity across a third continuous energy range at least 2 keV wide, the second continuous energy range between the first continuous energy range and the third continuous energy range.

In certain embodiments, as schematically illustrated by FIG. 2B, the x-ray optical system 10 comprises at least one x-ray source 40 configured to generate the first x-ray beam 12 and the at least one x-ray optical element 20 is positioned to receive at least a portion of the x-rays (e.g., at least a portion of the first x-ray beam 12) from the at least one x-ray source 40. As schematically illustrated by FIGS. 2C and 2D, in certain embodiments, at least a portion of the second x-ray beam 32 is configured to irradiate a sample 50 (e.g., a biological sample; a semiconductor sample; a geological sample) and to excite x-ray fluorescence 52 within the sample 50. The x-ray fluorescence 52 is emitted from the sample 50 and comprises x-ray fluorescence lines within the predetermined range of x-ray energies.

In certain embodiments, the system 10 further comprises at least one x-ray detector 60 configured to detect and measure at least a portion of the x-ray fluorescence 52 emitted from the sample 50. For example, the at least one x-ray detector 60 can comprise an energy dispersive detector configured to detect the fluorescence x-rays emitted from the sample (e.g., to generate images indicative of the elemental distribution of the sample). As schematically illustrated by FIG. 2C, the second x-ray beam 32 impinges a first surface 54 of the sample 50 and the at least one x-ray detector 60 is positioned to receive x-ray fluorescence 52 emitted from a second surface 56 of the sample 50 different from the first surface 54 (e.g., the second surface 56 is opposite to the first surface 54). For another example, as schematically illustrated by FIG. 2D, the second x-ray beam 32 impinges the first surface 54 of the sample 50 and the at least one x-ray detector 60 is positioned to receive x-ray fluorescence 52 emitted from the first surface 54 (e.g., a portion of the first surface 54 is impinged by the second x-ray beam 32 and the x-ray fluorescence 52 is received by the at least one x-ray detector 60 from the same portion of the first surface 54 and/or a different portion of the first surface 54). Examples of x-ray detectors 60 compatible with certain embodiments described herein are disclosed by U.S. Pat. Nos. 9,874,531, 9,823,203, 9,719,947, 9,594,036, 9,570,265, 9,543,109, 9,449,781, 9,448,190, and 9,390,881, each of which is incorporated in its entirety by reference herein.

FIG. 3A schematically illustrates an example x-ray optical system 10 in accordance with certain embodiments described herein. The example x-ray optical system 10 of FIG. 3A comprises an x-ray source 40 configured to emit the first x-ray beam 12, the at least one x-ray optical element 20 (e.g., mirror) configured to receive the first x-ray beam 12 and to form and direct the second x-ray beam 32 to impinge the sample 50, and at least one x-ray detector 60 configured to detect (e.g., measure) the fluorescence x-rays emitted from the sample 50. In certain embodiments, the system 10 is integrated with a vacuum system and is configured to provide elemental imaging of samples (e.g., freeze-dried tissue samples; biological samples; semiconductor samples; geological samples). With regard to biological samples, the system 10 of certain embodiments advantageously provides microXRF analysis and imaging with sub-cellular resolution (e.g., in a range of 0.5 µm to 2 µm; 1.5 µm; 1.6 µm; nearly an order of magnitude improvement in resolution over previous systems) and with high sensitivity (e.g., ppm) for the detection of biologically important elements (e.g., Fe, Cu, Zn, P, S) with trace level concentrations.

In certain embodiments, the x-ray source 40 comprises at least one microstructured target 42 having at least one material (e.g., Au) on or embedded in a thermally conductive substrate 44 (e.g., diamond). The at least one material of the at least one microstructured target 42 is configured to emit x-rays (e.g., the first x-ray beam 12) with ultrahigh source brightness upon being bombarded by electrons 46, the first x-ray beam 12 emitted from the x-ray source 40 through at least one window 48. The at least one material of the at least one target 42 is configured to emit x-rays having energies higher than one or more characteristic x-ray fluorescence lines of the sample 50 being analyzed. For example, the characteristic L-lines of Au are slightly above the K-absorption edge of Zn and not far above the K-absorption edges of Fe and Cu, so the L-lines of an Au target material can be more than three times more efficient for production of x-ray fluorescence signals for these example elements. The x-ray source 40 of certain embodiments has as a source size in a range of 5 μm to 15 μm (e.g., 8 μm; 10 μm). Example parameters of the x-ray source 40 include, but are not limited to: an electron beam operating acceleration voltage of 35 kV; an electron power of 30 W; a window 48 comprising beryllium and having a thickness of 50 μm; an electron beam footprint on the target (e.g., full-width-at-half-maximum) of 8 μm (width)×100 μm (length); the substrate 44 comprising diamond with 200 etched trenches (e.g., 4 μm deep, 1 μm thick, and 20 μm wide) extending along the long dimension of the electron beam footprint; trenches filled with the at least one material (e.g., Au) of the at least one target 42; the first x-ray beam 12 having a 5° takeoff angle along the long dimension of the electron beam footprint. Examples of x-ray sources 40 compatible with certain embodiments described herein are disclosed by U.S. Pat. Nos. 9,874,531, 9,823,203, 9,719,947, 9,594,036, 9,570,265, 9,543,109, 9,449,781, 9,448,190, and 9,390,881, each of which is incorporated in its entirety by reference herein.

The example at least one x-ray optical element 20 of FIG. 3A comprises an axially symmetric x-ray focusing optical element 70 (e.g., mirror; mirror lens) and a beam stop 80. The x-ray focusing optical element 70 comprises at least one substrate 72 and at least one layer 74 (e.g., a depth-graded multilayer coating 90) on the at least one substrate 72 and the x-ray focusing optical element 70 is configured to efficiently collect at least some of the x-rays emitted from the x-ray source 40 (e.g., the first x-ray beam 12), the collected x-rays having specific x-ray energies (e.g., the characteristic L-lines of Au). The x-ray focusing optical element 70 is further configured to focus the collected x-rays (e.g., the second x-ray beam 32 consisting essentially of the at least some of the reflected x-rays) onto the sample 50 to be analyzed (e.g., to maximize signal; at least a 13× increase in focused flux of these energies). As schematically illustrated in FIG. 3A, the beam stop 80 is positioned on a longitudinal axis of the x-ray focusing optical element 70 (e.g., at or near an upstream end 76 of the x-ray focusing optical element 70; at or near a downstream end 78 of the x-ray focusing optical element 70; upstream from the x-ray focusing optical element 70; downstream from the x-ray focusing optical element 70). The beam stop 70 is configured to prevent x-rays that are not reflected by the x-ray focusing optical element 70 from impinging the sample 50. Example beam stops 80 compatible with certain embodiments described herein are disclosed by U.S. Pat. Nos. 9,874,531, 9,823,203, 9,719,947, 9,594,036, 9,570,265, 9,543,109, 9,449,781, 9,448,190, and 9,390,881, each of which is incorporated in its entirety by reference herein.

FIG. 3B schematically illustrates an example at least one substrate 72 of the x-ray focusing optical element 70 of FIG. 3A in accordance with certain embodiments described herein. The at least one substrate 72 of certain embodiments comprises a single, unitary element. For example, the at least one substrate 72 can comprise a hollow axially symmetric tube or portion of a tube (e.g., capillary) extending along a longitudinal axis 75 and comprising an inner surface 73 (e.g., mirror surface) that extends fully around the longitudinal axis 75 (e.g., encircles the longitudinal axis 75; extends 360 degrees around the longitudinal axis 75). In certain other embodiments, the at least one substrate 72 comprises at least one portion of a hollow axially symmetric structure (e.g., a portion of an axially symmetric tube) extending along the longitudinal axis 75 with an inner surface that extends only partially around the longitudinal axis 75 (e.g., less than 360 degrees; in a range of 45 degrees to 360 degrees; in a range of 45 degrees to 315 degrees; in a range of 180 degrees to 360 degrees; in a range of 90 degrees to 270 degrees). In certain embodiments, the at least one substrate 72 comprises multiple substrate portions (e.g., 2, 3, 4, 5, 6, or more) separate from one another (e.g., with spaces between the substrate portions) and distributed around the longitudinal axis 75, with the surface 73 of each substrate portion extending at least partially around and along the longitudinal axis 75. For example, the surfaces 73 of the multiple substrate portions can each extend around the longitudinal axis 75 by an angle in a range of 15 degrees to 175 degrees, in a range of 30 degrees to 115 degrees, and/or in a range of 45 degrees to 85 degrees.

In certain embodiments, the surface 73 of the x-ray focusing optical element 70 is configured to focus the x-rays with a 1:1 imaging at the sample 50 of the portion of the x-ray source 40 from which the x-rays are generated (e.g., the source spot on at least one microstructured target 42 from which the x-rays are emitted). In certain other embodiments, the surface 73 of the x-ray focusing optical element 70 is configured to focus the x-rays with magnification (e.g., by at least a factor of 3; by at least a factor of 5; 1:3; 1:5) at the sample 50 of the portion of the x-ray source 40 from which the x-rays are generated (e.g., the source spot on at least one microstructured target 42 from which the x-rays are emitted). In certain other embodiments, the surface 73 of the x-ray focusing optical element 70 is configured to focus the x-rays with demagnification (e.g., by at least a factor of 3; by at least a factor of 5; 3:1; 5:1) at the sample 50 of the portion of the x-ray source 40 from which the x-rays are generated (e.g., the source spot on at least one microstructured target 42 from which the x-rays are emitted). In certain embodiments, as schematically illustrated by FIG. 3B, the surface 73 has an ellipsoidal profile shape (e.g., in a plane along the longitudinal axis) configured for source demagnification (e.g., the surface 73 collects and focuses x-rays from the source spot of the x-ray source 40 to produce a demagnified image of the source spot). For example, the x-ray focusing optical element 70 can be configured for source demagnification by at least a factor of 5 (e.g., 5:1 demagnification; a 5× reduction in spot size), which corresponds to at least a 5:1 ratio of the distance between the source spot and the center of the x-ray focusing optical element 70 to the distance between the center of the x-ray focusing optical element 70 to the focus of the x-ray focusing optical element 70. With a source spot size of 8 μm, the source demagnification of at least a factor of 5 by the x-ray focusing optical element 70 results in a focused spot size equal to or less than 1.6 μm. In certain other embodiments, the source demagnification of the x-ray focusing optical element 70 is at least a factor of 3 (e.g., 3:1 demagnification; a 3× reduction in spot size; a distance of 100 mm between the source spot and the center of the x-ray focusing optical element 70 and a distance of 30 mm between the center of the x-ray focusing optical element 70 and the focus of the x-ray focusing optical element 70), resulting in a focused spot size equal to or less than 2.7 µm for a source spot size of about 8 µm-9 µm. In certain embodiments, the axially symmetric ellipsoidal portion of the reflecting surface 73 of the x-ray focusing optical element 70 has near-minimal surface errors (e.g., surface errors less than 200 nm in size) and/or a focus (e.g., point spread function) of better than 3 µm for a source size of 10 µm (e.g., a focus or point spread function of better than 0.6 µm).

Figure 3C:
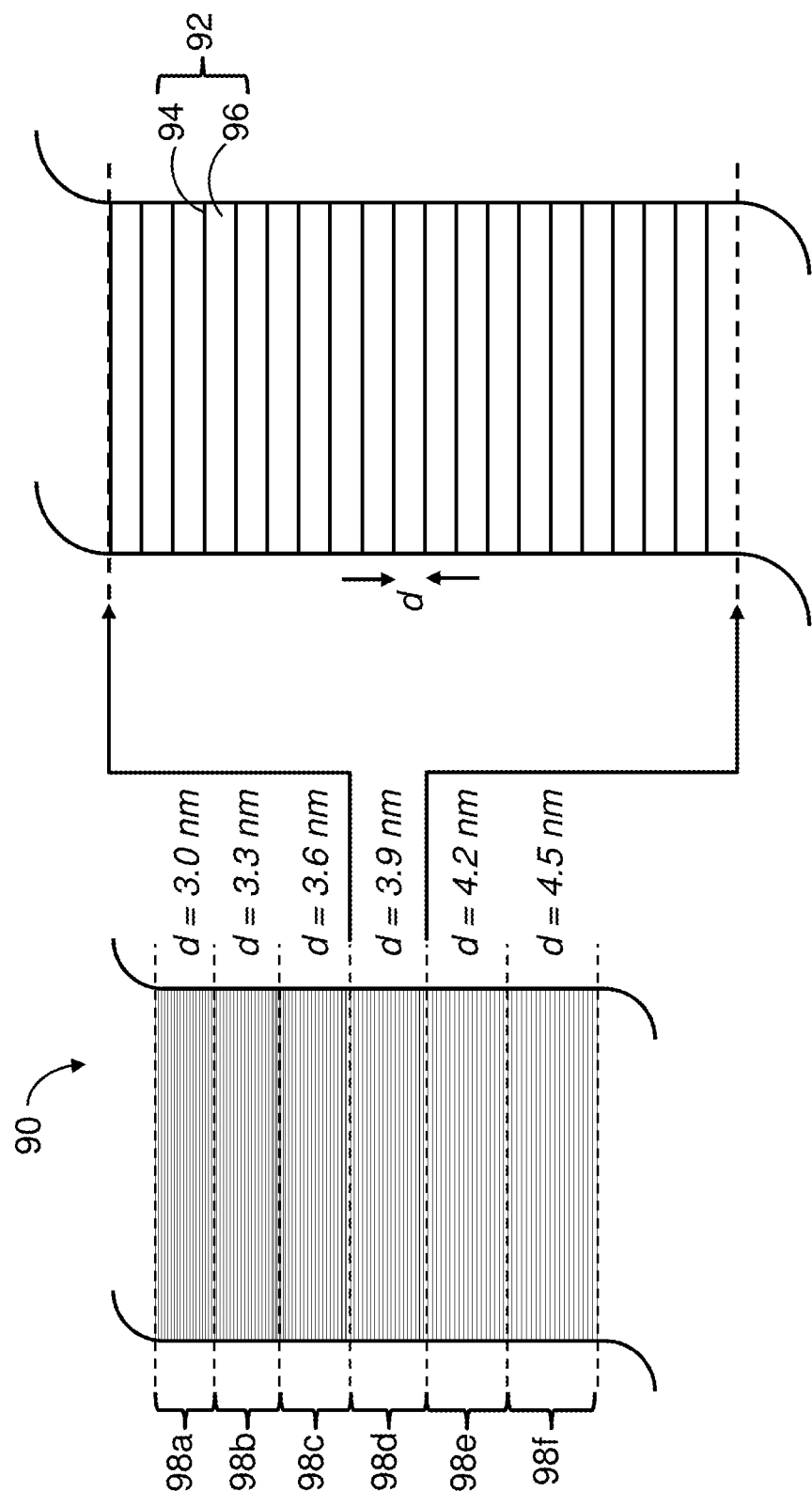
FIG. 3C schematically illustrates an example at least one layer of the x-ray focusing optical element of FIG. 3A in accordance with certain embodiments described herein.

FIG. 3C schematically illustrates an example at least one layer 74 of the x-ray focusing optical element 70 of FIG. 3A in accordance with certain embodiments described herein. The at least one layer 74 comprises at least one depth-graded multilayer 90 (e.g., super-mirror) coated on the surface 73 of the at least one substrate 70 (e.g., fabricated using an atomic layer deposition (ALD) technique; fabricated using sputtering). ALD and sputtering are reasonably mature technologies and are widely used (e.g., in manufacturing advanced integrated circuits; in fabricating multilayers on flat substrate for x-ray monochromators) because of its conformal coating property.

As schematically illustrated in FIG. 3C, the at least one depth-graded multilayer 90 of certain embodiments comprises a plurality of layer pairs 92 (e.g., pairs of layers or bilayers having a high atomic number material and a low atomic number material that alternate in a direction perpendicular to the layers). The thicknesses of the layer pairs differ from one another (e.g., the spacings between sequential high-atomic-number-material layers differ from one another). For example, each layer pair 92 can comprise a first layer 94 comprising a first material and a second layer 96 comprising a second material (e.g., Pt/Si layer pairs; Pt/B$_4$C layer pairs; Pt/Al$_2$O$_3$ layer pairs; W/Si layer pairs; W/B$_4$C layer pairs; W/Al$_2$O$_3$ layer pairs; Mo/Si layer pairs; Mo/B$_4$C layer pairs; Mo/Al$_2$O$_3$ layer pairs; Ni/Si layer pairs; Ni/B$_4$C layer pairs; Ni/Al$_2$O$_3$ layer pairs; Cu/Si layer pairs; Cu/B$_4$C layer pairs; Cu/Al$_2$O$_3$ layer pairs). The thickness (e.g., in a direction substantially perpendicular to the surface 73; d-spacing) of each layer pair 92 is substantially constant along a direction substantially parallel to the surface 73. However, along the normal of the surface 73, layer pairs are configured in sets or groups in which the thicknesses of the layer pairs 72 in each group differ from one another. For example, the thicknesses of the layer pairs 72 of the various groups can increase from a first thickness (e.g., 3 nm) to a second thickness (e.g., 4.5 nm), with the layer groups closer to the surface of the substrate 72 having smaller layer thicknesses than do layer groups farther from the surface of the substrate 72.

In the example depth-graded multilayer 90 of FIG. 3C, the total number of layer pairs 90 is 240, consisting of 6 sets of 40-layer pairs 92. From a first set 98a of layer pairs 92 (e.g., closest to the surface 73) to the last set 98f of layer pairs 92 (e.g., farthest from the surface 73), the thickness of the layer pairs 92 progressively increases (e.g., from 3 nm to 4.5 nm by approximately 0.3 nm=3 Angstroms per set, which is approximately equal to the thickness of two atomic layers). The thickness differences between the sets 98a-98f of layer pairs 92 is limited by the quantized nature of atomic size and does not need to be exact. For example, the depth-graded multilayer 90 can comprise 6 sets of 40 Pt/Al$_2$O$_3$ layer pairs or 40 W/Al$_2$O$_3$ layer pairs with d spacings ranging from 3 nm to 4.5 nm by approximately 0.3 nm per set. The at least one depth-graded multilayer 90 is substantially different from the multilayers most widely used for monochromators.

For example, for monochromators, all the layer pairs have the same thickness as one another. For another example, the typical number of layer pairs used in monochromators (e.g., between 10 and 40) is at least about 3-4 times smaller than the total number of layer pairs 92 of the depth-graded multilayer 90 (e.g., between 100 and 500; between 150 and 400; between 200 and 300).

In certain embodiments, the x-ray focusing optical element 70 is further configured to reduce unwanted background contributions at specific x-ray energies (e.g., by at least a factor of 12) that would otherwise obscure the trace element signals of interest. The main component of this unwanted background contribution is Bremsstrahlung continuum from the laboratory x-ray source 40. Previously, two conventional approaches have been used to minimize the background $B_{j,k}$: (i) a crystal or multilayer monochromator to obtain an x-ray excitation beam with a narrow energy bandwidth, but at the cost of substantially reduced flux, and (ii) a spectral filter (e.g., a foil) to absorb a fraction of the "undesirable" x-rays. However, both conventional approaches have major limitations for laboratory microXRF, especially for higher resolution applications in which the focus spot size is smaller than 8 µm. The monochromator approach only provides a limited amount of flux, since only a tiny fraction of the x-ray spectrum is used (e.g., only one x-ray energy, such as the Au Lα energy of 9.713 keV, would be used). Additionally, there are technical challenges associated with the conflicting requirements of: (i) collecting x-rays over a large solid angle to obtain good focused x-ray flux and (ii) the need for highly collimated x-ray beams for use with monochromators, which is made more challenging when collecting x-rays of multiple angular incidences to fulfill requirement (i). As a result, the monochromator approach is almost exclusively performed at synchrotrons and no laboratory microXRF system uses this approach.

Figure 4A:
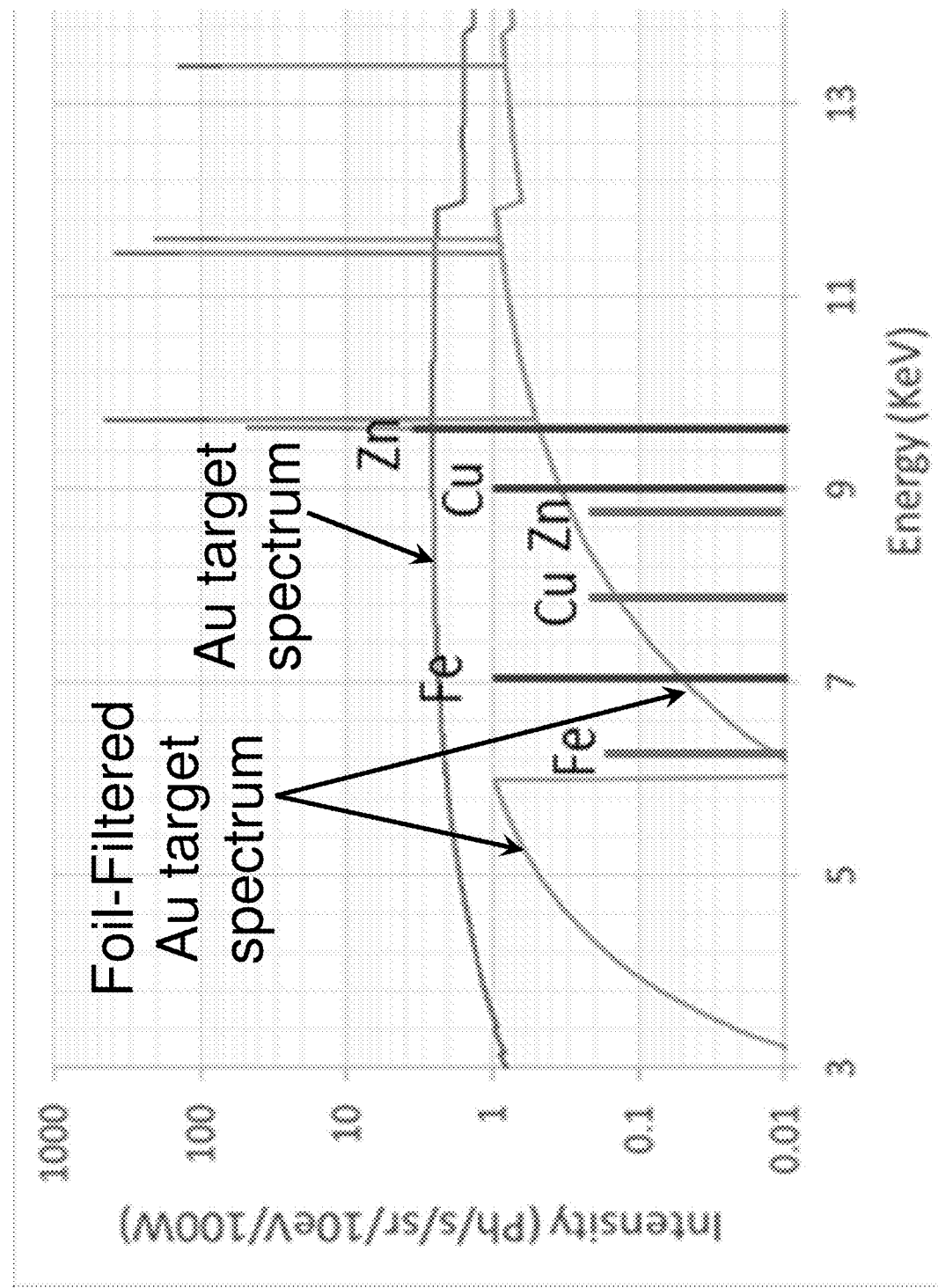
FIG. 4A schematically illustrates an example idealized x-ray spectrum of an electron impact x-ray source in a predetermined solid angle range with an idealized conventional foil-filtered Au target spectrum in the solid angle range.

FIG. 4A schematically illustrates (i) an example idealized first x-ray spectrum in a predetermined solid angle range of an electron impact x-ray source 40 comprising an Au target 42, the K-edge absorption energies of Fe, Cu, and Zn (at 7.11 keV, 8.98 keV, and 9.66 keV, respectively) and their corresponding Kα characteristic x-ray energies (at 6.4 keV, 8.05 keV, and 8.64 keV, respectively), and (iii) an example idealized second x-ray spectrum in the solid angle range and corresponding to the first x-ray spectrum using absorptive spectral filter comprising a 15-µm thick Cr foil placed in the path of the x-rays from the x-ray source 40. The K-edge absorption energy is the minimum x-ray energy required to ionize the K-shell electrons of the corresponding element and to generate characteristic K-line fluorescence x-rays. The example first x-ray spectrum contains sharp characteristic L-lines of the Au target 42 and continuum Bremsstrahlung radiation (the main component of the background $B_{j,k}$). To reduce the x-rays from the x-ray source 40 (e.g., Bremsstrahlung x-rays) having energies equal to the energies of the Fe, Cu, and Zn Kα lines, the spectral absorptive filter comprises a filtering material with an ionization energy lower than the Fe Kα line. As shown in FIG. 4A, the 15-µm thick Cr foil absorptive spectral filter results in the absorption of higher energy x-rays and reduces the background portion of the second x-ray spectrum transmitted through the absorptive spectral filter in a bandwidth of x-rays energies corresponding to the Fe, Cu, and Zn Kα lines. However, the absorptive spectral filter also significantly reduces the useful x-ray energies above the K-edge absorption energies of these elements, leading to an undesirable reduction of the x-ray fluorescence signal $F_{j,k}$.

Figure 4B:
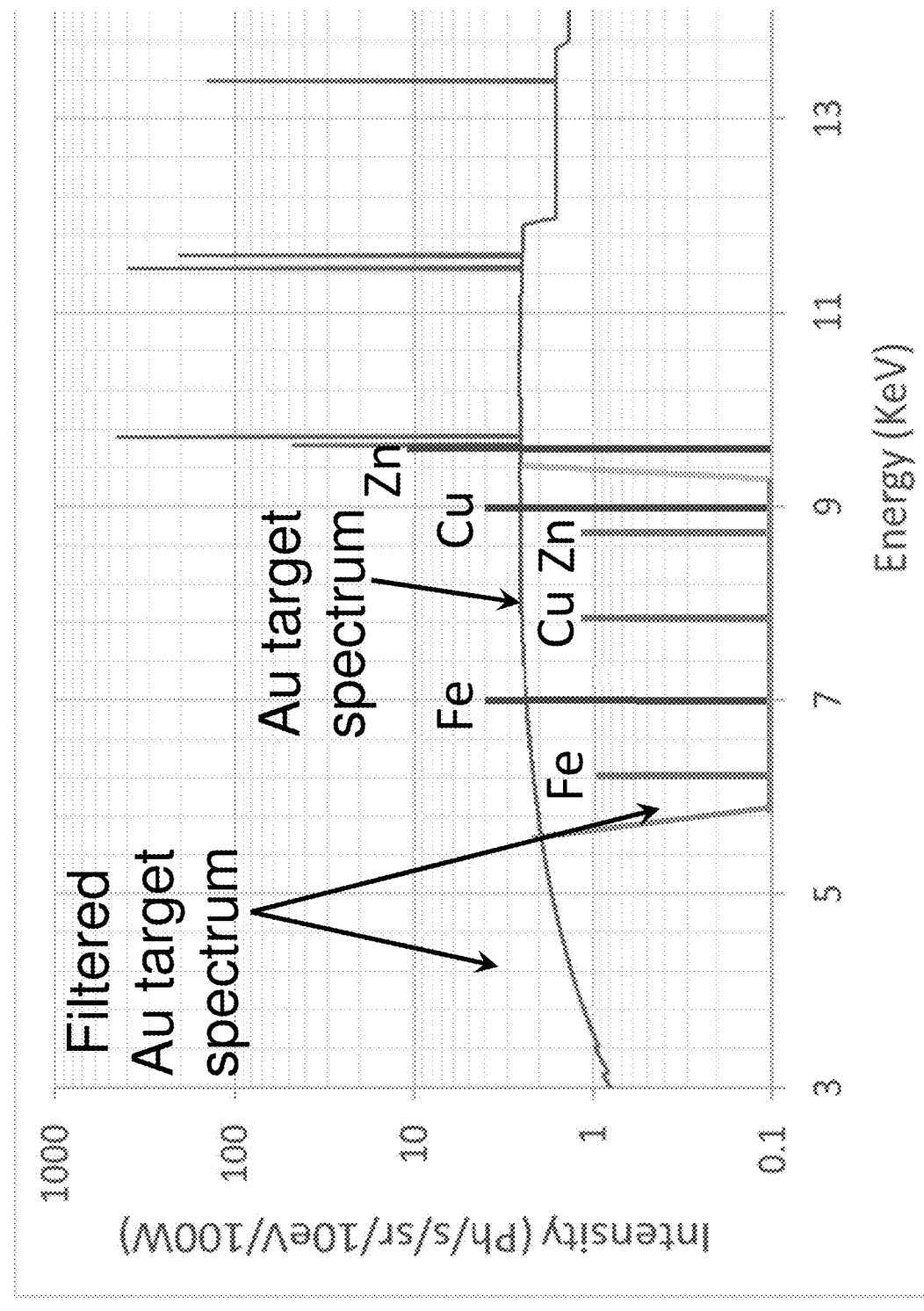
FIG. 4B schematically illustrates an example idealized x-ray spectrum of an electron impact x-ray source in a predetermined solid angle range with an idealized "notch"-filtered Au target x-ray spectrum in the solid angle range in accordance with certain embodiments described herein.

In contrast, FIG. 4B schematically illustrates (i) the example idealized first x-ray spectrum in a predetermined solid angle range and (ii) the K-edge absorption energies of Fe, Cu, and Zn and their corresponding Kα characteristic x-ray energies of FIG. 4A, and (iii) an example idealized second x-ray spectrum in the solid angle range and corresponding to the first x-ray spectrum using an x-ray focusing optical element 70 having a depth-graded multilayer 90 in accordance with certain embodiments described herein. The depth-graded multilayer 90 is configured to serve as a "notch" filter in which the intensity of the second x-ray spectrum (e.g., of the reflected and focused x-rays) is reduced relative to the first x-ray spectrum (e.g., of the x-rays incident to the depth-graded multilayer 90) only in a specific bandwidth, while the rest of the x-ray spectrum is substantially preserved (e.g., the second x-ray spectrum is substantially equal to the first x-ray spectrum). For example, as schematically illustrated by FIG. 4B, the second x-ray spectrum is only reduced for the x-ray energies in the bandwidth of the background that overlap the Fe, Cu, and Zn Kα lines, while the useful higher energy x-rays (e.g., energies above the K-edge absorption energy of Zn) are efficiently preserved, thereby providing optimal fluorescence excitation of the elements of interest. In certain such embodiments, the background $B_{j,k}$ is reduced (e.g., minimized) while maintaining a high x-ray fluorescence signal $F_{j,k}$.

In certain embodiments, the x-ray focusing x-ray optical element 70 (e.g., comprising the at least one substrate 72 and the at least one layer 74 comprising the depth-graded multilayer 90) is configured to provide a near-optimal spectrum for the intended application. For example, applying the Bragg equation ($2d \cdot \sin\theta = \lambda$), x-rays reflected from a location on the depth-graded multilayer 90 have a spectral bandwidth of about 45-50%. The lowest x-ray energy reflected by the depth-graded multilayer 90 is given by the largest incidence angle, which is at the downstream end 78 of the ellipsoidal portion of the x-ray focusing optical element 70 (e.g., the end 78 farthest from the x-ray source 40; see FIG. 3A), and the largest thickness (e.g., d-spacing) (e.g., 4.5 nm).

Figure 5A:
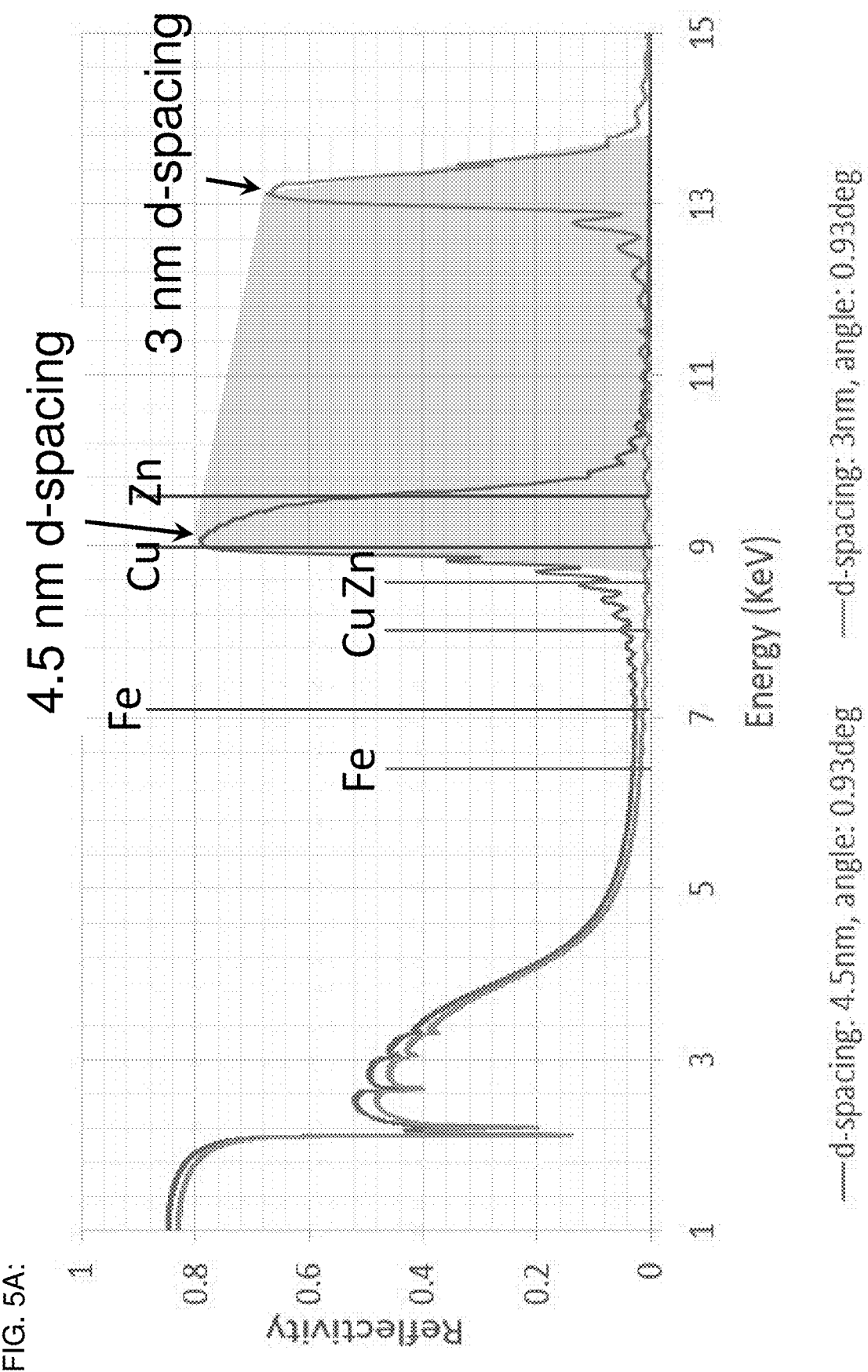
FIG. 5A shows two example x-ray spectra reflected from the downstream end of an ellipsoidal portion of an x-ray focusing optical element with an incidence angle of 16.7 mrad (0.93 degree) for 4.5 nm and 3 nm d-spacings, respectively, in accordance with certain embodiments described herein.

FIG. 5A shows two example x-ray spectra reflected from the downstream end 78 of the ellipsoidal portion of the x-ray focusing optical element 70 with an incidence angle of 16.7 mrad (0.93 degree) for 4.5 nm and 3 nm d-spacings, respectively. The three fluorescence lines of Fe, Cu, and Zn at 6.4 keV, 8.05 keV, and 8.64 keV, respectively, are within a range of x-ray energies that are not substantially reflected by the ellipsoidal portion of the x-ray focusing optical element 70. The lowest x-ray energy reflected at 16.7 mrad incidence angle by the set 98 of layer pairs 92 having thicknesses (e.g., d-spacing) of 4.5 nm is equal to 8.86 keV, which is about 200 eV higher than the Zn Kα line energy. The x-ray energy reflected at 16.7 mrad incidence angle by the set 98 of layer pairs 92 having thicknesses (e.g., d-spacing) of 3 nm is equal to 13 keV. Therefore, the energy range of the x-rays reflected by the depth-graded multilayer 90 at the downstream end 78 of the x-ray focusing optical element 70 (shown as the shaded region of FIG. 5A) ranges from 8.86 keV to 13 keV, which includes all three intense L-lines of an Au target and also the Bremsstrahlung continuum.

Figure 5B:
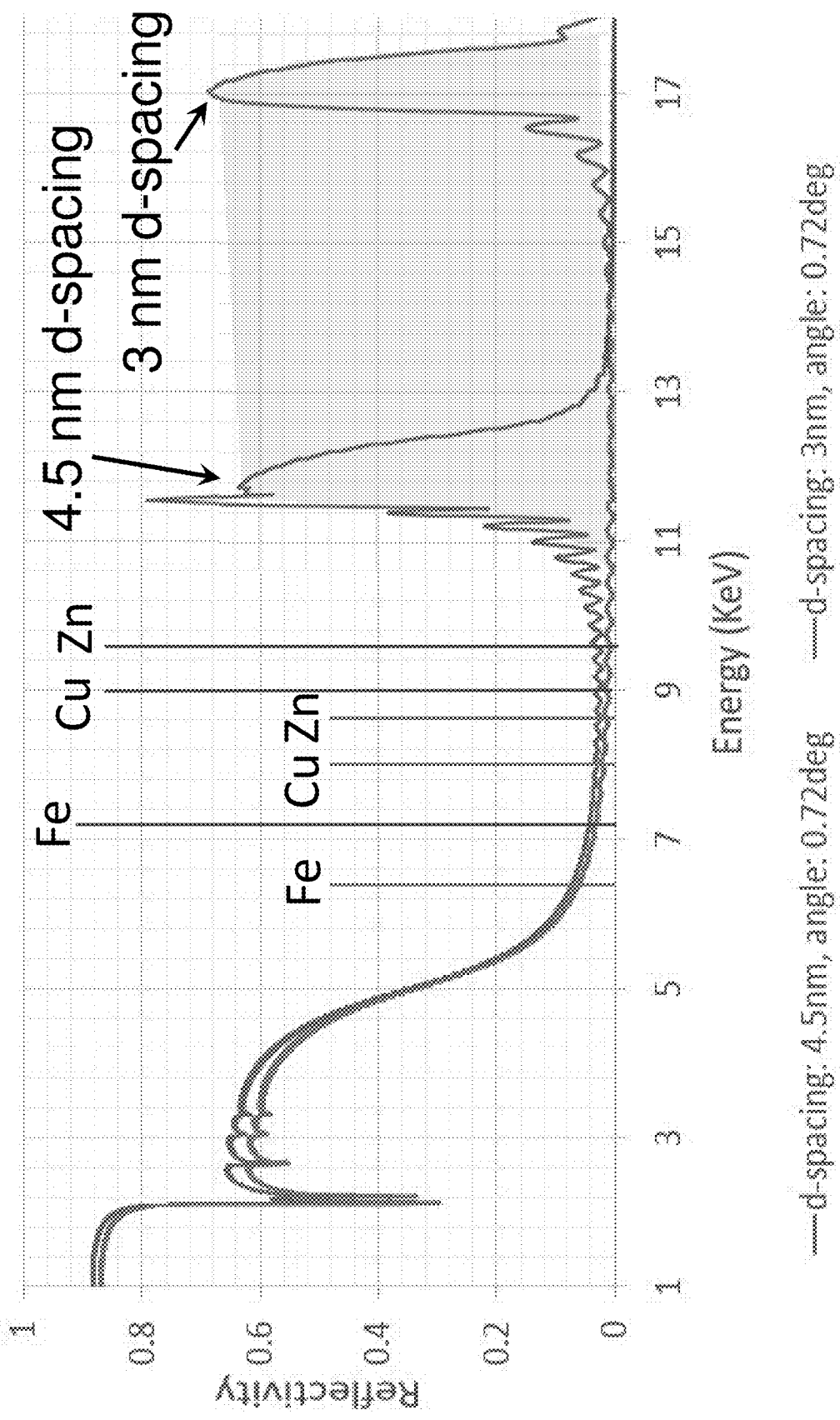
FIG. 5B shows two example x-ray spectra reflected from the upstream end of an ellipsoidal portion of an x-ray focusing optical element with an incidence angle of 12.5 mrad (0.72 degree) for 4.5 nm and 3 nm d-spacings, respectively, in accordance with certain embodiments described herein.

FIG. 5B shows two example x-ray spectra reflected from the upstream end 76 of the ellipsoidal portion of the x-ray focusing optical element 70 with an incidence angle of 12.5 mrad (0.72 degree) for 4.5 nm and 3 nm d-spacings, respectively. The three fluorescence lines of Fe, Cu, and Zn at 6.4 keV, 8.05 keV, and 8.64 keV, respectively, are within a range of x-ray energies that are not substantially reflected by the ellipsoidal portion of the x-ray focusing optical element 70. The x-ray energy range reflected by the depth-graded multilayer 90 at the upstream end 76 of the x-ray focusing optical element 70 (shown as the shaded region of FIG. 5B) ranges from 11.3 keV to 17 keV, which includes two of three intense L-lines of an Au target (11.44 keV and 11.61 keV) and also the Bremsstrahlung continuum. The 9.71 keV L-line of Au is not in this x-ray energy range, but only the downstream half (50%) of the mirror length has sufficiently large incidence angle to satisfy the Bragg reflection condition, so the total collection angle for this line is about 50% of the total collection angle for the two other Au lines. However, the associated loss of the reflected flux of this line is more than offset by the x-ray flux of the Bremsstrahlung continuum over the wide range of 4 keV energy bandwidth. The intensity of the most intense L-lines of Au is about 1000 times higher than the Bremsstrahlung continuum over the energy width of the lines (e.g., about 4 eV), so the x-ray flux of the focused second x-ray beam 32 may contain more up to 50% of the Bremsstrahlung continuum. Note that the lowest energy of the continuum is 8.9 keV, which is higher than the Zn Kα line energy. Therefore, the continuum contributes little to the background $B_{j,k}$ but contributes significantly to the fluorescence signal $F_{j,k}$ for Fe, Cu, and Zn.

As shown in FIGS. 5A and 5B, in certain embodiments, the depth-graded multilayer 90 of the x-ray focusing optical element 70 provides spectral "notch" filtering that approximates that shown in FIG. 4B and that reduces the background $B_{j,k}$ while efficiently reflecting and focusing x-rays of energies that are advantageous (e.g., nearly optimal) for efficiently generating fluorescence signals for elements with ionization absorption edge energies below 8.9 keV. In addition, in certain embodiments, the depth-graded multilayer 90 of the x-ray focusing optical element 70 advantageously increases the solid angle of collection of x-rays from the x-ray source 40 to increase the fluorescence signal $F_{j,k}$, as compared to that achieved using conventional focusing optics coated with a single layer of a high atomic number (Z) material.

As shown in the example reflectivity spectra of FIGS. 5A and 5B, the x-ray reflectivity for the x-ray focusing optical element 70 for energies between 5 keV-8.9 keV can be less than 5%. As a result, the background $B_{j,k}$ resulting from elastically scattering of the incident x-rays over the 5 keV-8.9 keV energy range (e.g., covering the Fe, Cu, and Zn Kα fluorescence lines) can be suppressed by more than a factor of 12 (e.g., by a factor approximately equal to the ratio of the minimum x-ray reflectivity of 60% divided by 5%). This background suppression can improve detection of biologically important elements (e.g., Fe, Co, Cu, Zn) and other elements with characteristic x-rays within that energy range. In addition, in certain embodiments, the 16.7 mrad Bragg (incidence) angle of the depth-graded multilayer 90 is about 2.8× larger than the critical angle of a mirror coated with a single 30-nm thick Au layer for 11.6 keV x-rays (e.g., about 6.2 mrad), resulting in a large solid angle collection of x-rays from the x-ray source 40. Also, in certain embodiments, the second x-ray spectrum reflected and focused by the x-ray focusing optical element 70 includes the Au L-lines and continuum and can be nearly optimal for generating large fluorescence cross sections and signals because these x-rays are slightly above the Zn K-absorption edge and not far above the K-absorption edges of Fe and Cu.

In certain embodiments, the combination of the increased x-ray fluorescence signal and the reduction of background provides a significant gain in the signal-to-noise ratio and the imaging speed for imaging the elements of interest. For example, as described more fully herein, the figure-of-merit (FOM) of certain embodiments is maximized by maximizing the flux of x-rays of energy greater than the K-edge absorption energy to increase the fluorescence signal $F_{j,k}$ and minimizing the background $B_{j,k}$. Besides examples such as Fe, Cu, and Zn (as shown in FIGS. 4A, 4B, 5A, and 5B), many other elements can be advantageously analyzed using certain embodiments described herein, for example, elements having characteristic fluorescence x-rays of energy in a range between 5 keV and 8.9 keV (e.g., the K fluorescence lines of Cr, Mn, Co, and Ni; the L fluorescence lines of various rare earth elements).

Certain embodiments described herein can be characterized by a figure of merit (FOM) that is indicative of the performance of the microXRF system. The minimum detection limit (MDL) using x-ray fluorescence analysis is proportional to $3*F_{j,k}/\mathrm{sqrt}(B_{j,k})$, i.e., MDL~3 $F'_{j,k}/\mathrm{sqrt}(B'_{j,k})$ =$3*F_{j,k}*T/\mathrm{sqrt}(B_{j,k}*T)$=$3*\mathrm{sqrt}(T)*F_{j,k}/\mathrm{sqrt}(B_{j,k})$, where $F'_{j,k}$ and $F_{j,k}$ is the total net counts and count rate (counts/s), respectively, of fluorescence x-rays of an element j for a given characteristic x-ray fluorescence line k integrated over the detector energy resolution band, and the $B'_{j,k}$ and $B_{j,k}$ are the total net counts and count rate (counts/s), respectively, of the background underneath the x-ray fluorescence signal ($F_{j,k}$), integrated over the same detector energy resolution band. Therefore, the time T required to obtain a given MDL is proportional to $B_{j,k}/F^2_{j,k}$, which can be defined as a Figure of Merit (FOM):

$$\mathrm{FOM} \sim F^2_{j,k}/B_{j,k} \qquad (1)$$

Certain embodiments described herein are advantageous based at least in part on increasing (e.g., maximizing) the x-ray fluorescence signal ($F_{j,k}$) and/or reducing (e.g., minimizing) the background contribution ($B_{j,k}$).

The x-ray fluorescence signal ($F_{j,k}$) detected by an energy dispersive detector 60 in an x-ray micro-XRF system is approximately given by:

$$F_{j,k} = F * \sigma_{j,k}(E) * N_j \Omega * \eta / 4\pi \qquad (2)$$

where F is the flux of the incident focused second x-ray beam, $\sigma_{j,k}(E)$ is the x-ray fluorescence cross section of the element j for the characteristic line k having energy E, $N_j$ is the number of atoms of the element j in the illuminated volume, $\Omega$ is the detector solid angle in steradians, and $\eta$ is a parameter that takes into account losses, including the detector detection efficiency and the attenuation of the fluorescence x-rays from the production point to the detector.

In an evaluation of a microXRF system (e.g., a comparison among different microXRF systems), $N_j$ is the concentration of elements to be measured and should be kept constant. The detector solid angle $\Omega$ and the loss parameter $\eta$ are largely dependent on the detector and physics (self-attenuation) and can be implemented, in principle, in most microXRF systems. Certain embodiments described herein are advantageous based at least in part on increasing (e.g., maximizing) the incident focused x-ray beam flux F and/or increasing (e.g., maximizing) the x-ray fluorescence cross section $\sigma_{j,k}(E)$.

With regard to increasing (e.g., maximizing) the incident focused x-ray beam flux F, the incident focused x-ray flux F can be expressed as:

$$F = B * L^2 * (2NA)^2 \qquad (3)$$

where B is the product of the x-ray source brightness B at the sample, with brightness B defined as number of x-rays per unit area and per unit solid angle illuminating the sample (and not to be confused with the background contribution $B_{j,k}$), L is the focus spot size, and NA is the numerical aperture (which is related to the collection solid angle) of the x-ray focusing optic. The product of $L^2$ and $(2NA)^2$ is the square of the phase space of the focused x-ray beam.

Certain embodiments described herein are advantageous based at least in part on increasing (e.g., maximizing) the x-ray source brightness B and increasing (e.g., maximizing) the collection solid angle of the x-ray focusing optical element 70 for a given probe spot size L. For example, a high source brightness can be achieved using a microstructured target x-ray source 40 (see, e.g., U.S. Pat. Nos. 9,874,531, 9,823,203, 9,719,947, 9,594,036, 9,570,265, 9,543,109, 9,449,781, 9,448,190, and 9,390,881, each of which are incorporated in its entirety by reference herein) that comprises micron-sized metal targets 42 on or embedded in an anode substrate 44 (e.g., diamond). The brightness B of an electron bombardment x-ray source 40 is directly proportional to the electron power density on the anode, which can be limited by the melting of the anode and therefore the thermal dissipation properties of the anode. Due to the excellent thermal properties of diamond, with a thermal conductivity that is five times that of Au at room temperature, certain embodiments described herein advantageously load the anode with substantially higher electron power densities within a spot (e.g., 8-10 µm spot size) than are used for bulk metal anodes as used in conventional sources. Additional benefits of the microstructured anode include (i) the high temperature gradient between the micron-sized metal targets 42 and the surrounding diamond substrate 44 due to the differential energy deposition rate of the incident electrons, which is proportional to mass density, in the metal material of the target 42 (with higher mass density) versus in the diamond substrate 44 (with lower mass density) and/or (ii) the small size of the microstructure targets 42 have maximal contact between the microstructure target 42 and the diamond substrate 44. The microstructured x-ray source 40 also enables the use of one or more metal materials for the target 42 with x-ray spectral properties optimal for the intended applications (e.g., Au) and/or that otherwise would be impractical to use.

With regard to increasing (e.g., maximizing) the x-ray fluorescence cross section $\sigma_{j,k}(E)$, the x-ray fluorescence cross section $\sigma_{j,k}(E)$ is equal to the product of the ionization cross section and the fluorescence yield of the characteristic line, which is constant for a given element. The ionization cross section strongly depends on the energy of the incident x-ray beam E and is proportional to $(E-E_{j,k})^{-3}$, so the x-ray fluorescence cross section is as well, that is:

$$\sigma_{j,k}(E) \sim (E-E_{j,k})^{-3} \qquad (4)$$

where $E_{j,k}$ is the photon ionization energy of the element j for producing characteristic line k.

Certain embodiments described herein are advantageous based at least in part on selecting the x-ray energy of the excitation beam to increase (e.g., maximize) the quantity $(E-E_{j,k})^{-3}$. For example, a microstructured target 42 comprising Au can provide nearly optimal spectra for increasing $\sigma_{j,k}(E)$ for many elements, including but not limited to: Fe, Cu, and Zn. FIG. 6 shows a table which lists the x-ray fluorescence cross sections of Fe, Cu, and Zn (used in FIG. 6 as benchmark examples) at four x-ray excitation energies: two major Au L-lines (9.71 keV and 11.44 keV) and two characteristic K-lines of Cu and Mo, target materials widely used in conventional x-ray sources. Other widely used target materials in conventional x-ray sources, such as W and Cr can be unsuitable for the intended applications, since the characteristic L-lines of W and K-lines of Cr are lower than the K-absorption edges of Cu and Zn. As shown in FIG. 6, the two major Au x-ray L-lines have energies above the K-absorption edges of Fe, Cu, and Zn (e.g., three biologically important trace elements) and have large fluorescence cross sections that are three times larger than the fluorescence cross sections of these elements using the characteristic K-line of a Mo target x-ray source. Therefore, an x-ray source with Au microstructured target can provide significantly better spectral properties for generating x-ray fluorescence signals for the three biologically important elements in FIG. 6. These three elements (Fe, Cu, Zn) are discussed herein as benchmark elements because: 1) they exist in very trace quantities and 2) they are of particular interest among various biomedical researchers due to the various pathologies related to their dysregulation and the nature of these trace elements. However, certain embodiments utilizing an Au microstructured x-ray source 40, as described herein, can also be beneficial for many other trace elements of interest, including but not limited to: Mn, Co, Ni, Pt, etc., which each have one or more fluorescence lines in the 5 keV-8.9 keV energy band.

With regard to decreasing the background contribution ($B_{j,k}$), the background contribution $B_{j,k}$ of the x-ray spectrum recorded in a microXRF system arises from two major factors: (i) incident x-rays that are scattered by the sample 50 and detected by the energy dispersive detector 60 (and that have energies within the same energy bandwidth of the corresponding fluorescence signal), and (ii) incomplete charge collection of the energy dispersive detector 60, specified as the peak to background (P/B) ratio. Because widely-used energy dispersive detectors 60 typically have a large P/B ratio (e.g., equal to 20,000), the background contribution $B_{j,k}$ is dominated by the scattered incident x-rays for a microXRF system. Certain embodiments described herein are advantageous based at least in part on reducing (e.g., minimizing) the incident x-rays within the energy bandwidth of the corresponding fluorescence signal (s) of trace level elements to reduce (e.g., minimize) $B_{j,k}$, thereby achieving a large FOM for biologically relevant trace elements. This reduction of $B_{j,k}$ can be especially advantageous when analyzing trace elements with weak x-ray fluorescence signals ($F_{j,k}$).

In certain embodiments, the focusing x-ray optical element 70 comprising the depth-graded multilayer 90 is configured to provide substantial improvement over conventional focusing x-ray optics (e.g., an x-ray optic comprising a coating having a single layer of Pt). For example, the focusing x-ray optical element 70 comprising the depth-graded multilayer 90 can include the following attributes:

1.6 μm resolution (focus spot size) by demagnifying the 8 μm source by a factor of 5;

Small decrease of the x-ray fluorescence signals ($F_{j,k}$) (e.g., by a factor of 0.49) with the small 1.6 μm focused spot size. The small decrease of $F_{j,k}$ can be due to the following combination of factors:

Increase by a factor of 9 in the solid angle of collection of x-rays from the x-ray source by the multilayer coated focusing x-ray optical element ($NA^2$ in expression (3)) due to the Bragg angle reflection of the multilayers being 3 times larger than the critical angle of a single Pt coating of conventional focusing x-ray optical elements;

Multilayer reflectivity of 45% (η in expression (2)),

Reduction by a factor of 25 in the focus size area ($L^2$ in expression (3)), and Increase by a factor of 3 in the x-ray fluorescence cross sections ($\sigma_{j,k}(E)$ in expression (2)) due to the Au L-lines with larger fluorescence cross sections of Fe, Cu, Zn.

Multiplying these factors together results in a net change of $F_{j,k}$ by (9*0.45*3/25)=0.49.

Decrease (e.g., by more than a factor of 12) in the background count rate $B_{j,k}$ over the x-ray energy range of 5 keV-8.9 keV for imaging Fe, Cu, and Zn due to reducing (e.g., by more than a factor of 12) the Bremsstrahlung continuum over the energy range in the incident focused x-ray beam.

Increase (e.g., by at least a factor of $3=0.49^2*12$) in the combined net gain in the FOM (see e.g., expression (1)), including the gain from the Au microstructured anode.

In certain embodiments, the net gain in FOM (expression (1)) of a factor of 3 compared to other microXRF systems results from a combination of: a 3× increase of the relative gain in fluorescence cross section of the focused second x-ray beam 32, a 9× increase of the solid angle collection of x-rays from the x-ray source 40, offset by 45% multilayer reflectivity, a 12× reduction of the unwanted background, and a 25× loss of the number of metal atoms due to the reduction of area resulting from the 5× higher resolution (e.g., 5:1 demagnification).

A major challenge for laboratory-based microXRF is to image trace concentrations of the large number of biologically important elements with sufficient sensitivity and at acceptable speeds, and it can be even more challenging to do so at high resolutions. The FOM of a laboratory-based microXRF system can be indicative of the time required to image elements with trace level concentration in biological specimens with sufficient detection sensitivity at a high spatial resolution, an important measurement of performance of a laboratory-based microXRF system. Certain embodiments described herein can provide such images in a shorter amount of time than conventional systems.

Figure 7:
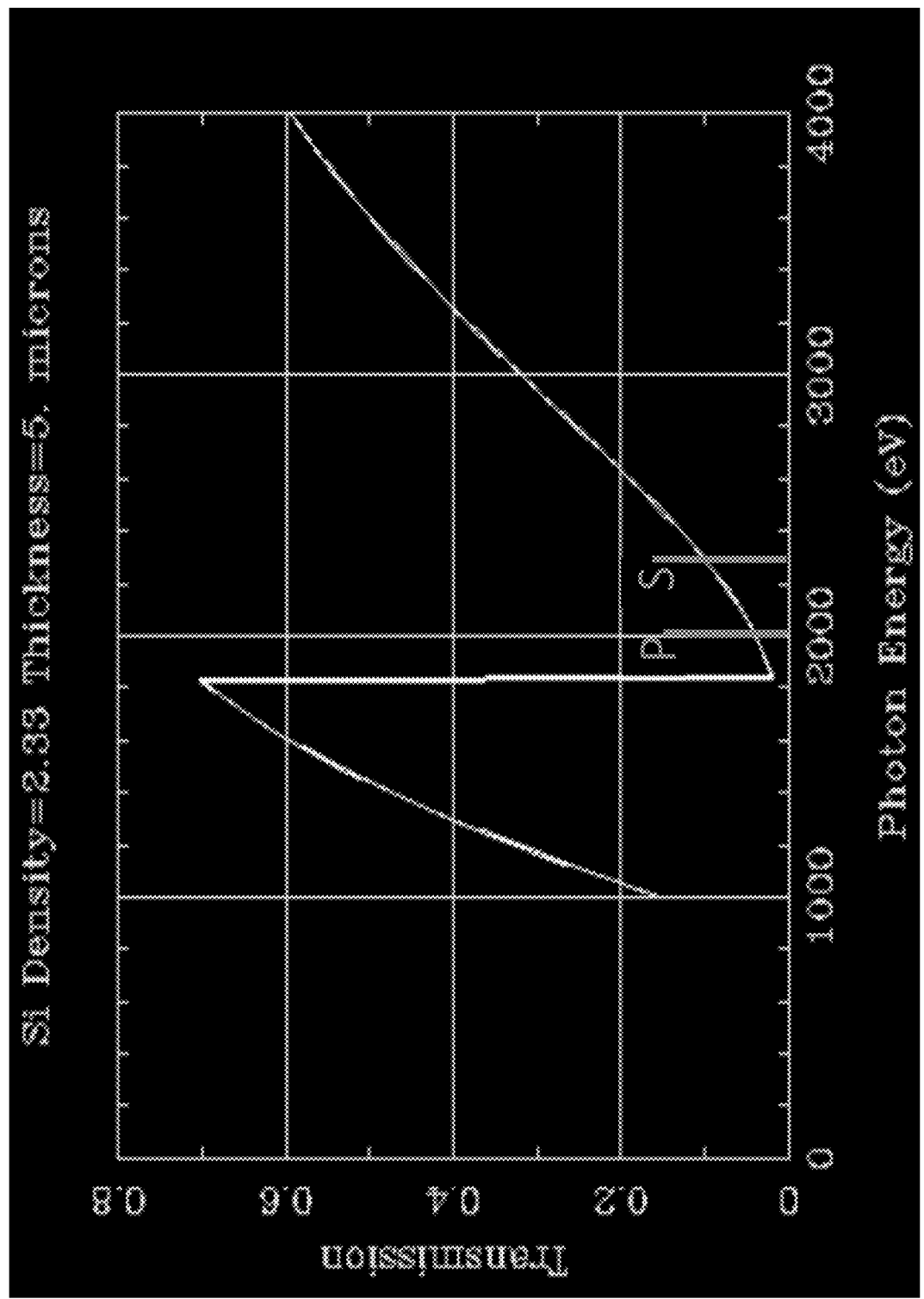
FIG. 7 shows the suppression of unwanted background under the P and S K-line fluorescence using a 5 mm thick Si filter in accordance with certain embodiments described herein.

In certain embodiments, at large incidence angles of the depth-graded multilayer 90, lower energy x-rays (e.g., up to 4 keV) can be reflected with relatively high efficiency, and these energies can be above the K-absorption edges of P and S. In certain embodiments, a thin film filter (e.g., about 5 mm thick Si) is positioned in the focused x-ray beam path to suppress the unwanted background under the fluorescence lines of P and S. FIG. 7 shows the suppression of unwanted background under the P and S K-line fluorescence using a 5 mm thick Si filter in accordance with certain embodiments described herein. The increase of solid angle of collection of the x-rays from the x-ray source 40 leads to an increase of the flux of the focused x-rays at energies above the K-absorption edge energies of P and S (e.g., by about 5×, which is approximately equal to 9× multiplied by the reflectivity shown in FIGS. 5A and 5B). The combined benefits of the increased solid angle of collection and the background suppression can be offset by a 25× loss of the number of P and S atoms in the probed area/volume due to the 5× higher resolution (e.g., 5:1 demagnification). This net result, combined with their naturally higher concentration, provides sufficient fluorescence signals for imaging.

Figure 8A:
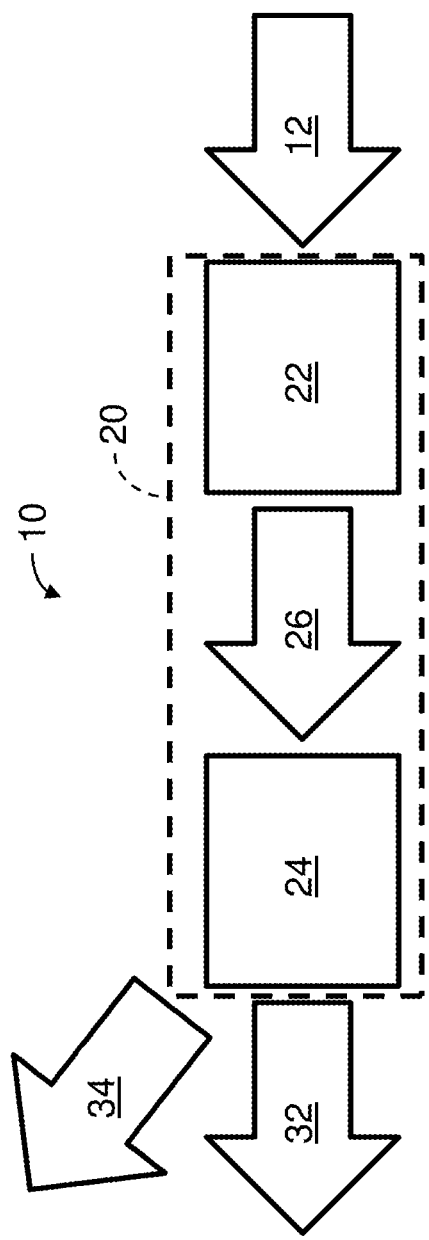
Figure 8B:
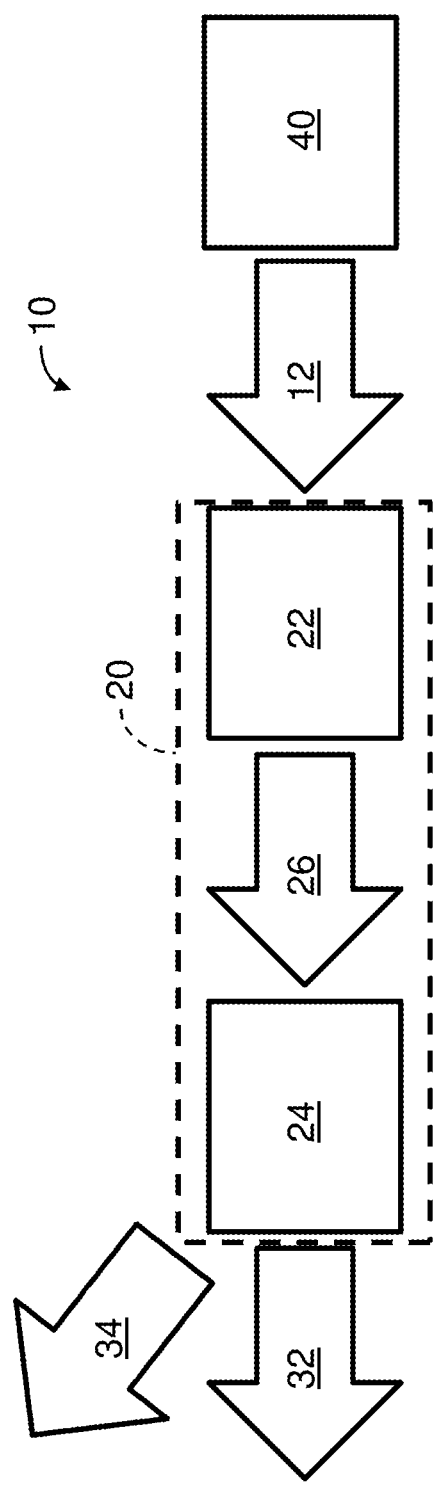

FIGS. 8A-8D schematically illustrates various other examples of the x-ray optical system 10 in accordance with certain embodiments described herein. As schematically illustrated by FIGS. 8A-8D, the at least one x-ray optical element 20 (e.g., mirror) comprises at least one first x-ray optical element 22 (e.g., mirror) and at least one second x-ray optical element 24 (e.g., mirror). The at least one first x-ray optical element 22 is configured to receive at least a portion of a first x-ray beam 12 having a first energy spectrum and to reflect at least some of the x-rays 26 of the portion of the first x-ray beam 12 (e.g., the x-rays 26 can have an energy spectrum substantially the same as or substantially different from the first energy spectrum). The at least one second x-ray optical element 24 is configured to receive at least some of the x-rays 26 from the at least one first x-ray optical element 22, to transmit a second x-ray beam 32 comprising a transmitted (e.g., non-reflected and non-absorbed) portion of the x-rays 26 received from the at least one first x-ray optical element 22, and to reflect a reflected portion 34 of the x-rays 26 received from the at least one x-ray optical element 22. The second x-ray beam 32 has a second energy spectrum with a reduced intensity, as compared to the first energy spectrum, in a predetermined range of x-ray energies. As schematically illustrated by FIG. 8B, the x-ray optical system 10 can further comprise an x-ray source 40 configured to generate the first x-ray beam 12, and as schematically illustrated by FIGS. 8C and 8D, the x-ray optical system 10 can further comprise at least one x-ray detector 60 configured to detect fluorescence x-rays 52 from a sample 50 (e.g., from the first surface 54 irradiated by the second x-ray beam 32 and/or from a second surface 56 opposite to the first surface 54 irradiated by the second x-ray beam 32).

In certain embodiments, the at least one first x-ray optical element 22 comprises at least one x-ray condenser (e.g., at least one x-ray optical element configured to collect and direct x-rays) having a reflective interface region (e.g., surface) configured to receive at least some of the x-rays of the first x-ray beam 12 and to reflect (e.g., at grazing incidence; total external reflection) at least some of the received x-rays 26 of the first x-ray beam 12. In certain embodiments, the at least one first x-ray optical element 22 is unitary (e.g., a single piece) and is axially symmetric about a longitudinal axis. For example, the at least one first x-ray optical element 22 can comprise a hollow axially symmetric tube or portion of a tube (e.g., capillary) extending along a longitudinal axis and comprising an inner surface (e.g., mirror surface) that extends fully around the longitudinal axis (e.g., encircles the longitudinal axis; extends 360 degrees around the longitudinal axis). In certain other embodiments, the at least one first x-ray optical element 22 comprises at least one portion of a hollow axially symmetric structure (e.g., a portion of an axially symmetric tube) extending along the longitudinal axis with an inner surface that extends only partially around the longitudinal axis (e.g., less than 360 degrees; in a range of 45 degrees to 360 degrees; in a range of 45 degrees to 315 degrees; in a range of 180 degrees to 360 degrees; in a range of 90 degrees to 270 degrees). In certain embodiments, the at least one first x-ray optical element 22 comprises multiple portions (e.g., 2, 3, 4, 5, 6, or more) separate from one another (e.g., with spaces between the portions) and distributed around the longitudinal axis, with the surface of each portion extending at least partially around and along the longitudinal axis. For example, the surfaces of the multiple portions can each extend around the longitudinal axis by an angle in a range of 15 degrees to 175 degrees, in a range of 30 degrees to 115 degrees, and/or in a range of 45 degrees to 85 degrees. In certain other embodiments, the at least one first x-ray optical element 22 comprises a plurality of portions (e.g., a polycapillary lens comprising a plurality of capillary tubes) positioned about a longitudinal axis.

Figure 9A:
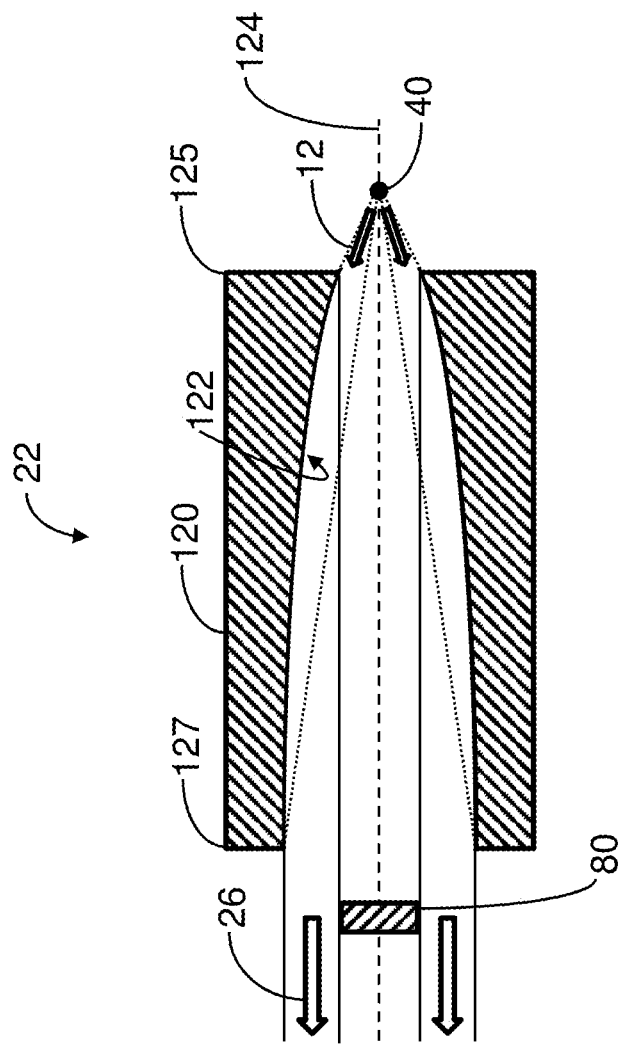
FIG. 9A schematically illustrates a cross-sectional view of an example first x-ray optical element comprising at least one capillary tube in accordance with certain embodiments described herein.

FIG. 9A schematically illustrates a cross-sectional view of an example first x-ray optical element 22 comprising at least one capillary tube 120 in accordance with certain embodiments described herein. The capillary tube 120 (e.g., glass; quartz; silicon) of FIG. 9A is unitary and has an inner surface 122 that is axially symmetric about a longitudinal axis 124 of the capillary tube 120. In certain embodiments, the inner surface 122 comprises at least one metal layer (e.g., Au; Pt; Ir) configured to facilitate reflection of x-rays by the inner surface 122 (e.g., by increasing the critical angle of total external reflection). As schematically illustrated by FIG. 9A, the capillary tube 120 of certain embodiments comprises a paraboloidal-shaped reflective interface region (e.g., inner surface 122). In certain other embodiments, the capillary tube 120 comprises a reflective interface region with a portion that is quadric-shaped (e.g., paraboloidal; ellipsoidal; hyperboloidal) or that approximates a quadric shape. For shapes of the reflective interface region that comprise a focal point (e.g., paraboloidal; ellipsoidal; hyperboloidal), in certain embodiments, at least a portion of the x-ray source 40 is positioned at the focal point, while in certain other embodiments, the x-ray source 40 is displaced from the focal point. The x-ray source 40 can be positioned away from an upstream end 125 of the at least one capillary tube 120 (e.g., by a distance in a range less than 10 cm). Examples of capillary-tube reflective optics 120 compatible with certain embodiments described herein are disclosed by U.S. Pat. Nos. 9,874,531, 9,823,203, 9,594,036, 9,570,265, 9,543,109, 9,449,781, 9,448,190, and 9,390,881, each of which is incorporated in its entirety by reference herein.

As schematically illustrated by FIG. 9A, the at least one first x-ray optical element 22 can further comprise at least one beam stop 80 positioned along a line coincident with the longitudinal axis 124 of the at least one capillary tube 120 (e.g., at or near the upstream end 125 of the at least one capillary tube 120; at or near the downstream end 127 of the at least one capillary tube 120; upstream from the at least one capillary tube 120; downstream from the at least one capillary tube 120). For example, as schematically illustrated by FIG. 9A, a first portion of the first x-ray beam 12 impinges the inner surface 122 of the capillary tube 120 and the x-rays 26 are reflected by the inner surface 122 (e.g., forming a collimated x-ray beam), while a second portion of the first x-ray beam 12 propagates through a center region of the capillary tube 120 and does not impinge the inner surface 122 of the capillary tube 120. The at least one beam stop 80 of certain embodiments comprises at least one material that is opaque to the x-rays (e.g., lead) and the at least one beam stop 80 is configured to prevent (e.g., block) the second portion of the first x-ray beam 12 from contributing to the x-rays 26. In certain embodiments, the x-rays 26 form an x-ray beam having an annular cross-sectional shape in a plane perpendicular to the longitudinal axis 124.

Figure 9B:
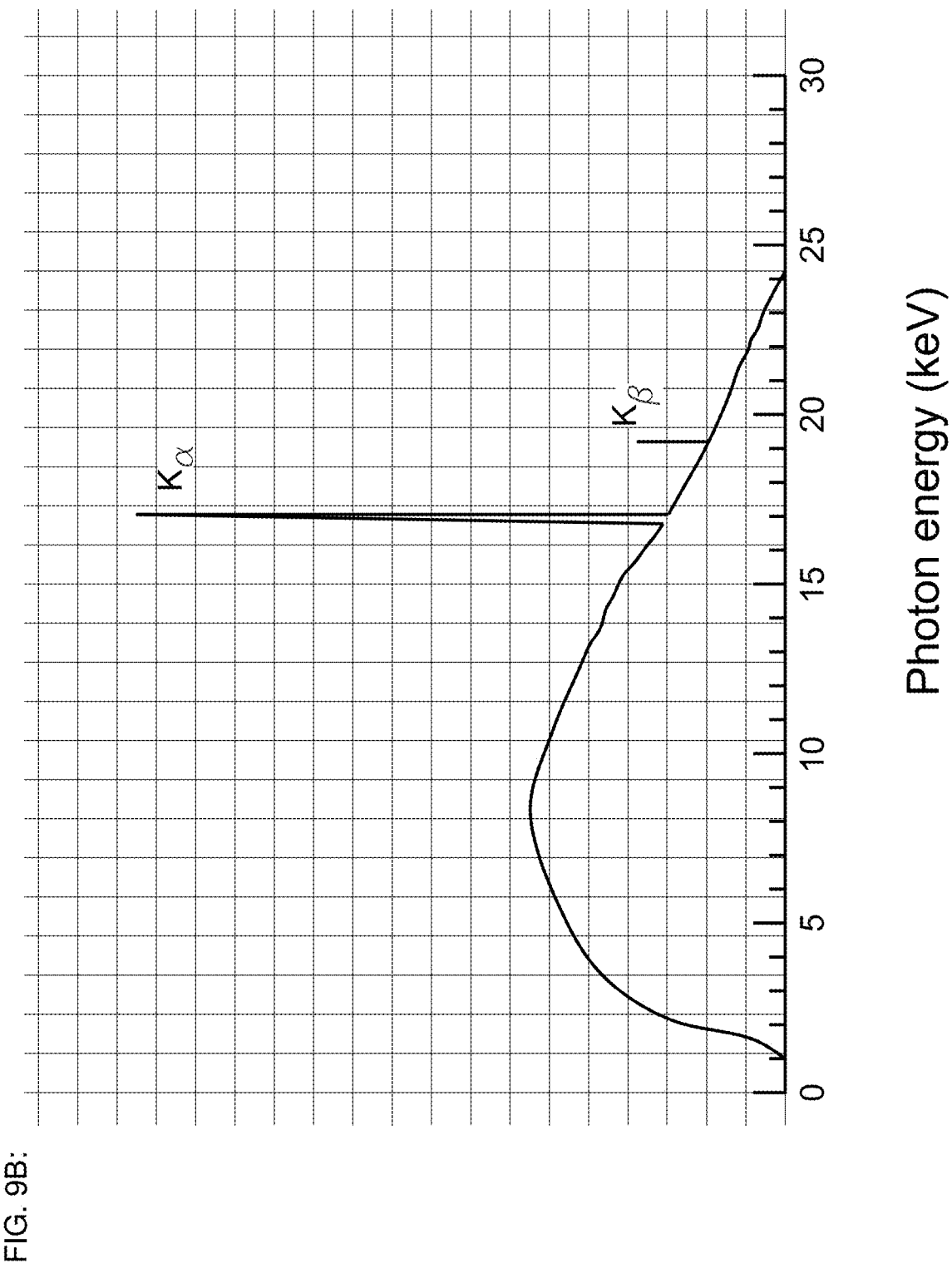
FIG. 9B schematically illustrates an example first x-ray energy spectrum of the first x-ray beam in accordance with certain embodiments described herein.

In certain embodiments, the x-rays 26 form an x-ray beam having a beam size (e.g., outer diameter) that is in a range of less than 3 mm (e.g., in a range between 1 mm and 3 mm) at a downstream end 127 of the at least one first x-ray optical element 22. In certain embodiments, the portion of the first x-ray beam 22 received by the at least one first x-ray optical element 22 is divergent (e.g., has a first divergence angle in a range of 5 mrad to 60 mrad) and the x-rays 26 of certain embodiments form a collimated x-ray beam (e.g., having a second divergence angle in a range less than two mrad, less than 1.5 mrad, or less than 1 mrad). FIG. 9B schematically illustrates an example first x-ray energy spectrum of the first x-ray beam 12 (e.g., x-rays from the x-ray source 40) in accordance with certain embodiments described herein. In certain embodiments, the x-rays 26 have an x-ray energy spectrum that is substantially the same as the first x-ray energy spectrum of the first x-ray beam 12, while in certain other embodiments, the x-rays 26 have an x-ray energy spectrum that differs from the first x-ray energy spectrum of the first x-ray beam 12 (e.g., has a high energy cutoff due to the critical angle for total external reflection from the at least one first x-ray optical element 22).

Figure 10A:
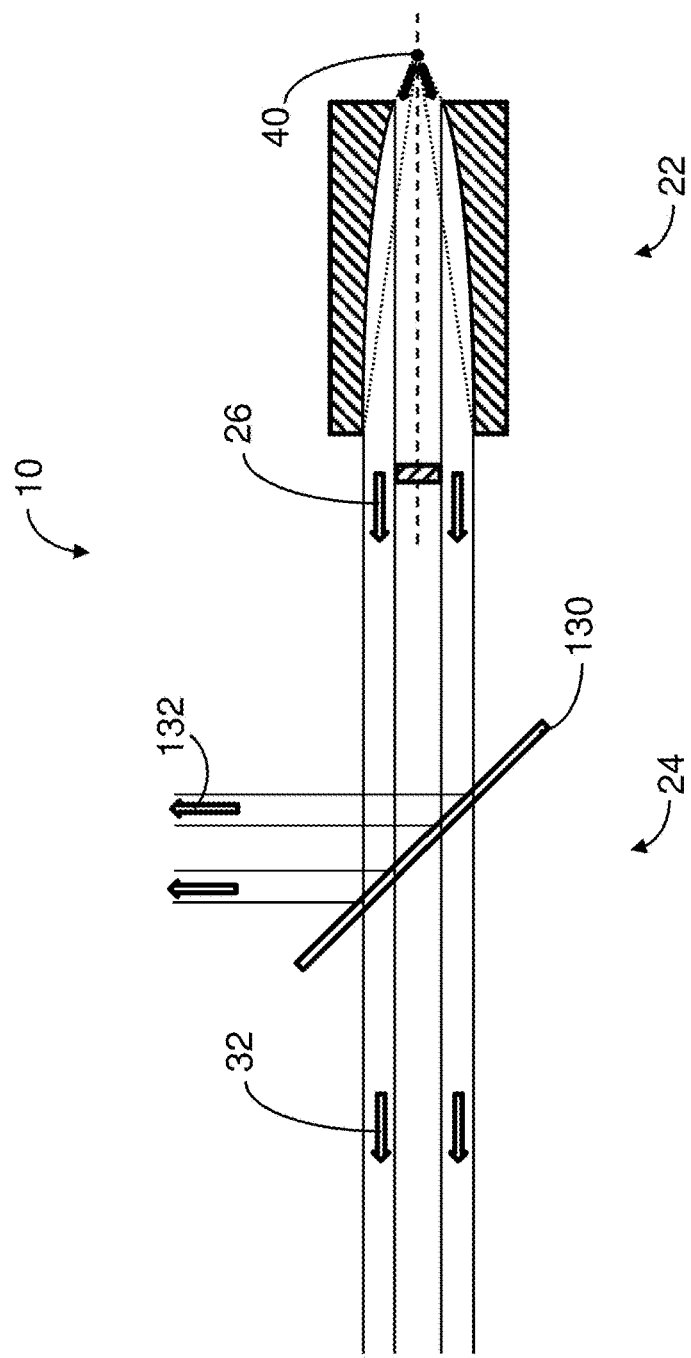
FIG. 10A schematically illustrates an example system in which the at least one second x-ray optical element comprises at least one x-ray reflector in accordance with certain embodiments described herein.
Figure 10B:
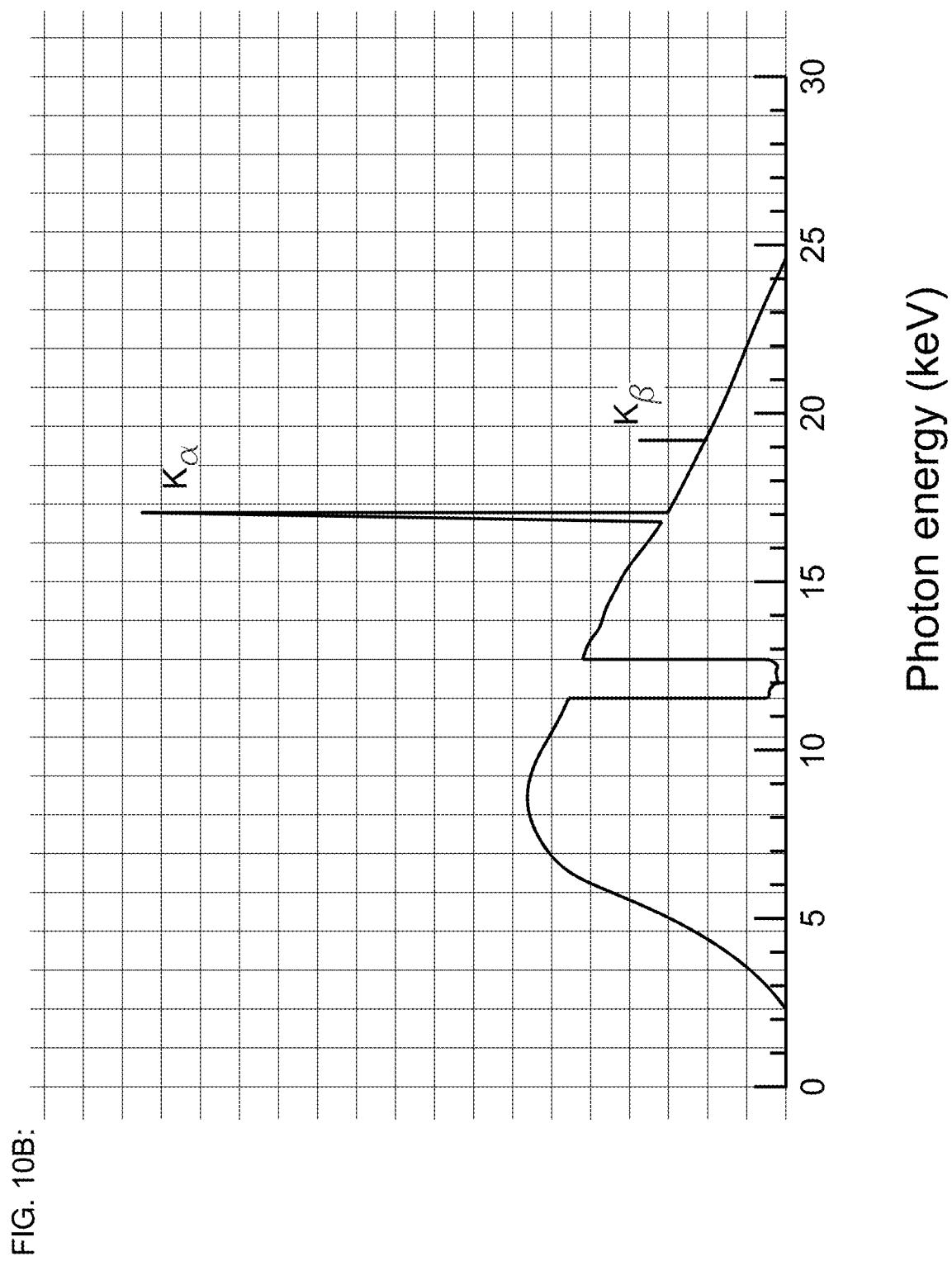
FIG. 10B schematically illustrates an example second x-ray energy spectrum of the second x-ray beam of FIG. 10A in accordance with certain embodiments described herein.
Figure 11A:
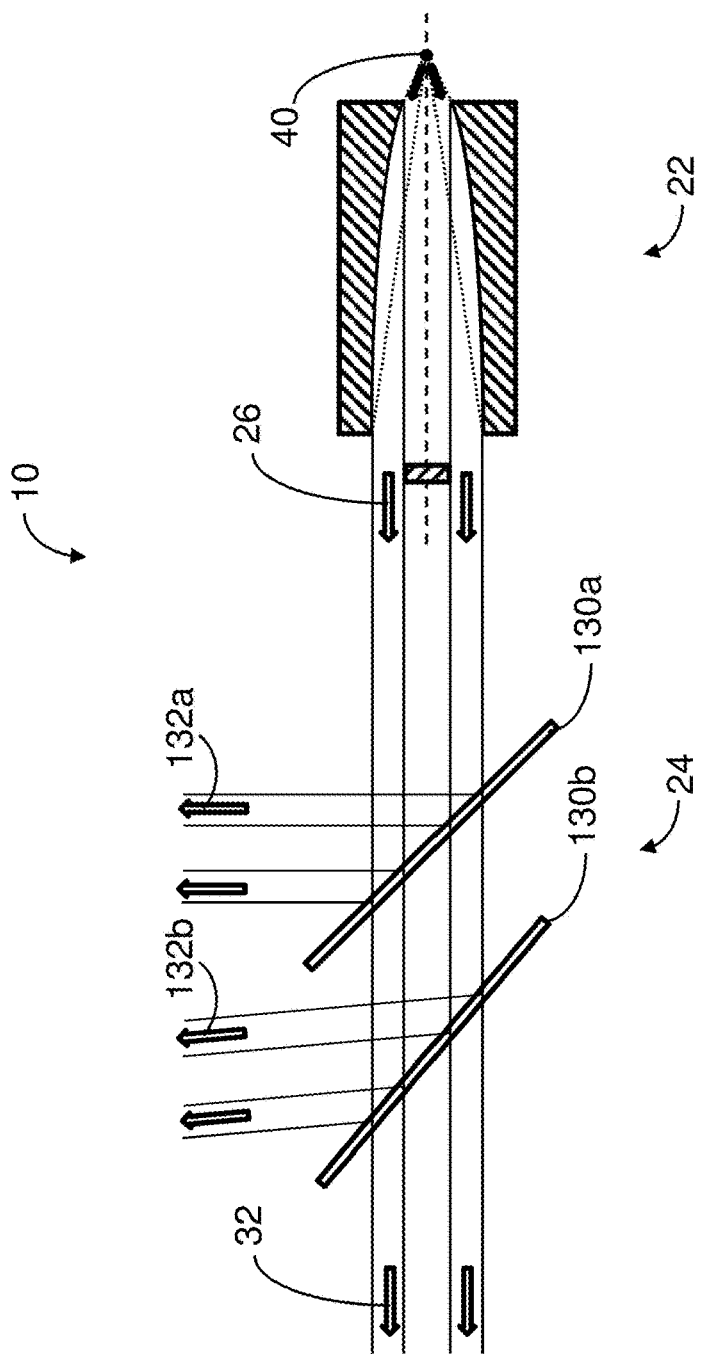
FIG. 11A schematically illustrates an example system in which the at least one second x-ray optical element comprises a plurality of x-ray reflectors in accordance with certain embodiments described herein.
Figure 11B:
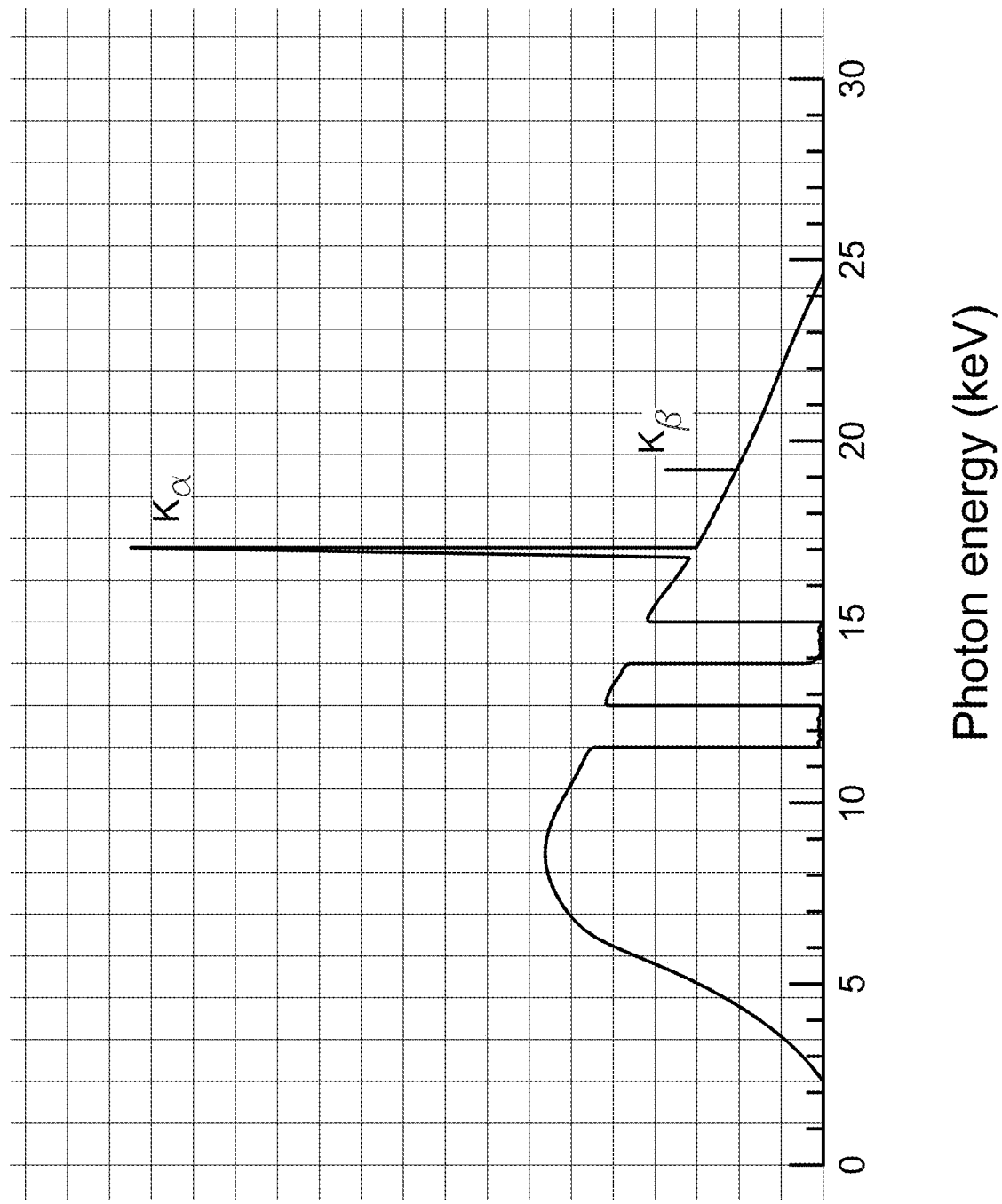
FIG. 11B schematically illustrates an example second x-ray energy spectrum of the second x-ray beam of FIG. 11A in accordance with certain embodiments described herein.
Figure 12A:
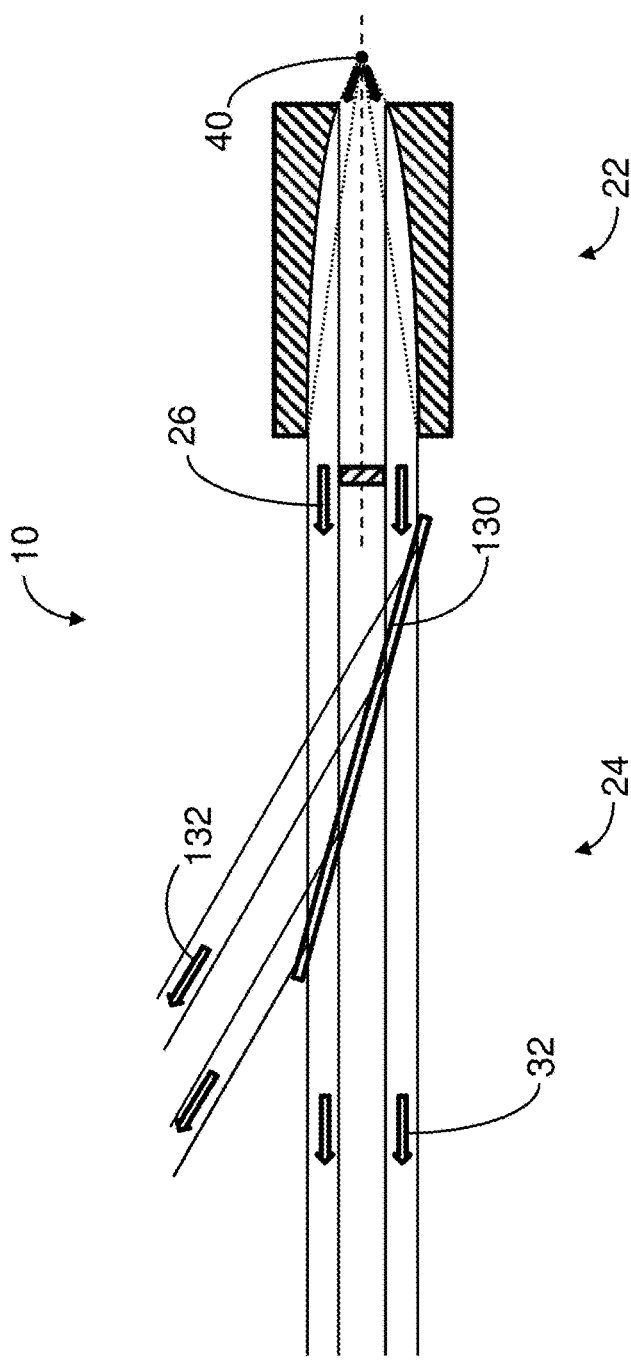
FIG. 12A schematically illustrates an example system in which the at least one x-ray reflector comprises at least one grazing incidence mirror in accordance with certain embodiments described herein.
Figure 12B:
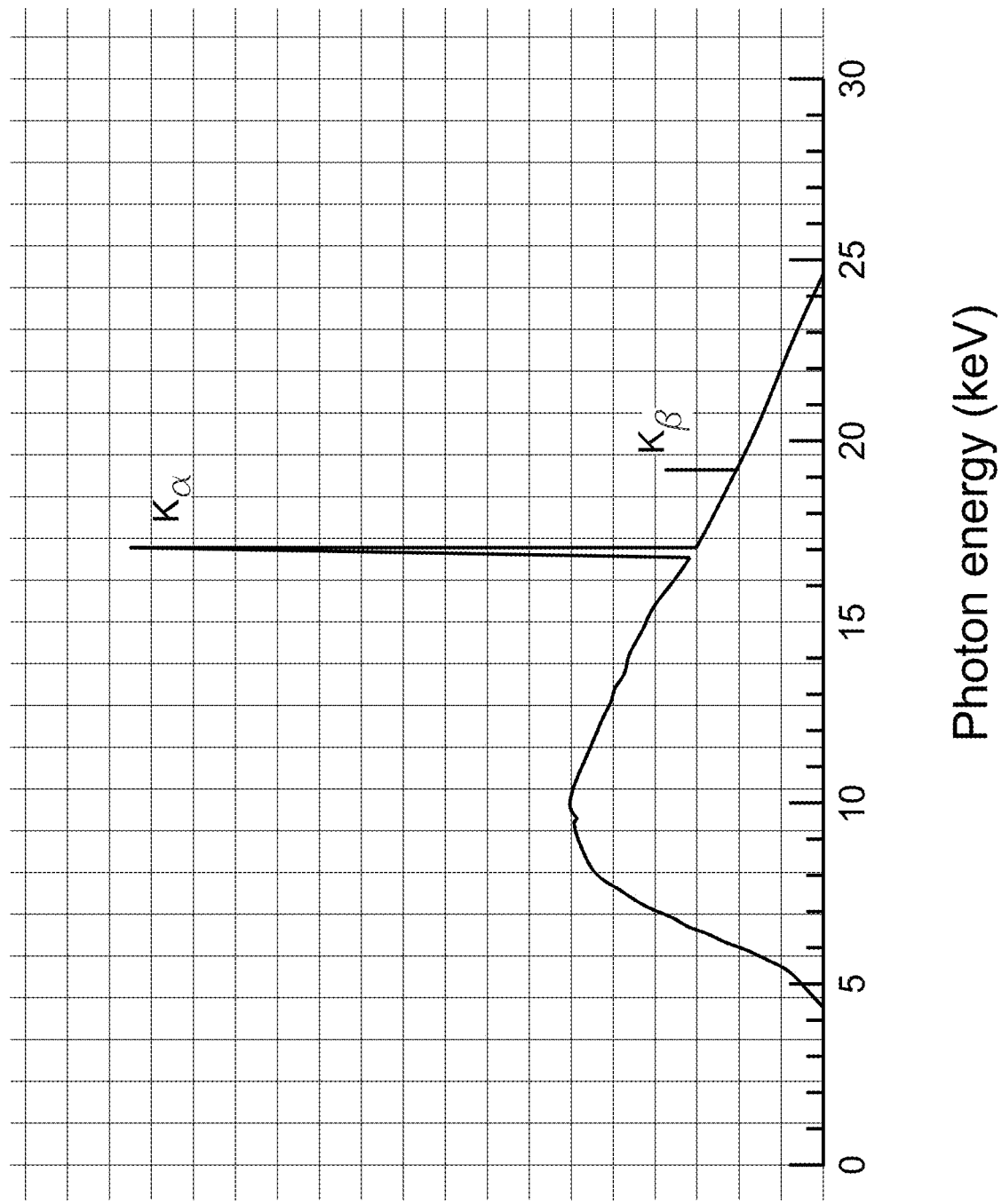
FIG. 12B schematically illustrates an example second x-ray energy spectrum of the second x-ray beam of FIG. 12A in accordance with certain embodiments described herein.

FIG. 10A schematically illustrates an example system 10 in which the at least one second x-ray optical element 24 comprises at least one x-ray reflector 130 (e.g., comprising at least one mosaic crystal layer and/or at least one depth-graded multilayer) in accordance with certain embodiments described herein. FIG. 10B schematically illustrates an example second x-ray energy spectrum of the second x-ray beam 32 (e.g., x-rays transmitted through the at least one x-ray reflector 130) of FIG. 10A in accordance with certain embodiments described herein. FIG. 11A schematically illustrates an example system 10 in which the at least one second optical element 24 comprises a plurality (e.g., two; three or more) x-ray reflectors 130 in accordance with certain embodiments described herein. FIG. 11B schematically illustrates an example second x-ray energy spectrum of the second x-ray beam 32 (e.g., x-rays transmitted through the multiple x-ray reflectors 130) of FIG. 11A in accordance with certain embodiments described herein. FIG. 12A schematically illustrates an example system 10 in which the at least one x-ray reflector 130 comprises at least one grazing incidence mirror in accordance with certain embodiments described herein. FIG. 12B schematically illustrates an example second x-ray energy spectrum of the second x-ray beam 32 (e.g., x-rays transmitted through the at least one x-ray reflector 130) of FIG. 12A in accordance with certain embodiments described herein. The at least one x-ray reflector 130 of FIGS. 10A-10B and 11A-11B can comprise at least one mosaic crystal layer, at least one depth-graded multilayer reflector, and/or at least one grazing incidence mirror, as described herein.

The at least one x-ray reflector 130 is configured to reflect a first portion 132 of the x-rays 26 having energies in at least one predetermined energy range and to transmit a second portion of the x-rays 26 having energies outside the at least one predetermined energy range. As described herein, the transmitted second portion of the x-rays 26 is used as the second x-ray beam 32 which irradiates the sample being analyzed, the second x-ray beam 32 consisting essentially of the at least some of the non-reflected x-rays that are transmitted through the at least one x-ray reflector 130.

For example, the at least one x-ray reflector 130 can comprise at least one mosaic crystal layer on a substrate (e.g., silicon or glass having a thickness in a range of 0.2 millimeter to 1 millimeter). Example materials of the at least one mosaic crystal layer compatible with certain embodiments described herein include but are not limited to, highly oriented pyrolytic graphite (HOPG) or highly aligned pyrolytic graphite (HAPG). The mosaic crystal layer comprises a plurality of crystalline portions (e.g., domains; crystallites) tilted relative to one another with a mosaicity (e.g., range of crystal plane orientations; range of normal directions of the crystal planes). In certain embodiments, the mosaicity is less than three degrees. The x-ray reflector 130 of certain embodiments comprising at least one mosaic crystal layer and a substrate has a thickness in a range of 0.5 mm to 3 mm and the mosaic crystal layer comprises a low atomic number material (e.g., carbon; silicon; quartz) such that absorption of the x-rays 26 by the mosaic crystal layer is lower than a predetermined upper bound (e.g., less than 20%; less than 10%; less than 5%; less than 3%). In certain embodiments, the at least one mosaic crystal layer is planar, while in certain other embodiments, the at least one mosaic crystal layer is curved or bent (e.g., controllably bent to adjust the incident angle at which the x-rays 26 impinge the crystalline portions). In certain embodiments, the at least one mosaic crystal layer is oriented such that a surface of the at least one mosaic crystal layer is in a range of 6 degrees to 20 degrees, in a range of 15 degrees to 40 degrees, in a range of 40 degrees to 50 degrees, or in a range of 40 degrees to 65 degrees, relative to the x-rays 26 (e.g., relative to a collimated x-ray beam comprising the x-rays 26).

At least a first portion 132 of the x-rays 26 impinging the mosaic crystal layer satisfies the Bragg reflection condition for at least some of the crystalline portions of the mosaic crystal layer. The Bragg reflection condition can be expressed as: $2d \cdot \sin\theta = n \cdot \lambda$, where d is the interplanar spacing between the crystal planes (e.g., carbon layers) of a crystalline portion, $\theta$ is the incident angle of the x-ray relative to the crystal planes of the crystalline portion, n is the integer order of the reflection, and $\lambda$ is the wavelength of the incident x-rays (with the x-ray wavelength related to the x-ray energy by the relation: $E = h \cdot c / \lambda$, where E is the energy, h is Planck's constant, and c is the speed of light). The first portion 132 of the x-rays 26 satisfying the Bragg reflection condition for at least some of the crystalline portions of the mosaic crystal layer is reflected by the mosaic crystal layer. The remaining portion of the x-rays 26 that does not satisfy the Bragg reflection condition for any of the crystalline portions of the mosaic crystal layer is not reflected by the mosaic crystal layer and is transmitted through the mosaic crystal layer (e.g., with substantially no attenuation), thereby forming the second x-ray beam 32.

In certain embodiments, due to the slight misalignment among the crystalline portions of the mosaic crystal layer and the small divergence angle of the incident x-rays 26, some of the x-rays 26 within a narrow range of wavelengths will find a crystalline portion for which the Bragg reflection condition is satisfied and will be reflected by the mosaic crystal layer so as to not contribute to the second x-ray beam 32. The mosaic crystal layer can be configured to have a mosaicity and to be oriented relative to the x-rays 26 (e.g., relative to a collimated x-ray beam comprising the x-rays 26) to reflect x-rays having a range of energies with a predetermined central value and predetermined bandwidth (e.g., a range having a lower bound and an upper bound), thereby preventing x-rays within the range (e.g., between the lower bound and the upper bound) from contributing to the second x-ray beam 32.

For another example, the at least one x-ray reflector 130 can comprise at least one depth-graded multilayer reflector, an example of which is schematically illustrated by FIG. 3C. The depth-graded multilayer reflector comprises a substrate (e.g., comprising a low atomic number material, such as silicon, quartz, glass, or aluminum) having a thickness in a range of 0.5 mm to 3 mm or in a range of 0.2 mm to 1 mm and a depth-graded multilayer coating on a surface of the substrate. Absorption of the x-rays 26 by the depth-graded multilayer reflector is lower than a predetermined value (e.g., less than 20%; less than 10%; less than 5%; less than 3%). In certain embodiments, the at least one depth-graded multilayer reflector is oriented such that a surface of the at least one depth-graded multilayer reflector is in a range of 3 degrees to 15 degrees, in a range of 10 degrees to 40 degrees, or in a range of 40 degrees to 50 degrees, relative to the x-rays 26 (e.g., relative to a collimated x-ray beam comprising the x-rays 26).

The at least one depth-graded multilayer of certain embodiments comprises a plurality of layer pairs (e.g., pairs of layers or bilayers having a high atomic number material and a low atomic number material that alternate in a direction perpendicular to the layers). The thicknesses of the layer pairs differ from one another (e.g., the spacings between sequential high-atomic-number-material layers differ from one another). For example, each layer pair can comprise a first layer comprising a first material and a second layer comprising a second material (e.g., Pt/Si layer pairs; Pt/B$_4$C layer pairs; Pt/Al$_2$O$_3$ layer pairs; W/Si layer pairs; W/B$_4$C layer pairs; W/Al$_2$O$_3$ layer pairs; Mo/Si layer pairs; Mo/B$_4$C layer pairs; Mo/Al$_2$O$_3$ layer pairs; Ni/Si layer pairs; Ni/B$_4$C layer pairs; Ni/Al$_2$O$_3$ layer pairs; Cu/Si layer pairs; Cu/B$_4$C layer pairs; Cu/Al$_2$O$_3$ layer pairs). The thickness (e.g., in a direction substantially perpendicular to the substrate surface) of each layer pair is substantially constant along a direction substantially parallel to the surface. However, along the normal of the substrate surface, layer pairs are configured in sets or groups in which the thicknesses of the layer pairs in each group differ from one another. For example, the thicknesses of the layer pairs of the various groups can increase from a first thickness to a second thickness, with the layer groups closer to the substrate surface having smaller layer thicknesses than do layer groups farther from the substrate surface.

At least a first portion 132 of the x-rays 26 impinging the depth-graded multilayer reflector satisfies the Bragg reflection condition (2d·sin θ=n·λ) for at least some of the layers of the depth-graded multilayer coating, where d is the spacing between the high atomic number material layers (e.g., spacing between Pt, W, Mo, Ni, or Cu layers). The first portion 132 of the x-rays 26 satisfying the Bragg reflection condition for at least some of the layers is reflected by the depth-graded multilayer coating. The remaining portion of the x-rays 26 that does not satisfy the Bragg reflection condition for any of the layers of the depth-graded multilayer coating is not reflected by the depth-graded multilayer coating and is transmitted through the depth-graded multilayer coating and the substrate (e.g., with substantially no attenuation), thereby forming the second x-ray beam 32.

In certain embodiments, due to the varying thicknesses of the layers of the depth-graded multilayer coating, the incident x-rays 26 within a narrow range of wavelengths will find a layer spacing for which the Bragg reflection condition is satisfied and will be reflected by the depth-graded multilayer coating so as to not contribute to the second x-ray beam 32. The depth-graded multilayer reflector can be oriented relative to the x-rays 26 (e.g., relative to a collimated x-ray beam comprising the x-rays 26) to reflect x-rays 26 having a range of energies with a predetermined central value and predetermined bandwidth (e.g., a range having a lower bound and an upper bound), thereby preventing x-rays 26 within the range (e.g., between the lower bound and the upper bound) from contributing to the second x-ray beam 32.

As schematically illustrated by FIG. 10B, the second x-ray energy spectrum of the second x-ray beam 32 has a predetermined energy range (e.g., a "notch") in which the x-ray intensity (e.g., flux) is reduced (e.g., by at least 80%; by at least 90%; by at least 95%) by the at least one x-ray reflector 130 as compared to the x-ray energy spectrum of the first x-ray beam 12 (e.g., schematically illustrated by FIG. 9B). In addition, the second x-ray energy spectrum of the second x-ray beam 32 at energies below a predetermined value (e.g., 4 keV) has a reduced x-ray intensity (e.g., flux) (e.g., by at least 80%; by at least 90%; by at least 95%) as compared to the first x-ray energy spectrum of the first x-ray beam 12 (e.g., schematically illustrated by FIG. 9B).

As schematically illustrated by FIG. 10B, the second x-ray energy spectrum at the upper bound and the lower bound of the predetermined energy range have sharp edges. In contrast to conventional transmission filters used to reduce x-ray flux, certain embodiments described herein provide a sufficiently sharp upper bound edge such that the upper bound can be selected to be between the x-ray absorption edge and the x-ray fluorescence line of the element (e.g., Cu) to be analyzed using the x-ray fluorescence system (e.g., the half-width-at-half-maximum width of the upper bound edge is smaller than the energy difference between the x-ray absorption edge and the x-ray fluorescence line to be analyzed).

FIG. 11A schematically illustrates an example system 10 in which the at least one second x-ray optical element 24 comprises a plurality (e.g., two; three or more) of x-ray reflectors 130 in accordance with certain embodiments described herein. For example, a first x-ray reflector 130a comprising a first substrate and at least one first layer on the first substrate (e.g., at least one mosaic crystal layer and/or at least one depth-graded multilayer) is oriented at a first angle relative to the x-rays 26 (e.g., relative to a collimated x-ray beam comprising the x-rays 26) and a second x-ray reflector 130b comprising a second substrate and at least one second layer on the second substrate (e.g., at least one mosaic crystal layer and/or at least one depth-graded multilayer) is oriented at a second angle, different from the first angle, relative to the x-rays 26 (e.g., relative to a collimated x-ray beam comprising the x-rays 26). The first x-ray reflector 130a is configured to reflect a first portion 132a of the x-rays 26 and the second x-ray reflector 130b is configured to receive the at least some of the non-reflected x-rays from the first x-ray reflector 130a (e.g., the x-rays that are transmitted through the first x-ray reflector 130a) and is configured to reflect a second portion 132b of the x-rays 26, such that the first portion 132a and the second portion 132b do not contribute to the second x-ray beam 32, such that the second x-ray beam 32 consists essentially of the at least some of the non-reflected x-rays from the second x-ray reflector 130b (e.g., the x-rays that are transmitted through the second x-ray reflector 130b).

FIG. 11B schematically illustrates an example second x-ray energy spectrum of the second x-ray beam 32 (e.g., x-rays transmitted through the two x-ray reflectors 130a, 130b) of FIG. 11A in accordance with certain embodiments described herein. For example, the first x-ray reflector 130a can be configured to provide a first "notch" energy range that includes a first x-ray fluorescence line of interest and the second x-ray reflector 130b can be configured to provide a second "notch" energy range that includes a second x-ray fluorescence line of interest (e.g., Hf L$_{\alpha 1}$ line at 7.9 keV and La L$_{\beta 1}$ line at 5 keV; Si K$_{\beta 1}$ line at 1.8 keV and Mg K$_{\beta 1}$ line at 1.3 keV)). As shown in FIG. 11B, in certain embodiments, the two energy ranges of two "notches" can be separate from one another (e.g., an upper bound of a first energy range from one of the x-ray reflectors 130 is lower than a lower bound of the second energy range from another of the x-ray reflectors 130). In certain other embodiments, the two energy ranges of two "notches" can overlap one another (e.g., the upper bounds of both energy ranges are higher than the lower bounds of both energy ranges), effectively forming one larger energy range over which the background contribution is effectively reduced (e.g., extending from the lower bound of the first energy range to the upper bound of the second energy range).

In the example system of FIGS. 12A-12B, the at least one x-ray reflector 130 comprises at least one grazing incidence mirror in accordance with certain embodiments described herein. For example, the grazing incidence mirror can comprise a substrate (e.g., comprising a low atomic number material, such as silicon, quartz, glass, or aluminum) having a thickness in a range of 0.001 mm to 0.05 mm or in a range of 0.05 mm to 0.2 mm and a coating comprising one or more layers (e.g., comprising a high atomic number material, such as Au, Ir, Pt, W, Cu, or Mo) on a surface of the substrate. Absorption of the x-rays 26 by the grazing incidence mirror is lower than a predetermined value (e.g., less than 20%; less than 10%; less than 5%; less than 3%). In certain embodiments, the grazing incidence mirror is planar, while in certain other embodiments, the grazing incidence mirror is curved or bent. In certain embodiments, the at least one grazing incidence mirror is oriented such that a surface of the grazing incidence mirror is in a range of 1 degree to 10 degrees or in a range of 0.5 degree to 5 degrees, relative to the x-rays 26 (e.g., relative to a collimated x-ray beam comprising the x-rays 26).

At least a first portion 132 of the x-rays 26 impinging the grazing incidence mirror comprises x-rays for which the grazing angle of incidence is below the critical angle for total external reflection by the grazing incidence mirror (e.g., low energy x-rays; x-rays having energies below 1 keV, 3 keV, or 5 keV), and are reflected by the grazing incidence mirror. The remaining portion of the x-rays 26 for which the grazing angle of incidence is above the critical angle for total external reflection (e.g., higher energy x-rays; x-rays having energies above 1 keV, 3 keV, or 5 keV) is not reflected by the grazing incidence mirror and is transmitted through the grazing incident mirror (e.g., with substantially no attenuation), thereby forming the second x-ray beam 32 (e.g., the second x-ray beam 32 consists essentially of the at least some of the non-reflected x-rays from the at least one x-ray reflector 130).

As schematically illustrated by FIG. 12B, the second x-ray energy spectrum of the second x-ray beam 32 transmitted through the grazing incidence mirror at energies below a predetermined "cut-off" value (e.g., 4 keV) has a reduced x-ray intensity (e.g., flux) (e.g., by at least 80%; by at least 90%; by at least 95%) as compared to the first x-ray energy spectrum of the first x-ray beam 12 (e.g., schematically illustrated by FIG. 9B). In certain embodiments, the angle of incidence of the x-rays 26 onto the grazing incidence mirror is adjustable (e.g., relative to the critical angle) so as to adjust the predetermined "cut-off" value of the portion of the x-rays 26.

Figure 13A:
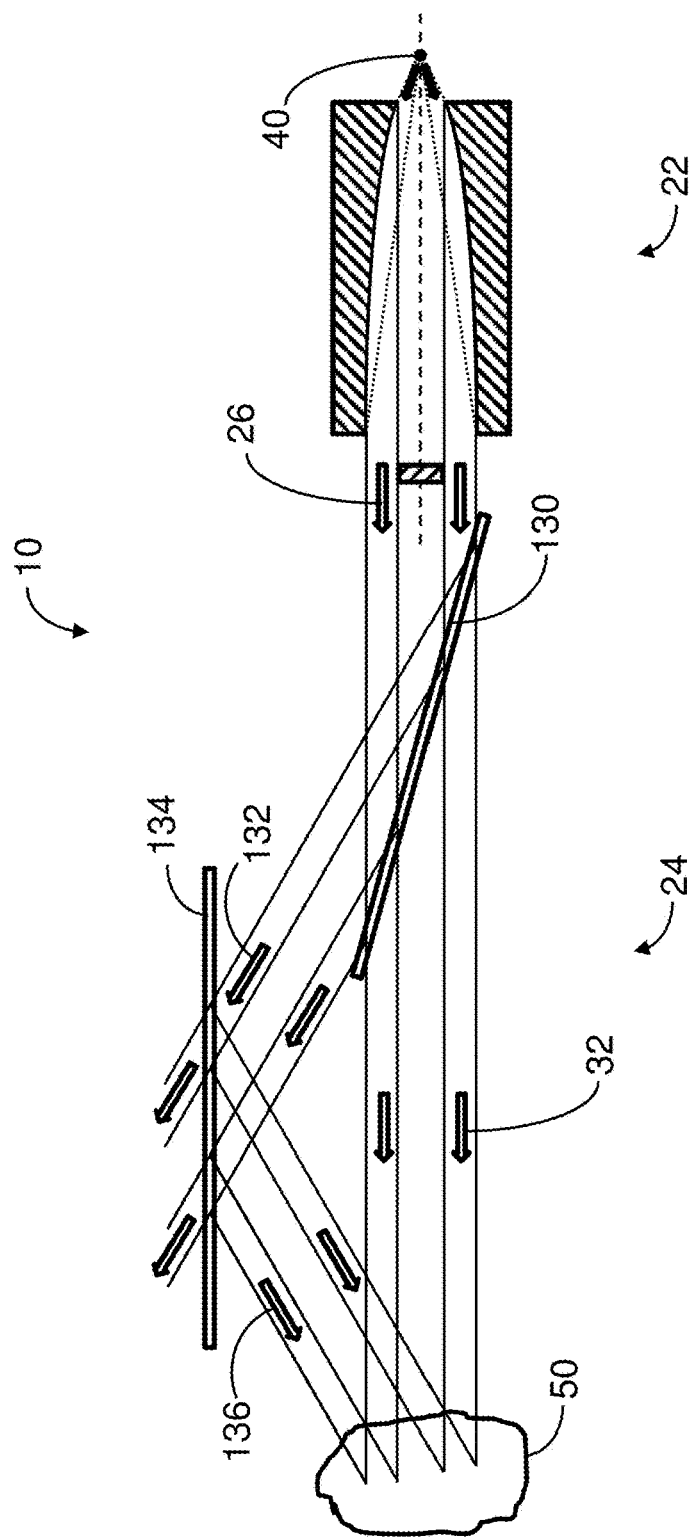
FIG. 13A schematically illustrates an example system comprising a first x-ray reflector and a second x-ray reflector in accordance with certain embodiments described herein.
Figure 13B:
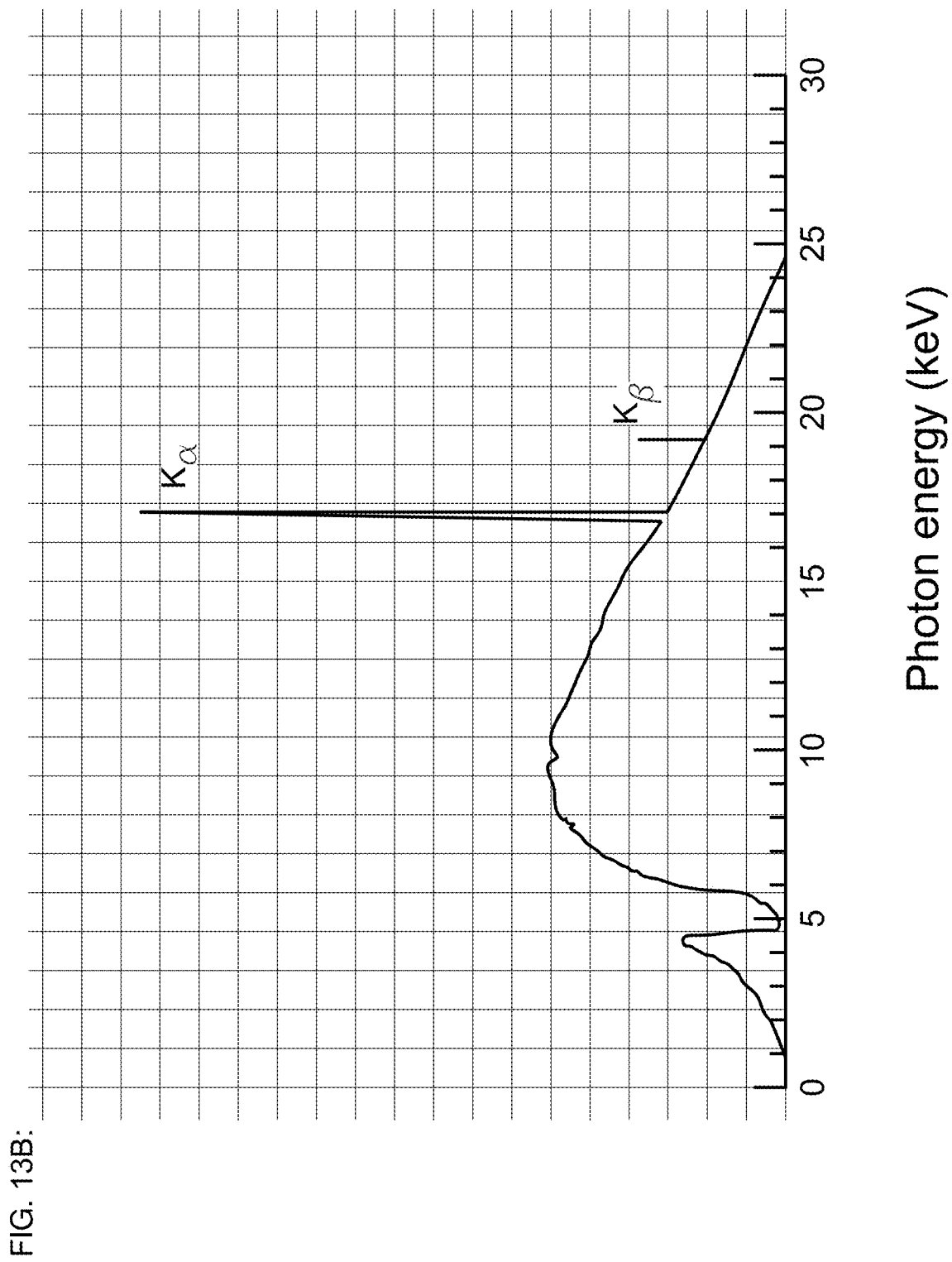
FIG. 13B schematically illustrates an example second x-ray energy spectrum of the second x-ray beam and the x-rays reflected from the second x-ray reflector of FIG. 13A in accordance with certain embodiments described herein.

FIG. 13A schematically illustrates an example system 10 comprising a first x-ray reflector 130 (e.g., a first grazing incidence mirror) and a second x-ray reflector 134 (e.g., a second grazing incidence mirror) in accordance with certain embodiments described herein. The second x-ray reflector 134 is configured to substantially reflect x-rays 136 of the first portion 132 of the x-rays 26 and to not substantially reflect a remaining portion of the first portion 132 of the x-rays 26. FIG. 13B schematically illustrates an example second x-ray energy spectrum of the second x-ray beam 32 and the x-rays 136 reflected from the second x-ray reflector 134 of FIG. 13A in accordance with certain embodiments described herein.

For example, at least some x-rays 136 of the first portion 132 of the x-rays 26 impinging the second x-ray reflector 134 (e.g., second grazing incidence mirror) have a grazing angle of incidence that is below the critical angle for total external reflection by the second x-ray reflector 134 (e.g., low energy x-rays; x-rays having energies below 1 keV, 3 keV, or 5 keV) and are reflected by the second x-ray reflector 134 (e.g., the x-rays 136 are twice reflected, once by the first x-ray reflector 130 and once by the second x-ray reflector 134). The remaining x-rays of the first portion 132 of the x-rays 26 for which the grazing angle of incidence is above the critical angle for total external reflection by the second x-ray reflector 134 (e.g., higher energy x-rays; x-rays having energies above 1 keV, 3 keV, or 5 keV) are not reflected by the second x-ray reflector 134 and are transmitted through the second x-ray reflector 134.

In certain embodiments, as schematically illustrated by FIG. 13A, the first x-ray reflector 130 and the second x-ray reflector 134 can be configured such that the second x-ray beam 32 and the at least some "twice-reflected" x-rays 136 (e.g., of the first portion 132 of the x-rays 26 impinging the second x-ray reflector 134) irradiate the sample 50. In certain embodiments, the x-rays 136 impinge a first region of the sample 50 that is the same as a second region of the sample 50 that is impinged by second x-ray beam 32, while in certain other embodiments, the first region of the sample 50 impinged by the x-rays 136 is different from the second region of the sample 50 impinged by the second x-ray beam 32 (e.g., the first region partially overlaps the second region).

In certain embodiments, the first x-ray reflector 130 is configured to reflect x-rays 132 in a first energy range having a first upper bound (e.g., 4 keV, 5 keV, 6 keV) and the second x-ray reflector 134 is configured to reflect x-rays 136 in a second energy range having a second upper bound (e.g., 2 keV, 3 keV, 4 keV) that is lower than the first upper bound. The energy range between the first upper bound and the second upper bound can have a reduced x-ray intensity (e.g., flux) (e.g., by at least 80%; by at least 90%; by at least 95%) as compared to the x-ray energy spectrum of the first x-ray beam 12 (e.g., schematically illustrated by FIG. 9B). In this way, certain embodiments are configured to perform x-ray fluorescence analysis of high atomic number elements (e.g., using the high energy portion of the x-ray energy spectrum of the second x-ray beam 32 impinging the sample 50) and low atomic number elements (e.g., using the low energy portion of the x-ray energy spectrum of the "twice-reflected" x-rays 136 impinging the sample 50). In certain embodiments, the angle of incidence of the x-rays 26 onto the first x-ray reflector 130 is adjustable and the angle of incidence of the x-rays 132 onto the second x-ray reflector 134 is adjustable (e.g., at slightly different grazing angles relative to the respective critical angles) so as to adjust the portion of the x-rays 26 that does not impinge the sample 50 (e.g., the portion of the x-rays 26 that is not included in either the second x-ray beam 32 or the x-rays 136; so as to cut out an unwanted portion of the low energy spectrum).

Figure 14:
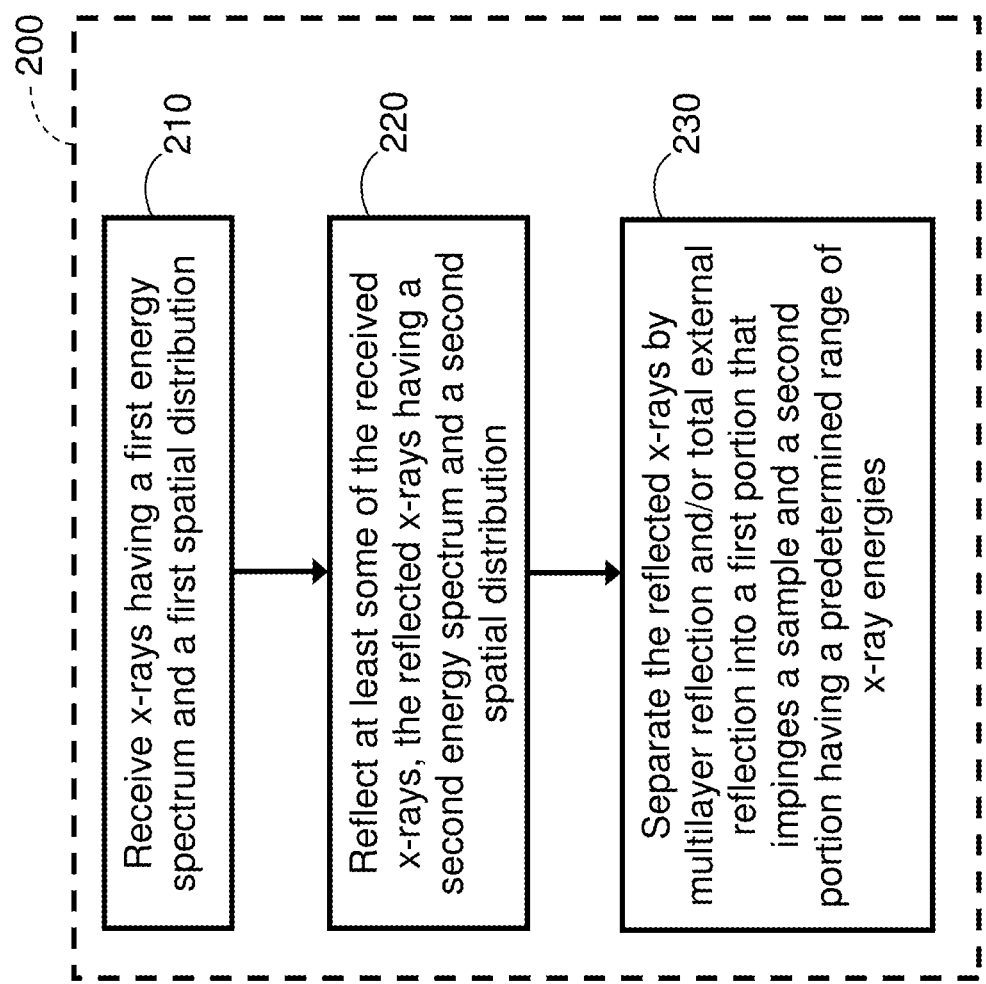
FIG. 14 is a flow diagram of an example method of performing x-ray fluorescence analysis in accordance with certain embodiments described herein.

FIG. 14 is a flow diagram of an example method 200 of performing x-ray fluorescence analysis in accordance with certain embodiments described herein. In an operational block 210, the method 200 comprises receiving x-rays having a first energy spectrum and a first spatial distribution. In an operational block 220, the method 200 further comprises reflecting at least some of the received x-rays, the reflected x-rays having a second energy spectrum and a second spatial distribution. In an operational block 230, the method 200 further comprises separating the reflected x-rays by multilayer reflection (e.g., reflection that satisfies the Bragg reflection condition from multilayers and/or mosaic crystal layers) and/or total external reflection into a first portion that impinges a sample and a second portion having a predetermined range of x-ray energies. The first portion has a third energy spectrum that has a reduced intensity, as compared to the second energy spectrum, in the predetermined range of x-ray energies. In certain embodiments, at least some of the x-rays of the first portion are configured to excite x-ray fluorescence within the sample, the x-ray fluorescence comprising x-ray fluorescence lines within the predetermined range of x-ray energies. In certain embodiments, the method 200 further comprises reflecting some x-rays of the second portion to impinge the sample.

Conditional language, such as "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments.

Conjunctive language such as the phrase "at least one of X, Y, and Z," unless specifically stated otherwise, is to be understood within the context used in general to convey that an item, term, etc. may be either X, Y, or Z. Thus, such conjunctive language is not generally intended to imply that certain embodiments require the presence of at least one of X, at least one of Y, and at least one of Z.

Language of degree, as used herein, such as the terms "approximately," "about," "generally," and "substantially," represent a value, amount, or characteristic close to the stated value, amount, or characteristic that still performs a desired function or achieves a desired result. For example, the terms "approximately," "about," "generally," and "substantially" may refer to an amount that is within ±10% of, within ±5% of, within ±2% of, within ±1% of, or within ±0.1% of the stated amount. As another example, the terms "generally parallel" and "substantially parallel" refer to a value, amount, or characteristic that departs from exactly parallel by ±10 degrees, by ±5 degrees, by ±2 degrees, by ±1 degree, or by ±0.1 degree, and the terms "generally perpendicular" and "substantially perpendicular" refer to a value, amount, or characteristic that departs from exactly perpendicular by ±10 degrees, by ±5 degrees, by ±2 degrees, by ±1 degree, or by ±0.1 degree.

Various configurations have been described above. Although this invention has been described with reference to these specific configurations, the descriptions are intended to be illustrative of the invention and are not intended to be limiting. Various modifications and applications may occur to those skilled in the art without departing from the true spirit and scope of the invention. Thus, for example, in any method or process disclosed herein, the acts or operations making up the method/process may be performed in any suitable sequence and are not necessarily limited to any particular disclosed sequence. Features or elements from various embodiments and examples discussed above may be combined with one another to produce alternative configurations compatible with embodiments disclosed herein. Various aspects and advantages of the embodiments have been described where appropriate. It is to be understood that not necessarily all such aspects or advantages may be achieved in accordance with any particular embodiment. Thus, for example, it should be recognized that the various embodiments may be carried out in a manner that achieves or optimizes one advantage or group of advantages as taught herein without necessarily achieving other aspects or advantages as may be taught or suggested herein.

What is claimed is:

1. An x-ray optical filter comprising at least one x-ray optical mirror, the at least one x-ray optical mirror configured to receive a plurality of x-rays having a first x-ray spectrum with a first intensity as a function of energy in a predetermined solid angle range and to separate at least some of the received x-rays by multilayer reflection or total external reflection into reflected x-rays and non-reflected x-rays and to form an x-ray beam comprising at least some of the reflected x-rays and/or at least some of the non-reflected x-rays, the x-ray beam having a second x-ray spectrum with a second intensity as a function of energy in the solid angle range, the second intensity greater than or equal to 50% of the first intensity across a first continuous energy range at least 3 keV wide, the second intensity less than or equal to 10% of the first intensity across a second continuous energy range at least 100 eV wide.

2. The filter of claim 1, wherein the second intensity is greater than or equal to 50% of the first intensity across a third continuous energy range at least 2 keV wide, the second continuous energy range between the first continuous energy range and the third continuous energy range.

3. The filter of claim 1, wherein the at least one x-ray optical mirror comprises an axially symmetric x-ray focusing optical mirror comprising a substrate and at least one layer on the substrate, the at least one layer comprises a depth-graded multilayer coating, the second x-ray beam consisting essentially of the at least some of the reflected x-rays.

4. The filter of claim 1, wherein the at least one x-ray optical mirror comprises a substrate and at least one layer on the substrate, the at least one layer comprising at least one mosaic crystal layer and/or at least one depth-graded multilayer, the second x-ray beam consisting essentially of the at least some of the non-reflected x-rays.

5. The filter of claim 1, wherein the at least one x-ray optical mirror comprises a first x-ray optical mirror comprising a first substrate and at least one first layer on the first substrate and a second x-ray optical mirror comprising a second substrate and at least one second layer on the second substrate, the second x-ray optical element configured to receive the at least some of the non-reflected x-rays from the first x-ray optical element, the second x-ray beam consisting essentially of the at least some of the non-reflected x-rays from the second x-ray optical element.

6. The filter of claim 1, wherein the at least one x-ray optical mirror comprises at least one grazing incidence mirror, the second x-ray beam consisting essentially of the at least some of the non-reflected x-rays.

7. The filter of claim 1, wherein the at least one x-ray optical mirror comprises a first grazing incidence mirror and a second grazing incidence mirror, the second x-ray beam consisting essentially of the at least some of the non-reflected x-rays from the first grazing incidence mirror, the second x-ray beam and at least a portion of the at least some of the reflected x-rays from the first grazing incidence mirror that is reflected from the second grazing incidence mirror directed to irradiate a sample.

8. A method of performing x-ray fluorescence analysis, the method comprising:
receiving x-rays having a first energy spectrum and a first spatial distribution;
reflecting at least some of the received x-rays, the reflected x-rays having a second energy spectrum and a second spatial distribution; and
separating the reflected x-rays by multilayer reflection and/or total external reflection into a first portion that impinges a sample and a second portion having a predetermined range of x-ray energies, the first portion having a third energy spectrum that has a reduced intensity, as compared to the second energy spectrum, in the predetermined range of x-ray energies.

9. The method of claim 8, wherein at least some of the x-rays of the first portion are configured to excite x-ray fluorescence within the sample, the x-ray fluorescence comprising x-ray fluorescence lines within the predetermined range of x-ray energies.

10. The method of claim 8, further comprising reflecting some x-rays of the second portion to impinge the sample.

11. An x-ray system comprising:
at least one first x-ray optical mirror configured to receive at least a portion of a first x-ray beam having a first energy spectrum and to reflect at least some of the x-rays of the portion of the first x-ray beam to form a second x-ray beam; and
at least one second x-ray optical mirror comprising at least one mosaic crystal layer, at least one depth-graded multilayer reflector, and/or at least one grazing incidence mirror, the at least one second x-ray optical mirror configured to receive at least some of the x-rays from the at least one first x-ray optical mirror, to transmit a second x-ray beam comprising a transmitted portion of the x-rays received from the at least one first x-ray optical mirror, and to reflect a reflected portion of the x-rays received from the at least one first x-ray optical mirror, the second x-ray beam having a second energy spectrum with a reduced intensity, as compared to the first energy spectrum, in a predetermined range of x-ray energies.

12. The system of claim 11, wherein at least a portion of the second x-ray beam is configured to irradiate a sample and to excite x-ray fluorescence within the sample, the x-ray fluorescence emitted from the sample and comprising x-ray fluorescence lines within the predetermined range of x-ray energies.

13. The system of claim 11, further comprising an x-ray source configured to generate the first x-ray beam.

14. The system of claim 11, wherein the portion of the first x-ray beam has a first divergence angle in a range of 5 mrad to 60 mrad.

15. The system of claim 14, wherein the x-rays reflected from the at least one first x-ray optical mirror have a second divergence angle in a range less than two mrad.

16. The system of claim 11, wherein the portion of the first x-ray beam is divergent and the x-rays reflected from the at least one first x-ray optical mirror are collimated.

17. The system of claim 11, wherein the x-rays reflected from the at least one first x-ray optical mirror have an energy spectrum that is substantially equal to the first energy spectrum in the predetermined range of x-ray energies.

18. The system of claim 11, wherein the at least one first x-ray optical mirror comprises a paraboloidal-shaped reflective surface.

19. The system of claim 18, further comprising at least one beam stop configured to prevent a second portion of the first x-ray beam that is not reflected by the at least one first x-ray optical mirror from contributing to the second x-ray beam.

20. The system of claim 11, wherein the at least one mosaic crystal layer comprises highly oriented pyrolytic graphite (HOPG) or highly aligned pyrolytic graphite (HAPG), the at least one mosaic crystal layer having a mosaicity in a range of less than three degrees.

21. The system of claim 11, wherein the at least one depth-graded multilayer reflector comprises a substrate and a depth-graded multilayer coating on a surface of the substrate, the substrate comprising at least one material selected from the group consisting of: silicon, quartz, glass, and aluminum.

22. The system of claim 11, wherein the at least one grazing incidence mirror comprises a substrate and a coating on a surface of the substrate, the substrate comprising at least one material selected from the group consisting of: silicon, quartz, glass, and aluminum, the coating comprising at least one material selected from the group consisting of: Au, Ir, Pt, W, Cu, and Mo.

23. The system of claim 11, wherein the at least one grazing incidence mirror comprises a first grazing incidence mirror and a second grazing incidence mirror, the first grazing incidence mirror configured to reflect the reflected portion of the x-rays received from the at least one first x-ray optical element and to transmit the second x-ray beam towards a sample, the second grazing incidence mirror configured to reflect a portion of the reflected portion of the x-rays received from the at least one first x-ray optical element towards the sample.

24. An x-ray system comprising:
at least one x-ray source configured to generate x-rays; and
at least one x-ray optical element configured to receive and focus at least some of the x-rays from the at least one x-ray source, the at least one x-ray optical element comprising:
at least one substrate comprising a surface; and
at least one depth-graded multilayer coating on the surface, the at least one depth-graded multilayer coating configured to substantially reflect x-rays having energies in a first energy range and to not substantially reflect x-rays having energies in a second energy range that does not overlap the first energy range.

25. The system of claim 24, wherein the at least one substrate comprises a portion of an axially symmetric tube having a longitudinal axis, the surface comprising an inner surface of the portion.

26. The system of claim 25, wherein the surface has an ellipsoidal cross-sectional profile in a plane along the longitudinal axis.

27. The system of claim 24, wherein at least a portion of the surface has a shape configured for demagnification of a portion of the at least one x-ray source from which the x-rays are generated.

28. The system of claim 24, wherein the depth-graded multilayer coating has a first reflectivity greater than 30% for x-rays in the first energy range and a second reflectivity less than 10% for x-rays in the second energy range.

29. The system of claim 24, wherein the depth-graded multilayer coating comprises a plurality of two-layer pairs, each two-layer pair having a thickness d, wherein at least some of the two-layer pairs have different thicknesses d from one another.

30. The system of claim 29, wherein the two-layer pairs are configured into multiple sets of adjacent two-layer pairs, wherein the two-layer pairs of a first set each have a first thickness $d_1$, the two-layer pairs of a second set each have a second thickness $d_2$ greater than the first thickness $d_1$, the two-layer pairs of a third set each have a third thickness $d_3$ greater than the second thickness $d_2$.

31. The system of claim 24, further comprising a mount configured to hold an object to be analyzed, the at least one x-ray optical element configured to focus the reflected x-rays at the object.

32. The system of claim 24, further comprising at least one x-ray detector subsystem configured to detect fluorescence x-rays from the object, the fluorescence x-rays in the second energy range.

* * * * *